US008509444B2

(12) United States Patent
Nishimoto et al.

(10) Patent No.: US 8,509,444 B2
(45) Date of Patent: Aug. 13, 2013

(54) SCRAMBLE KEY MANAGEMENT UNIT, SCRAMBLE KEY MANAGEMENT INFORMATION TRANSMITTING UNIT, METHOD FOR SCRAMBLE KEY OUTPUT MANAGEMENT, SCRAMBLE KEY MANAGEMENT PROGRAM, LICENSE INFORMATION MANAGEMENT UNIT, LICENSE MANAGEMENT INFORMATION TRANSMITTING UNIT, METHOD FOR LICENSE INFORMATION OUTPUT MANAGEMENT, AND LICENSE INFORMATION MANAGEMENT PROGRAM

(75) Inventors: Yusei Nishimoto, Setagaya-ku (JP); Satoshi Fujitsu, Setagaya-ku (JP); Syunji Sunasaki, Setagaya-ku (JP)

(73) Assignee: Nippon Hoso Kyokai, Saibuya-ku, Tokyo (JP)

( * ) Notice: Subject to any disclaimer, the term of this patent is extended or adjusted under 35 U.S.C. 154(b) by 481 days.

(21) Appl. No.: 12/596,792

(22) PCT Filed: Apr. 20, 2007

(86) PCT No.: PCT/JP2007/058646
§ 371 (c)(1),
(2), (4) Date: Oct. 20, 2009

(87) PCT Pub. No.: WO2008/136077
PCT Pub. Date: Nov. 13, 2008

(65) Prior Publication Data
US 2010/0088515 A1    Apr. 8, 2010

(51) Int. Cl.
*H04L 9/00* (2006.01)

(52) U.S. Cl.
USPC .............................. 380/277; 726/17

(58) Field of Classification Search
USPC ............... 380/277, 278; 713/168; 726/4, 726/17
See application file for complete search history.

(56) References Cited

U.S. PATENT DOCUMENTS

| | | | | |
|---|---|---|---|---|
| 5,937,067 | A | * | 8/1999 | Thatcher et al. .............. 380/212 |
| 6,069,956 | A | * | 5/2000 | Kurihara ....................... 380/212 |
| 6,424,717 | B1 | * | 7/2002 | Pinder et al. .................. 380/239 |
| 6,463,155 | B1 | | 10/2002 | Akiyama et al. |
| 6,510,519 | B2 | * | 1/2003 | Wasilewski et al. .......... 713/168 |
| 6,526,508 | B2 | * | 2/2003 | Akins et al. ................... 713/168 |

(Continued)

FOREIGN PATENT DOCUMENTS

| | | |
|---|---|---|
| EP | 1 732 261 | 12/2006 |
| JP | 7-143117 | 6/1995 |

(Continued)

OTHER PUBLICATIONS

Association of Radio Industries and Businesses "Standard Access Control Method in a Digital Broadcasting" *ARIB STD-B25. Version 4.2.* 2006. pp. 1-407.

(Continued)

*Primary Examiner* — Samson Lemma
(74) *Attorney, Agent, or Firm* — Merchant & Gould P.C.

(57) ABSTRACT

A low cost scramble key management apparatus which enables to manage a scramble key based on individual contract information and to ensure security in narrow band broadcasting. The scramble key management apparatus 7 includes an ECM decoding unit 75 for decoding an ECM in which a scramble key and individual contract information are encrypted. The individual contract information includes contract information indicating contract statuses of a plurality of content receivers 3, 3, ... which is arranged based on receiver IDs for identifying each of the content receivers 3. The scramble key management apparatus 7 includes a contract information obtaining unit 76b for obtaining the contract information of the content receiver 3 associated with the receiver ID from the individual contract information and a contract status determining unit 76c for determining the contract status and outputting the scramble key to a content decoder 5 if the contract status is under contract.

20 Claims, 20 Drawing Sheets

(56) References Cited

U.S. PATENT DOCUMENTS

| | | |
|---|---|---|
| 2001/0001014 A1 | 5/2001 | Akins, III et al. |
| 2002/0129249 A1* | 9/2002 | Maillard et al. ............. 713/172 |
| 2005/0201559 A1* | 9/2005 | Van Der Heijden .......... 380/239 |
| 2005/0259813 A1* | 11/2005 | Wasilewski et al. ............ 380/28 |
| 2006/0107285 A1 | 5/2006 | Medvinsky |
| 2007/0143854 A1* | 6/2007 | Wasilewski .................... 726/26 |

FOREIGN PATENT DOCUMENTS

| | | |
|---|---|---|
| JP | 11-243536 | 9/1999 |
| JP | 2001-69480 | 3/2001 |
| JP | 2002-016901 A | 1/2002 |
| JP | 2002-237787 | 8/2002 |
| JP | 2002-300560 | 10/2002 |
| WO | WO 2006/027749 | 3/2006 |

OTHER PUBLICATIONS

Japanese Office Action for corresponding Japanese Patent Application No. 2006-171268 mailed May 17, 2011.
European Search Report for EP 07 74 2081 mailed Aug. 29, 2012.
Author Unknown. "Functional Model of a Conditional Access System." *EBU Review Technical.* No. 266. 1995. pp. 64-77.

\* cited by examiner

FIG.18
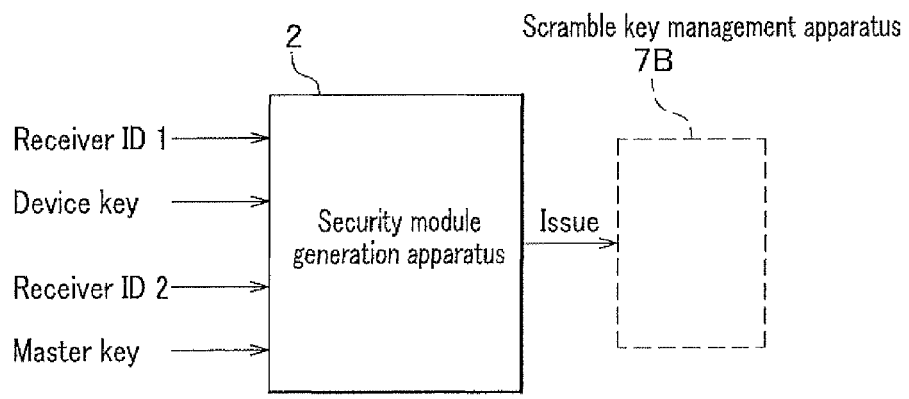
FIG.19A    FIG.19B
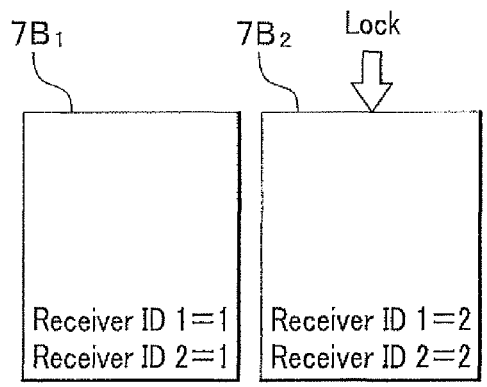
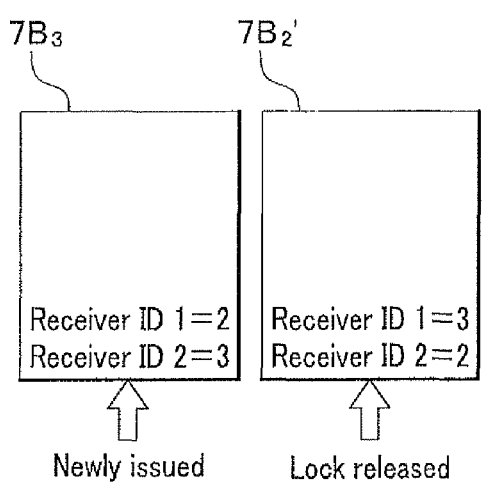

FIG.20

| Channel ID | Service ID | Contract information | Date information | | |
|---|---|---|---|---|---|
| | | | Contract signing date | Contract cancel date | Previous broadcasting reception date |
| A | A-1 | | | | |
| | A-2 | | | | |
| | A-3 | | | | |
| B | B-1 | | | | |
| C | C-1 | | | | |
| | C-2 | | | | |

SCRAMBLE KEY MANAGEMENT UNIT, SCRAMBLE KEY MANAGEMENT INFORMATION TRANSMITTING UNIT, METHOD FOR SCRAMBLE KEY OUTPUT MANAGEMENT, SCRAMBLE KEY MANAGEMENT PROGRAM, LICENSE INFORMATION MANAGEMENT UNIT, LICENSE MANAGEMENT INFORMATION TRANSMITTING UNIT, METHOD FOR LICENSE INFORMATION OUTPUT MANAGEMENT, AND LICENSE INFORMATION MANAGEMENT PROGRAM

This application is a National Stage Application of PCT/JP2007/058646, filed 20 Apr. 2007 which application is incorporated herein by reference. To the extent appropriate, a claim of priority is made to the above disclosed application.

BACKGROUND OF THE INVENTION

1. Field of the Invention

The present invention relates to a technique for broadcasting individual contract information of a digital content.

2. Description of the Related Arts

In the field of digital broadcasting, a pay broadcast system has recently been implemented in which only receiver under a contract with a broadcasting company is allowed to watch a digital content (hereinafter also referred to as a content). The pay broadcast system determines whether or not a receiver is a receiver under a contract by sending individual contract information to a receiver for which the contract has been signed and allows only receiver which has valid individual contract information to decode an encrypted content.

In the pay broadcast system, a method has been known in which a unique master key is assigned to each receiver, and individual contract information is sent encrypted with the master key corresponding to a receiver (see the non-patent document 1) as a method for sending individual contract information to a receiver. The individual contract information is sent as an EMM (Entitlement Management Message), and an expire date of about one month is set for the individual contract information. The individual contract information is decoded with the master key in the receiver which has received the individual contract information, whereby decoding of the content is allowed. Further, if a subscriber continues the contract, new individual contract information is transmitted to the receiver and the contract is updated in the receiver.

As another method, a method has been also known in which a work key which is common to receivers is provided to the receivers in advance, and individual contract information to which a receiver ID indicating a destination receiver is added is sent encrypted with the work key as an ECM (Entitlement Control Message), which is common information (see the patent document 1). The receiver decodes the encrypted individual contract information with the work key, and if the receiver ID added to the individual contract information coincides with the receiver ID of the receiver, the receiver obtains the individual contract information. If the receiver ID added to the individual contract information is the receiver ID of another receiver, the receiver does not obtain the individual contract information. The individual contract information is transmitted in response to the contract status, for example, at the time of contract or cancellation of contract. In order to prevent falsified individual contract information from being used by a genuine receiver, the individual contract information has a digital signature. As the digital signature is verified in the receiver, the falsified individual contract information can be excluded.

Patent document 1: Japanese Patent Number 3561154 (paragraphs 0010 to 0037)

Non-patent document 1: Association of Radio Industries and Businesses "Standard Access Control Method in a Digital Broadcasting" ARIB STD-B25, Part 1

DISCLOSURE OF THE INVENTION

Problems to be Solved by the Invention

The method disclosed in non-patent document 1 is effective for BS digital broadcasting or 12 segment digital terrestrial broadcasting, however, the method takes dozens of hours to transmit the EMM to all the receivers in narrow band 1 segment digital terrestrial broadcasting or digital terrestrial audio broadcasting since the EMM of great data amount needs to be transmitted. In 1 segment digital terrestrial broadcasting in which a mobile terminal such as a cellular phone is a receiver, the individual contract information needs to be transmitted in a short time from when the receiver is connected to a network because the power of the receiver may not be ON all the time, which makes it not practical to use the method.

In the method disclosed in patent document 1, the individual contract information is falsified easily since the individual contract information is encrypted with the common work key, and thus the signature value of the digital signature included in the ECM needs to be transmitted to ensure the security. Thus, an area for the signature value has to be secured each time the ECM is transmitted, which prevents to use a broadcast band efficiently. This results in increase in the cost of the receiver since the processing for verifying the digital signature requires high load on the receiver.

SUMMARY OF THE INVENTION

The present invention is made to solve the problems of the conventional arts, and an object thereof is to provide a low cost scramble key management apparatus, scramble key management information transmitting apparatus, scramble key output management method, scramble key management program and license information management apparatus which enable to manage a scramble key (license information) based on individual contract information (individual authorization information) and to ensure security even in a narrow band broadcasting such as 1 segment digital terrestrial broadcasting.

Another object of the present invention is to provide a license information management apparatus, license management information transmitting apparatus, license information output management method and license information management program which allow to manage license information such as a scramble key based on individual contract information and to increase the number of the receiver in narrow band broadcasting.

In order to solve the problem, a scramble key management apparatus of Claim 1 is configured to manage the output of a scramble key for decoding an encrypted content to a content decoder which receives and decodes the encrypted content. The scramble key management apparatus includes a scramble key management information decoding unit, an authorization information obtaining unit and an authorization status determining unit.

In accordance with the above configuration, the scramble key management apparatus is allowed by the scramble key management information decoding unit to decode scramble key management information in which the scramble key and individual authorization information are encrypted, the individual authorization information arranging authorization information indicating a presence or absence of authorization for each of a plurality of the content decoders to decode the encrypted content based on decoder IDs for identifying each of the content decoders. The scramble key management apparatus is also allowed by the authorization information obtaining unit to obtain the authorization information for the content decoder of an output target from the individual authorization information decoded by the scramble key management information decoding unit based on the decoder ID of the content decoder of the output target. Here, since the individual authorization information is information indicating authorization statuses for decoding the encrypted content arranged based on the decoder IDs which identify each of the content decoders, the scramble key management apparatus is allowed by the authorization information obtaining unit to obtain the information indicating the authorization status of the content decoder of the output target. The scramble key management apparatus determines, by the authorization status determining unit, whether or not the content decoder is authorized to decode the encrypted content based on the authorization information obtained by the authorization information obtaining unit, and outputs the scramble key to the content decoder of the output target if the content decoder is authorized to decode the encrypted content.

Thus, the scramble key management apparatus is allowed to manage the output of the scramble key based on the information indicating the authorization status of the content decoder, which is included in the individual authorization information.

A scramble key management apparatus of Claim 2 is configured in such a manner that a plurality of content decoders which are transmission targets of the encrypted content is classified into a plurality of groups in advance, the authorization information of a plurality of the content decoders included in one of the plurality of groups is arranged in the individual authorization information, a group ID for identifying the one of the plurality of groups is included in the individual authorization information, and the authorization information obtaining unit obtains the authorization information based on the group ID and the decoder ID in the scramble key management apparatus of Claim 1.

With this configuration, the scramble key management apparatus is allowed to obtain the information indicating the authorization status of the content decoder based on the group ID and the decoder ID and to manage the output of the scramble key.

Furthermore, a scramble key management information transmitting apparatus of Claim 3 is configured to transmit to the scramble key management apparatus according to Claim 1 scramble key management information in which a scramble key for decoding an encrypted content and individual authorization information are encrypted. The individual authorization information includes authorization information indicating a presence or absence of authorization to decode the encrypted content for each of a plurality of content decoders which receives and decodes the encrypted content. The scramble key management information transmitting apparatus includes an individual authorization information generation unit and a scramble key management information generation unit.

With this configuration, the scramble key management information transmitting apparatus generates, by the individual authorization information generation unit, individual authorization information containing authorization information for a plurality of the content decoders which is input from outside and arranged based on decoder IDs for identifying each of the content decoders, and encrypts, by the scramble key management information generation unit, the individual authorization information generated by the individual authorization information generation unit and the scramble key to generate scramble key management information.

With this configuration, the scramble key management information transmitting apparatus is allowed to arrange the information indicating each authorization status of a plurality of the content decoders in the individual authorization information and to transmit the individual authorization information and the scramble key to the scramble key management apparatus.

A scramble key management information transmitting apparatus of Claim 4 is configured in such a manner that the individual authorization information generation unit generates the individual authorization information including a bit string in which authorization information, each piece of which is one bit, is arranged in the scramble key management information transmitting apparatus of Claim 3.

With this configuration, the scramble key management information transmitting apparatus is allowed to arrange one bit information which indicates each authorization status of the plurality of content decoders in the individual authorization information and to transmit the individual authorization information and the scramble key to the scramble key management apparatus.

A scramble key management information transmitting apparatus of Claim 5 is configured in such a manner that the individual authorization information generation unit losslessly compresses the bit string in the scramble key management information transmitting apparatus of Claim 4.

With this configuration, the scramble key management information transmitting apparatus is allowed to compress the bit string in which one bit information indicating each authorization status of the plurality of content decoders to generate the individual authorization information and to transmit the individual authorization information and the scramble key to the scramble key management apparatus.

A scramble key output management method of Claim 6 is a scramble key output method for managing the output of a scramble key for decoding an encrypted content to a content decoder which receives and decodes the encrypted content. The method includes a scramble key management information decoding step, an authorization information obtaining step, an authorization status determining step, and a key output step.

In accordance with this method, the scramble key management information decoding step decodes scramble key management information in which the scramble key and individual authorization information are encrypted, the individual authorization information arranging authorization information indicating a presence or absence of authorization for each of a plurality of the content decoders to decode the encrypted content based on a decoder ID for identifying the each of the plurality of the content decoders. Subsequently, the authorization information obtaining step obtains the authorization information for the content decoder of an output target from the individual authorization information decoded by the scramble key management information decoding unit based on the decoder ID of the content decoder of the output target. The authorization status determining step determines whether or not the content decoder is authorized to decode the encrypted content based on the authorization information obtained by the authorization information obtaining unit, and a key output step outputs the scramble key to the content decoder of the output target if the content decoder is determined to be authorized to decode the encrypted content in the authorization status determining step.

With this method, the authorization status can be determined based on the information indicating the authorization information of the content decoder which is included in the individual authorization information, and the scramble key is allowed to be output if the content decoder is authorized.

A scramble key management program of Claim 7 causes a computer to function as a scramble key management information decoding unit, an authorization information obtaining unit and an authorization status determining unit for managing the output of a scramble key for decoding an encrypted content to a content decoder which receives and decodes the encrypted content.

With this configuration, the scramble key management program decodes, by the scramble key management information decoding unit, the scramble key management information in which a scramble key and individual authorization information are encrypted, the individual authorization information arranging authorization information indicating a presence or absence of authorization for each of a plurality of content decoders to decode an encrypted content based on decoder IDs which identify each of the content decoders, and obtains by the authorization information obtaining unit the authorization information for the content decoder of an output target from the individual authorization information decoded by the scramble key management information decoding unit based on the decoder ID of the content decoder of the output target. The scramble key management program also determines, by the authorization status determining unit, whether or not the content decoder is authorized to decode the encrypted content based on the authorization information obtained by the authorization information obtaining unit, and outputs the scramble key to the content decoder of the output target if the content decoder is authorized to decode the encrypted content.

Thus, the scramble key management program is allowed to manage the output of the scramble key based on the information indicating the authorization status of the content decoder, which is included in the individual authorization information.

A license information management apparatus of Claim 8 is a license information management apparatus which manages the output of license information for displaying a content to a content obtaining unit which receives and displays the content. The license information management apparatus includes a license management information decoding unit, an authorization information obtaining unit and an authorization status determining unit.

With this configuration, the license information management apparatus decodes, by the license management information decoding unit, license management information in which individual authorization information is encrypted, the individual authorization information arranging authorization information indicating a presence or absence of authorization for each of a plurality of the content obtaining units to display the content based on receiver IDs for identifying each of the content obtaining units, and obtains, by the authorization information obtaining unit, the authorization information for the content obtaining unit of an output target from the individual authorization information decoded by the license management information decoding unit based on the receiver ID of the content obtaining unit of the output target. Here, since the individual authorization information is information indicating the authorization statuses for watching a content which is arranged based on receiver IDs identifying each of the content obtaining units, the license information management apparatus is allowed by the authorization information obtaining unit to obtain the information indicating the authorization status of the content obtaining unit of the output target based on its receiver ID. The license information management apparatus determines, by the authorization status determining unit, whether or not the content obtaining unit is authorized to display the content based on the authorization information obtained in the authorization information obtaining unit, and outputs the license information to the content obtaining unit of the output target if the content obtaining unit is authorized to display the content.

Thus, the license information management apparatus is allowed to manage the output of the license information such as the scramble key based on the information indicating the authorization status of the content obtaining unit, which is included in the individual authorization information.

A license information management apparatus of Claim 9 is configured in such a manner that the content obtaining unit is a content decoder which decodes the encrypted content which is encrypted with a scramble key with the scramble key and the license information is the scramble key in the license information management apparatus of Claim 8.

Thus, the license information management apparatus is allowed to control the availability of watching the content by managing the output of the scramble key to the content decoder.

A license information management apparatus of Claim 10 is a license information management apparatus which manages the output of license information for displaying a content to a content obtaining unit which receives and displays the content. The license information management apparatus includes a license management information decoding unit, an authorization information obtaining unit, a lock control information obtaining unit, a lock control unit and an authorization status determining unit.

With this configuration, the license information management apparatus decodes, by the license management information decoding unit, license management information in which the individual authorization information is encrypted, the individual authorization information arranging authorization information indicating a presence or absence of authorization for each of a plurality of the content obtaining units to display the content based on first receiver IDs which identify each of the content obtaining units, and obtains, by the authorization information obtaining unit, the authorization information for the content obtaining unit of an output target from the individual authorization information decoded by the license management information decoding unit based on the first receiver ID of the content obtaining unit of the output target. Since the individual authorization information is the information indicating the authorization statuses for watching a content, which is arranged based on the first receiver IDs identifying each of the content obtaining units, the license information management apparatus is allowed by the authorization information obtaining unit to obtain the information indicating the authorization status of the content obtaining unit of the output target based on its first receiver ID. The license information management apparatus obtains, by the lock control information obtaining unit, lock control information associated with a second receiver ID for controlling a lock status which is either a status where the output of the license information to the content obtaining unit is allowed or a status where the output of the license information to the content obtaining unit is prohibited, the second receiver IDs identifying a larger number of the content obtaining units than the first receiver IDs do, and controls, by the lock control unit, the lock status based on the lock control information. Then, the license information management apparatus determines, by the authorization status determining unit, whether or not the content obtaining is authorized to display the content based on the authorization information obtained by the authorization information obtaining unit, and outputs the license information to the content obtaining unit of the output target if the content obtaining unit is authorized to display the content and the lock status is the status where the output of the scramble key is allowed.

Thus, the license information management apparatus is allowed to manage whether to output the license information based on the information indicating the authorization status of the content obtaining unit, which is included in the individual authorization information or to prohibit the license information from being output by the lock status regardless off the information indicating the authorization status.

A license information management apparatus of Claim 11 is configured in such a manner that a plurality of content obtaining units which are transmission targets of the content is classified into a plurality of groups in advance, the authorization information of a plurality of the content obtaining units included in one of the plurality of groups is arranged in the individual authorization information, a group ID for identifying the one of the plurality of groups is included in the individual authorization information, and the authorization information obtaining unit obtains the authorization information based on the group ID and the first receiver ID in the license information management apparatus of Claim 10.

Thus, the license information management apparatus is allowed to obtain the information indicating the authorization status of the content obtaining unit based on the group ID and the first receiver ID and to manage the output of the license information based on the information.

The license information management apparatus of Claim 12 is further provided with a first receiver ID storage unit for storing the first receiver ID in the license information management apparatus of Claims 10 and 11, wherein the lock control information includes at least a first receiver ID, and the license information management apparatus updates the first receiver ID stored in the first receiver ID storage unit to the first receiver ID included in the lock control information if the lock control information includes information for controlling the lock status to the status where the output of the license information is allowed.

Thus, the license information management apparatus is allowed to newly assign the first receiver ID to the content obtaining unit which is locked and is prohibited from watching the content to change the status of the content obtaining unit to the status where the content obtaining unit can display the content again.

The license information management apparatus of Claim 13 is configured to include a first receiver ID storage unit for storing the first receiver ID and the group ID in the license information management apparatus of Claim 11, wherein the lock control information includes at least a first receiver ID and a group ID, and the license information management apparatus updates the first receiver ID and the group ID stored in the first receiver ID storage unit to the first receiver ID and the group ID included in the lock control information, respectively if the lock control information includes information for controlling the lock status to the status where the output of the license information is allowed.

Thus, the license information management apparatus is allowed to newly assign a first receiver ID including the group ID to the content obtaining unit which is locked and is prohibited from watching the content to change the status of the content obtaining unit to the status where the content obtaining unit can display the content again.

The license information management apparatus of Claim 14 is configured to further include a lock determining unit in any one of the license information management apparatus of Claims 10 to 13.

With this configuration, the license information management apparatus determines, by the lock determining unit, whether or not to change the lock status to a status where the output of the license information is prohibited based on predetermined date information and a present date, and controls, by the lock control unit, the lock status based on the lock control information and a determination result of the lock determining unit.

Thus, the license information management apparatus controls the lock status to the status where the output of license information is prohibited if the present date meets a predetermined condition.

The license information management apparatus of Claim 15 is configured in such a manner that the first receiver ID is assigned a different ID by each channel in which the content obtaining unit receives the content, the different ID being associated with a channel ID identifying a channel, and the lock control unit controls the lock status by the each channel in the license information management apparatus of any one of Claims 10 to 14.

Thus, the license information management apparatus is allowed to manage the output of the license information by each channel.

The license information management apparatus of Claim 16 is configured in such a manner that in the license information management apparatus of Claim 14, the first receiver ID is assigned a different ID by each channel in which the content obtaining unit receives the content, the different ID being associated with a channel ID identifying a channel, and the lock control unit controls the lock status by the each channel, and the lock determining unit determines whether or not to change the lock status to the status where the output of the scramble key is prohibited based on the predetermined date information associated with the channel and the present date, and the lock control unit controls the lock status by the each channel based on the lock control information and a determination result of the lock determining unit.

Thus, the license information management apparatus is allowed to determine whether to lock the content obtaining unit or not by each channel which is not used.

The license information management apparatus of Claim 17 is configured in such a manner that in the license information management apparatus of any one of Claims 10 to 16 the content obtaining unit is a content decoder for decoding an encrypted content which is encrypted with a scramble key with the scramble key to generate viewable content information, and the license information is the scramble key.

Thus, the license information management apparatus is allowed to control the availability of watching the content by managing the output of the scramble key to the content decoder.

A license management information transmitting apparatus of Claim 18 transmits to the license information management apparatus of any one of Claims 10 to 17 license management information in which the individual authorization information is encrypted, the individual authorization information including authorization information indicating a presence or absence of authorization to display the content for each of a plurality of the content decoders which receives and displays a content. The license management information transmitting apparatus includes an individual authorization information generation unit, a license management information generation unit, and a lock control information generation unit.

With this configuration, the license management information transmitting apparatus generates, by the individual authorization information generation unit, the individual authorization information which arranges the authorization information for the plurality of the content obtaining units which is input from outside and is arranged based on first receiver IDs for identifying each of the content obtaining units, and encrypts, by the license management information generation unit, the individual authorization information generated by the individual authorization information generation unit to generate license management information, and generates, by the lock control information generation unit, lock control information which changes lock status of the license information management apparatus based on a second receiver ID which identifies a larger number of the content obtaining units than the first receiver ID does.

Thus, the license management information transmitting apparatus is allowed to transmit the individual authorization information in which information indicating each authorization status of a plurality of content obtaining units is arranged to the license information management apparatus and to transmit the lock control information associated with each content obtaining unit to the license information management apparatus individually.

A license information output management method of Claim 19 is a license information output management method for managing the output of license information for displaying a content to a content obtaining unit for receiving and displaying the content. The license information output management method includes a license management information decoding step, an authorization information obtaining step, an authorization status determining step, a lock control information obtaining step, a lock control process step and a license information output step.

With this method, license management information in which individual authorization information is encrypted is decoded in a license management information decoding step, the individual authorization information arranging authorization information indicating a presence or absence of authorization for each of a plurality of the content decoders which receives and displays a content to display the content based on first receiver IDs which identify each of the content obtaining units. Subsequently, the authorization information for the content obtaining unit of an output target is obtained from the individual authorization information which is decoded in the license management information decoding step based on the first receiver ID of the content obtaining unit of the output target in the authorization information obtaining step. Subsequently, in the authorization status determining step, whether or not the content obtaining unit is allowed to display the content is determined based on the authorization information obtained in the authorization information obtaining step. In the lock control information obtaining step, lock control information associated with a second receiver ID for controlling a lock status which is either a status where the output of the license information to the content obtaining unit is allowed or a status where the output of the license information to the content obtaining unit is prohibited is obtained, the second receiver ID identifying a larger number of the content obtaining units than the first receiver ID does. In the lock control process step, the lock status is controlled based on the lock control information obtained in the lock control information obtaining step. In the license information output step, the license information is output to the content obtaining unit of the output target if the content obtaining unit of the output target is determined to be allowed to display the content in the authorization status determining step and the lock status is the status where the output of the license information is allowed.

Thus, the method makes it possible to determine the authorization information based on the information indicating the authorization status of the content obtaining unit, which is included in the individual authorization information, and to control by the lock status whether to output the license information based on the determination result or to prohibit the license information from being output regardless of the determination result.

A license information management program of Claim 20 causes a computer to function as a license management information decoding unit, an authorization information obtaining unit, a lock control information obtaining unit, a lock control unit and an authorization status determining unit for managing the output of the license information for displaying the content to the content obtaining unit which receives and displays the content.

With this configuration, the license information management program decodes, by the license management information decoding unit, license management information in which individual authorization information is encrypted, the individual authorization information arranging authorization information indicating a presence or absence of authorization for each of a plurality of the content decoders which receives and displays a content to display the content based on first receiver IDs which identify each of the content obtaining units, and obtains, by the authorization information obtaining step, the authorization information for the content obtaining unit of an output target from the individual authorization information decoded in the license management information decoding step based on the first receiver ID of the content obtaining unit of the output target. The program also obtains, by the lock control information obtaining unit, lock control information associated with a second receiver ID for controlling a lock status which is either a status where the output of the license information to the content obtaining unit is allowed or a status where the output of the license information to the content obtaining unit is prohibited, the second receiver ID identifying a larger number of the content obtaining units than the first receiver ID does, and controls, by the lock control unit, the lock status based on the lock control information. The license information management program determines, by the authorization status determining unit, whether or not the content obtaining unit is allowed to display the content based on the authorization information obtained in the authorization information obtaining unit and outputs the license information to the content obtaining unit of the output target if the content obtaining unit of the output target is allowed to display the content and the lock status is the status where the output of the license information is allowed.

Thus, the license information management program makes it possible to manage whether to output the license information based on the information indicating the authorization status of the content obtaining unit, which is included in the individual authorization information or to prohibit the license information from being output regardless of the information indicating the authorization status.

Advantages of the Invention

The scramble key management apparatus, the scramble key management information transmitting apparatus, the scramble key output method, and the scramble key management program of the present invention have the following advantages.

In accordance with the invention of Claims 1, 6 or 7, it is possible to obtain the information indicating the authorization status of the content decoder without adding the decoder ID to the individual authorization information since the information indicating the authorization status of the content decoder is arranged in the individual authorization information based on the decoder ID. Thus, it is possible to arrange the information indicating the authorization status of the greater number of the content decoders in the individual authorization information with a smaller data amount and to manage the output of the scramble key to the content decoder based on the individual authorization information.

The individual authorization information including the information indicating the authorization information of the content decoders can be transmitted in a short time from when the content decoder is connected to a network even in a narrow band broadcasting because the information indicating the authorization status of a larger number of the content decoders can be arranged in the individual authorization information with a smaller data amount. Thus, the authorization status is updated soon, which allows to manage the output of the scramble key in accordance with the authorization status. Even if information indicating falsified authorization information is input by an illegal user who uses a content illegally, the illegal use of a content can be prevented and a high security can be ensured because the falsified authorization information is updated to information indicating a correct authorization information immediately.

Furthermore, if the scramble key management information itself is deleted, the scramble key is also deleted because the individual authorization information is encrypted together with the scramble key, and thus the scramble key is not output in the content decoder, which allows to prevent the content from being used illegally.

In accordance with the invention of Claim 2, it is possible to determine whether or not information indicating the authorization information of the content decoder is included in the received individual authorization information based on the decoder group ID.

Thus, it is possible to obtain the information indicating the authorization status of the content decoder associated with the scramble key management apparatus among a plurality of pieces of individual authorization information which is transmitted to the larger number of scramble key management apparatuses than the number of pieces of the information indicating the authorization status that can be arranged in the individual authorization information.

In accordance with the invention of Claim 3, since the information indicating the authorization status of the content decoder is arranged in the individual authorization information based on the decoder ID, it is possible to generate the individual authorization information which indicates the authorization status of each content decoder without adding the decoder ID. Therefore, it is possible to arrange the information indicating the authorization statuses of a larger number of the content decoders in the individual authorization information with a smaller data amount and to efficiently transmit the information indicating the authorization information of the larger number of the content decoders in a short time even in an narrow band broadcasting.

In accordance with the invention of Claim 4, it is possible to generate the individual authorization information in which one bit information indicating each authorization status of the plurality of content decoders is arranged and to transmit the information indicating the authorization information of the larger number of the content decoders in a short time.

In accordance with the invention of Claim 5, it is possible to generate individual authorization information in which a bit string is compressed and to transmit the information indicating the authorization information of the larger number of the content decoders in a short time. It is also possible to reduce the processing load of the scramble key management apparatus that receives the individual authorization information.

In accordance with the invention of Claim 8, it is possible to obtain the information indicating the authorization status of the content obtaining unit without adding the receiver ID to the individual authorization information since the information indicating the authorization status of the content obtaining unit is arranged in the individual authorization information based on the receiver ID. Therefore, it is possible to arrange the information indicating the authorization statuses of the larger number of the content decoders in the individual authorization information with a smaller data amount and to manage the output of the license information such as a scramble key to the content decoder based on the individual authorization information.

The individual authorization information including the information indicating the authorization information of the content decoders can be transmitted in a short time from when the content decoder is connected to a network even in a narrow band broadcasting because the information indicating the authorization status of a larger number of the content decoders can be arranged in the individual authorization information with a smaller data amount. Thus, the authorization status is updated soon, which allows to manage the output of the scramble key in accordance with the authorization status. Even if information indicating falsified authorization information is input by an illegal user who uses a content illegally, the illegal use of a content can be prevented and a high security can be ensured because the falsified authorization information is updated to information indicating a correct authorization information immediately.

In accordance with the invention of Claim 9, an illegal use of the content can be more reliably prevented since the availability of watching the encrypted content can be controlled by managing the output of the scramble key to the content decoder.

In accordance with the invention of Claims 10, 19 or 20, it is possible to obtain the information indicating the authorization status of the relevant content obtaining unit without adding the first receiver ID to the individual authorization information because the information indicating the authorization status of the content obtaining unit is arranged in the individual authorization information based on the first receiver ID. Thus, it is possible to arrange the information indicating the authorization status of the greater number of the content decoders in the individual authorization information with a smaller data amount and to manage the output of the license information to the content decoder based on the individual authorization information. Furthermore, the first receiver ID which is not used can be re-used by another content obtaining unit because the lock status can be changed to the status where the output of the license information to the content obtaining unit is allowed or the status where the output of the license information to the content obtaining unit is prohibited based on the second receiver ID which can discriminate a larger number of content obtaining units than the first receiver ID can.

In accordance with the invention of Claim 11, it is possible to determine whether or not the authorization information for the content obtaining unit is included in the received individual authorization information based on the group ID. Therefore, the information indicating the authorization status of the content obtaining unit associated with the license information management apparatus can be obtained among a plurality of pieces of individual authorization information which is transmitted to the larger number of scramble key management apparatuses than the number of pieces of the information indicating the authorization status that can be arranged in the individual authorization information.

In accordance with the invention of Claim 12 or 13, it is possible to reuse the first receiver ID freely as needed since the first receiver ID which has been locked and can not be used may be updated to allow the content obtaining unit to display the content again.

In accordance with the invention of Claim 14, the first receiver ID can be reused without being used by a plurality of content obtaining units because the license information management unit automatically locks the content obtaining unit without receiving the lock control information via the broadcasting wave if the present date meets a predetermined condition.

In accordance with the invention of Claim 15 or 16, it is possible to manage the display of the content by the content obtaining unit by each channel as needed and to re-use the first receiver ID by each channel.

In accordance with the invention of Claim 17, it is possible to prevent the content from being illegally used and to ensure a high security because the license information management apparatus controls the availability of watching the content encrypted with the scramble key by controlling the output of the scramble key.

In accordance with the invention of Claim 18, it is possible to generate the individual authorization information that can indicate the authorization status of each content obtaining unit without adding the first receiver ID because the information indicating the authorization status of the content obtaining unit is arranged in the individual authorization information based on the first receiver ID. Therefore, the information indicating the authorization statuses of the larger number of the content decoders can be arranged in the individual authorization information with a smaller data amount, and the information indicating the authorization statuses of the larger number of the content decoders can be transmitted in a short time even in narrow band broadcasting.

It is also possible to lock or unlock the content obtaining unit individually based on the second receiver ID which can identify the larger number of content obtaining units than the first receiver ID can and to reuse the first receiver ID, thereby allowing to transmit the individual authorization information based on the first receiver ID which identifies the smaller number of the content obtaining units even if the number of the content obtaining units is increased.

BRIEF DESCRIPTION OF THE DRAWINGS

FIG. 4A is a schematic illustration for schematically showing an example of the classification of individual contract information, groups and sub-groups input from the ECM generation unit; and FIG. 4B is a schematic illustration for schematically showing a method performed by the ECM generation unit to generate the individual contract information.

FIG. 18 is an illustration for explaining how information unique to the scramble key management apparatus of the second embodiment of the present invention, such as a receiver ID1, receiver ID2 and secret key is assigned in advance.

FIGS. 19A and 19B are illustrations for explaining how the receiver ID 1 is reused and assigned to the scramble key management apparatus according to the second embodiment of the present invention; FIG. 19A shows a default setting of a receiver ID1 and a receiver ID2 at the time of the delivery of the scramble key management apparatus; and FIG. 19B shows a receiver ID1 and a receiver ID2 which are newly issued and a receiver ID1 and a receiver ID2 which are assigned by reuse.

FIG. 20 is an illustration for explaining contents stored in the individual contract information storing unit in the third embodiment of the present invention.

Figure 1:
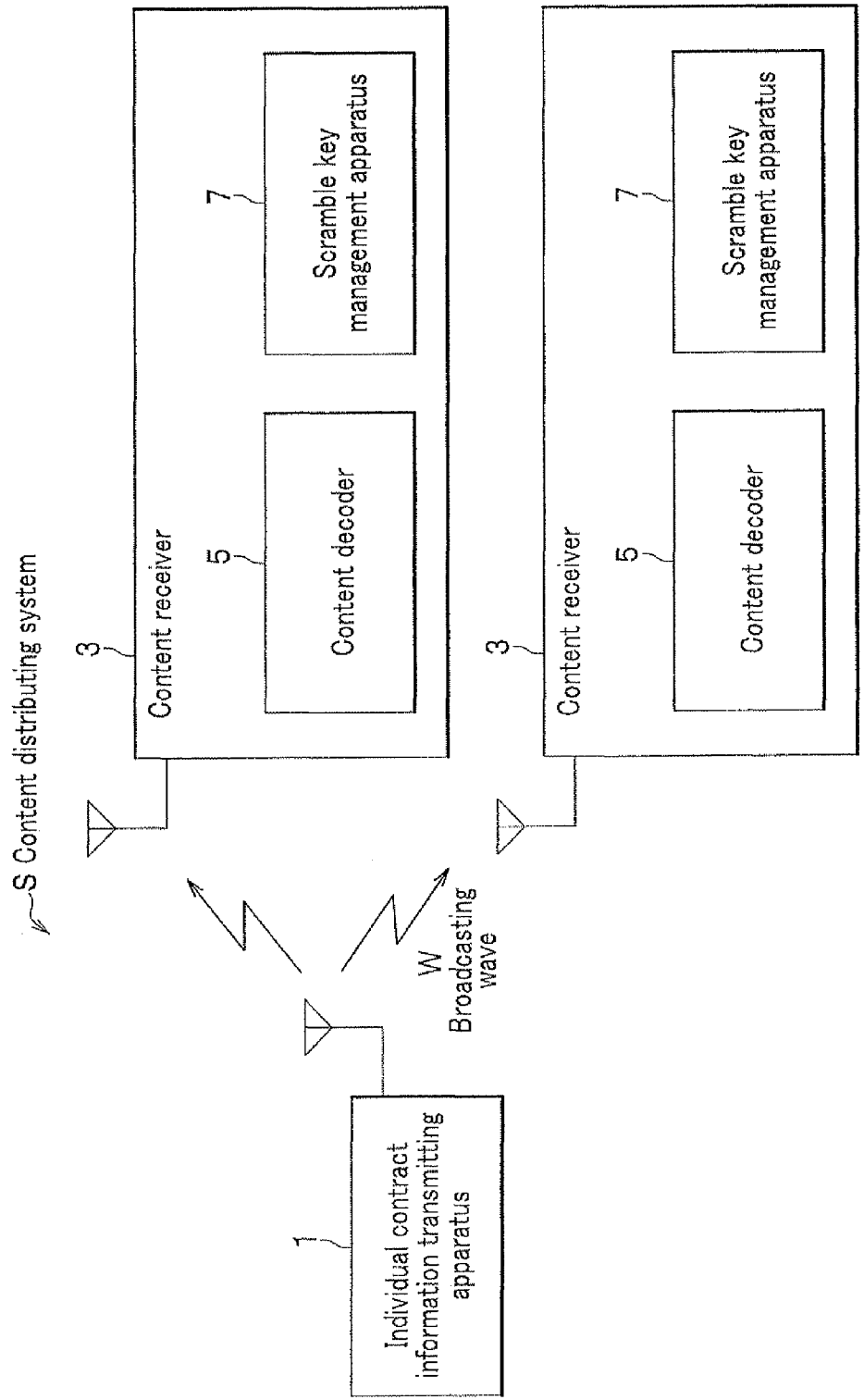
FIG. 1 is a block diagram which shows a configuration of a content distributing system of a first embodiment of the present invention including a scramble key management apparatus and an individual contract information transmitting apparatus.

DESCRIPTION OF REFERENCE NUMERALS 1, 1B Individual contract information transmitting apparatus (Scramble key management information transmitting apparatus, License management information transmitting apparatus)
12 Individual contract information generation unit (Individual authorization information generation unit)
12a Grouping unit
12b Bit string processing unit
12c Compression unit
13 ECM generation unit (Scramble key management information generation unit, license management information generation unit)
16 EMM2 generation unit (Lock control information generation unit)
5, 5B Content decoder (Content obtaining unit)
7, 7B Scramble key management apparatus (License information management apparatus)
75 ECM decoding unit (Scramble key management information decoding unit, License management information decoding unit)
76, 76B Individual contract determining unit
76a Expanding unit
76b Contract information obtaining unit (Authorization information obtaining unit)
76c Contract status determining unit (Authorization status determining unit)
77B ID1 storage unit (First receiver ID storage unit)
83 Lock release determining unit (Lock control information obtaining unit)
85 Lock determining unit
86 Lock control unit

DETAILED DESCRIPTION OF THE PREFERRED EMBODIMENTS

First Embodiment

A first embodiment of the present invention is described below with reference to the accompanying drawings.
[Configuration of Content Distributing System]

At first, a configuration of a content distributing system S of the first embodiment of the present invention including a scramble key management apparatus 7 and an individual contract information transmitting apparatus 1 is described with reference to FIG. 1. FIG. 1 is a block diagram which shows a configuration of the content distributing system S of the first embodiment of the present invention including the scramble key management apparatus 7 and the individual contract information transmitting apparatus 1.

In the content distributing system S, the individual contract information transmitting apparatus 1 distributes by broadcast wave W multiplexed content resulting from multiplexing an encrypted content which has been encrypted, a scramble key for decoding the encrypted content, individual contract information (individual authorization information) indicating a contract status (authorization status) of each content receiver 3, 3, . . . , and common contract information indicating contract information which is common to all of the content receivers 3, 3, . . . . The content receivers 3, 3, . . . receive the multiplexed content, and if there is a content receiver 3 which is under a contract, the content receiver 3 decodes the encrypted content.

The individual contract information transmitting apparatus (a scramble key management information transmitting apparatus, a license management information transmitting apparatus) 1 multiplexes the encrypted content, an ECM (scramble key management information, license management information) containing the scramble key and the individual contract information encrypted with a work key, and an EMM containing the work key and the common contract information encrypted with a device key to make multiplexed content, and transmits the multiplexed content to the content receiver 3 by broadcast wave W.

The content receiver 3 receives the multiplexed content which are transmitted from the individual contract information transmitting apparatus 1, and determines its contract status. Only if the content receiver 3 is under a contract, the content receiver 3 decodes the encrypted content. The individual contract information transmitting apparatus 1 and the content receiver 3 in the content distributing system S are described in detail below.

(Configuration of Individual Contract Information Transmitting Apparatus)

Figure 2:
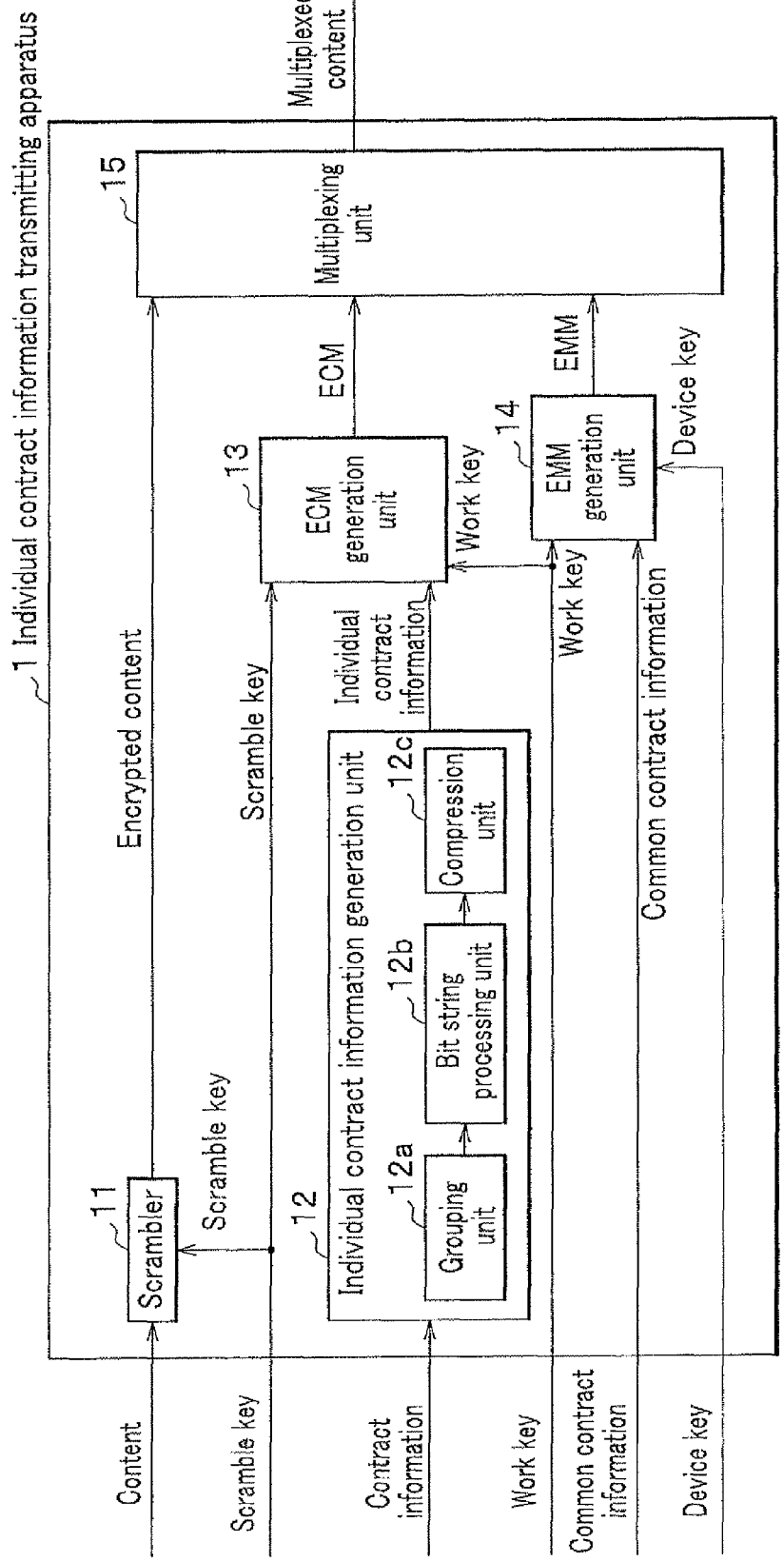
FIG. 2 is a block diagram showing a configuration of the individual contract information transmitting apparatus of the first embodiment of the present invention.

With reference to FIG. 2 (refer to FIG. 1 as appropriate), a configuration of the individual contract information transmitting apparatus 1 is firstly described. FIG. 2 is a block diagram showing the configuration of the individual contract information transmitting apparatus of the present invention. In FIG. 2, the individual contract information transmitting apparatus 1 includes a scrambler 11, an individual contract information generation unit 12, an ECM generation unit 13, an EMM generation unit 14 and a multiplexing unit 15.

The scrambler 11 encrypts a content with a scramble key input from outside of the scrambler 11 to generate an encrypted content. The encrypted content which is encrypted here is output to the multiplexing unit 15.

The content here is audio visual data or data for data broadcasting, such as those encoded by MPEG-2TS (Moving Picture Experts Group 2 Transport Stream). The scrambler 11 encrypts the payload part of a TS packet of the content, for example. The scramble key is a secret key which is changed on the second time scale.

The individual contract information generation unit (individual authorization information generation unit) 12 generates individual contract information. The individual contract information generation unit 12 here includes a grouping unit 12a, a bit string processing unit 12b and a compression unit 12c.

The grouping unit 12a classifies contract information (authorization information) indicating a contract status of each content receiver 3 which is input from outside of the grouping unit 12a into groups. All the content receivers 3 are classified into a plurality of groups in advance, and they are further classified into a plurality of sub-groups in each of the plurality of groups. Further, each content receiver 3 is assigned a receiver ID (decoder ID) which is unique to the each content receiver 3 in the sub-group.

The grouping unit 12a classifies contract information of a content receiver 3 into a group and a sub-group based on the group and the sub-group of the content receiver 3 associated with the input contract information. The group here may be, for example, a kind of manufacturer of the content receiver 3, and the sub-group may be, for example, a type of the content receiver 3 of certain manufacturer. The contract information which is grouped here is assigned a group ID and a sub-group ID, which identify its group and its sub-group, and a receiver ID, and then is output to the bit string processing unit 12b.

It is to be noted that the contract information here is one bit information. For example, if the content receiver 3 associated with the contract information is under a contract for receiving a content, the bit may be "1" while if the content receiver 3 is not under a contract, the bit may be "0". The group ID and the sub-group ID here correspond to a group ID recited in claims.

The bit string processing unit 12b arranges the contract information which has been classified by the sub-groups by the grouping unit 12a, converts the contract information into a bit string, and adds the group ID and the sub-group ID to the bit string. The information generated here is output to the compression unit 12c.

The bit string processing unit 12b arranges the contract information based on the receiver ID which is added to each piece of the contract information, and converts the contract information into a bit string. The content receiver 3, which is classified into a certain sub-group, is assigned a receiver ID (e.g. a serial number) indicating the manufactured order or the order of contract of the content receiver 3 in the sub-group, and the bit string processing unit 12b arranges the contract information in accordance with the order of the receiver ID. Thus, the individual contract information is allowed to indicate which piece of the contract information is for which content receiver 3 based on the order of the contract information without assigning the receiver ID to each piece of the contract information.

The bit string processing unit 12b sequentially generates a bit string for each sub-group regardless of whether there is a change in a contract. If bit strings have been generated for all the sub-groups, a bit string for every sub-group is sequentially generated by each sub-group from the first group repeatedly.

The compression unit 12c is a unit for losslessly compressing the bit string generated by the bit string processing unit 12b. The compression unit 12c compresses the bit string and adds a group ID and a sub-group ID to the input bit string, and outputs the bit string to the ECM generation unit 13 as the individual contract information.

Here, since the contract information of the content receivers 3, 3, . . . is represented as the bit string, the compression unit 12c can compress the bit string by encoding the bit string in accordance with a receiver contract rate indicating the ratio of the number of the content receivers 3, 3, . . . which are under receiver contracts to all the content receivers 3, 3, . . . . . An example of a method performed by the compression unit 12c for compressing the bit string is described below.

The compression unit 12c generates two-bit contract rate information based on the receiver contract rate. For example, the compression unit 12c sets "00" as the contract rate information if the receiver contract rate is 25% (0 to 37.5%), sets "01" as the contract rate information if the receiver contract rate is 50% (37.5 to 62.5%), and sets "10" as the contract rate information if the receiver contract rate is 75% (62.5 to 100). The contract rate information indicates the rate of occurrence of "1" in the bit string, and the compression unit 12c encodes the bit string based on the rate of the occurrence of "1". An encoding method based on a rate of occurrence is, for example, Huffman code or run-length Huffman code. By encoding a bit string based on the rate of occurrence, the compression unit 12c can efficiently compress information represented by the bit string. Further, the compression unit 12c adds the contract rate information, a group ID and a sub-group ID to the compressed bit string to generate individual contract information.

The ECM generation unit (a scramble key management information generation unit, a license management information generation unit) 13 is a unit for encrypting, individual contract information generated by the individual contract information generation unit 12 and the scramble key with a work key which is input from outside of the ECM generation unit 13 to generate an ECM. The ECM generated here is output to the multiplexing unit 15. The work key is a secret key per channel unit or service unit.

Figure 3:
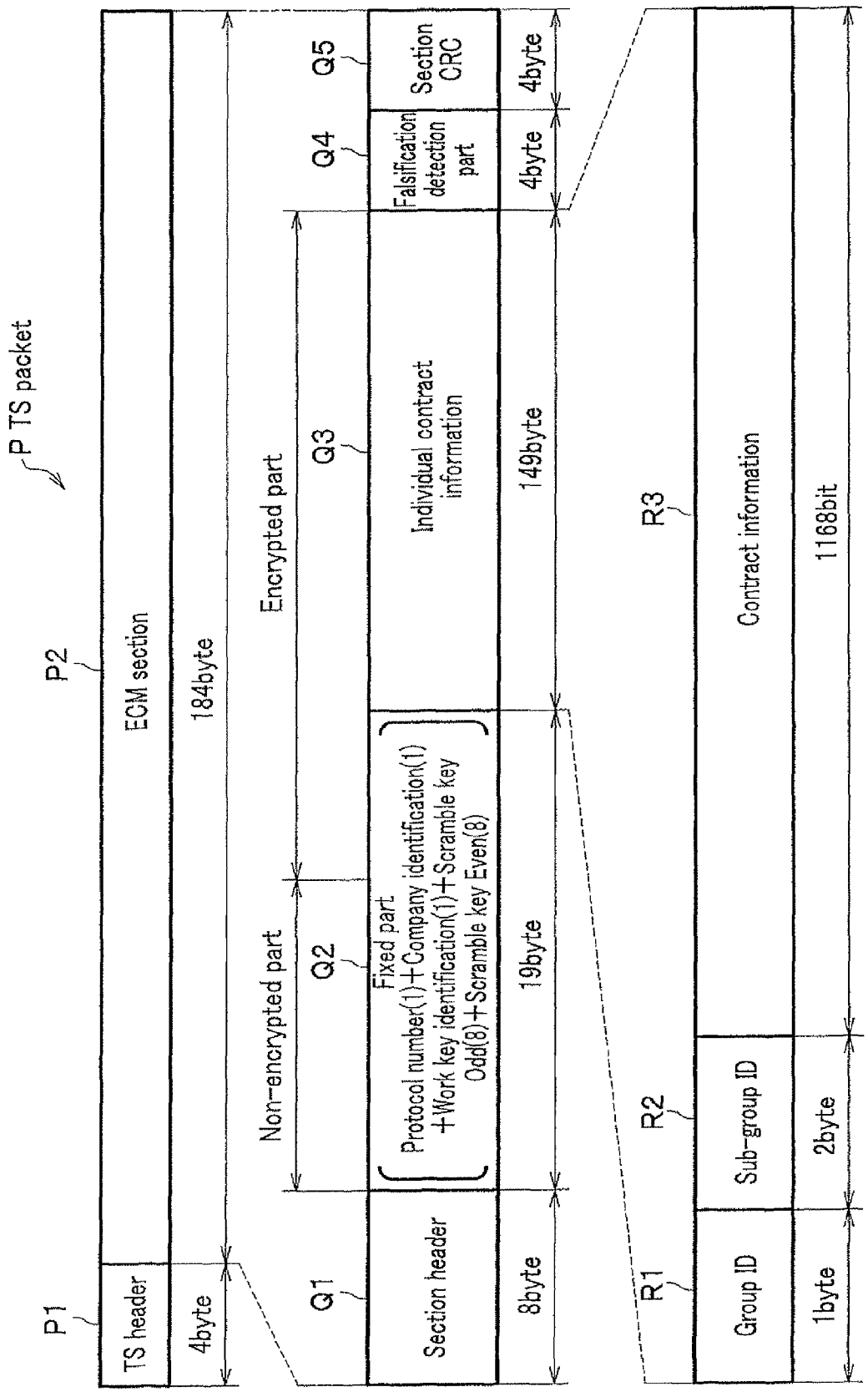
FIG. 3 is a frame format schematically showing an example configuration of a TS (Transport Stream) packet including an ECM which is generated by an ECM generation unit of the individual contract information transmitting apparatus of the first embodiment.

A configuration of an ECM is described with reference to FIG. 3 (see FIGS. 1 and 2 as appropriate). FIG. 3 is a frame format schematically showing an example configuration of a TS (Transport Stream) packet including the ECM.

The TS packet P is comprised of a TS header P1 and an ECM section P2. The ECM section P2 includes a section header Q1, a fixed part Q2, individual contract information Q3, a falsification detection part Q4 and a section CRC Q5. The fixed part Q2 here includes a protocol number indicating a kind of information included in the ECM body, company identification for identifying a company distributing the content, work key identification for identifying the work key with which the individual contract information and the scramble key are encrypted, and the scramble key (a scramble key Odd and a scramble key Even) which is encrypted with the work key.

The individual contract information Q3 is comprised of a group ID R1, a sub-group ID R2 and contract information R3. In the example shown in FIG. 3, the individual contract information Q3 may be assigned 149 byte, and the contract information R3 may be assigned information of 1168 bit which is remained after assigning 1 byte to the group ID R1 and 2 byte to the sub-group ID R2. Thus, the contract information of 1168 content receivers can be included in one TS packet P. In a conventional method for transmitting individual contract information to which a receiver ID is added, individual contract information including a receiver ID of approximately 6 byte for one content receiver 3 has to be transmitted. In the above described method, however, a receiver ID does not have to be assigned to the individual contract information Q3 since the bit string processing unit 12b arranges the contract information based on the receiver ID of each piece of contract information and converts the contract information to be a bit string. By arranging the contract information for each content receiver 3 in the individual contract information Q3, it is possible to allow the content receiver 3 which is associated with the contract information and has received the individual contract information Q3 to recognize the contract information based on the group ID R1, the sub-group ID R2 and the receiver ID.

Furthermore, since it does not need to apply the digital signature to the ECM, a signature value does not have to be arranged. Thus, it is possible to arrange greater amount of individual contract information in the ECM.

Figure 4A:
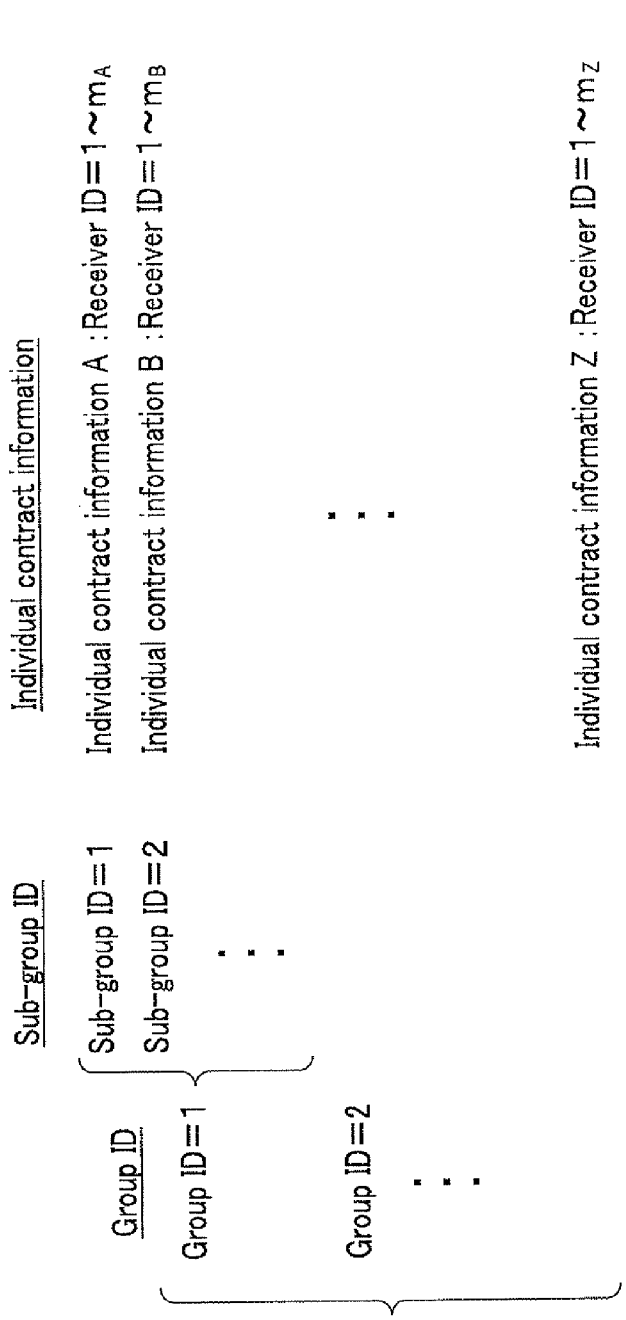
FIGS. 4A and 4B are illustrations for explaining an example method performed by the ECM generation unit of the individual contract information transmitting apparatus according to the first embodiment of the present invention to generate an ECM.
Figure 4B:
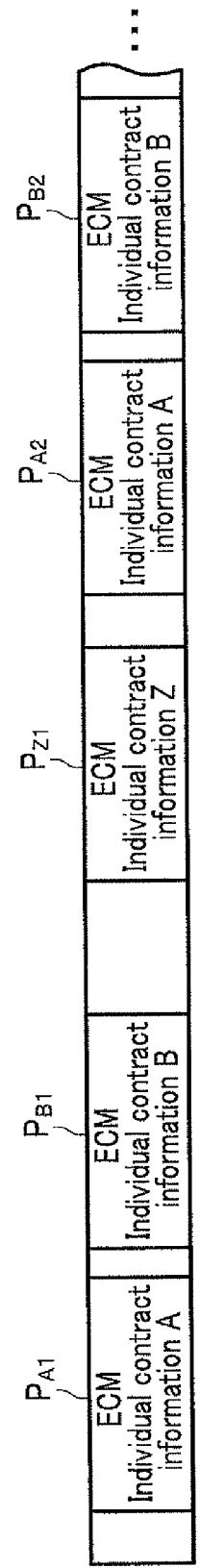

With reference to FIGS. 4A and 4B (see FIG. 1 as appropriate), an example of a method performed by the ECM generation unit 13 for generating an ECM is described. FIGS. 4A and 4B are illustrations for explaining the method performed by the ECM generation unit for generating the ECM. FIG. 4A is a schematic illustration for schematically showing classification of individual contract information, groups and sub-groups input from the ECM generation unit. FIG. 4B is a schematic illustration for schematically showing the method performed by the ECM generation unit for generating individual contract information.

As shown in FIG. 4A, each of a plurality of groups (group ID=1 to n) includes a plurality of sub-groups, and each of the sub-groups is assigned a plurality of content receivers 3, 3, . . . . For example, a sub-group whose group ID and sub-group ID are "1" is assigned mA content receivers 3, 3, . . . (receiver ID=1 to mA) in advance. The individual contract information for each sub-group is sequentially input from the individual contract information generation unit 12 to the ECM generation unit 13. For example, as shown in FIG. 4A, the individual contract information A, B to Z is sequentially input to the ECM generation unit 13 from the individual contract information generation unit 12. Furthermore, updated individual contract information A, B, . . . of which content is newly updated is also input to the ECM generation unit 13.

Then, the ECM generation unit 13 encrypts a scramble key and individual contract information to generate an ECM. As shown in FIG. 4B, the ECM generation unit 13 generates a TS packet $P_{A1}$ which is an ECM in which the individual contract information A and a scramble key are encrypted, and then generates a TS packet $P_{B1}$, which is an ECM in which the individual contract information B and a scramble key are encrypted. After the ECM generation unit 13 generates ECMs in which individual contract information that is input sequentially and scramble keys are encrypted by the ECM of the individual contract information Z as described above, the ECM generation unit 13 generates TS packets $P_{A2}$, $P_{B2}$, . . . which are ECMs in which individual contract information A, B, . . . that are newly input from the individual contract information generation unit 12 and scramble keys are encrypted, and outputs the ECMs to the multiplexing unit 15.

As described above, since the ECM generation unit 13 arranges one bit contract information, and generates the ECM from the individual contract information which is generated by compressing the bit string, the individual contract information transmitting apparatus 1 is allowed to transmit the contract information of a plurality of content receivers 3, 3 . . . to the content receivers 3, 3, . . . with a small amount of data. Moreover, it is possible to reduce the processing load of the content receivers 3, 3, . . . . For example, if the operation of the content receivers 3, 3, . . . for processing the ECM is performed by a tamper resistance module such as an IC card, the transmission time would become longer as the data amount of the ECM gets greater because the transmission rate for transmitting the ECM to the IC card in the content receiver 3 is low. By reducing the data amount of the ECM, the content receivers 3, 3, . . . are allowed to more quickly process individual contract information included in the ECM.

Since the ECM generation unit 13 repeatedly generates ECMs including the latest individual contract information after the ECM generation unit 13 generates ECMs of individual contract information for all sub-groups, the individual contract information transmitting apparatus 1 does not only transmit at the time of an event such as a new contract or cancellation of contract but also continuously transmits the latest individual contract information to all the content receivers 3, 3, . . . .

Returning to FIG. 2, the description is continued. The EMM generation unit 14 generates an EMM by encrypting common contract information and a work key that are input from outside of the EMM generation unit 14 with a device key input from outside of the EMM generation unit 14. The EMM generated here is output to the multiplexing unit 15.

The device key here is a secret key assigned to the content receivers 3, 3, . . . in advance. The device key may be a secret key which exists only one in the content distributing system S, or the device key may be assigned by the unit of each company or maker in consideration of the influence in the case where the device key is exposed.

Figure 5:
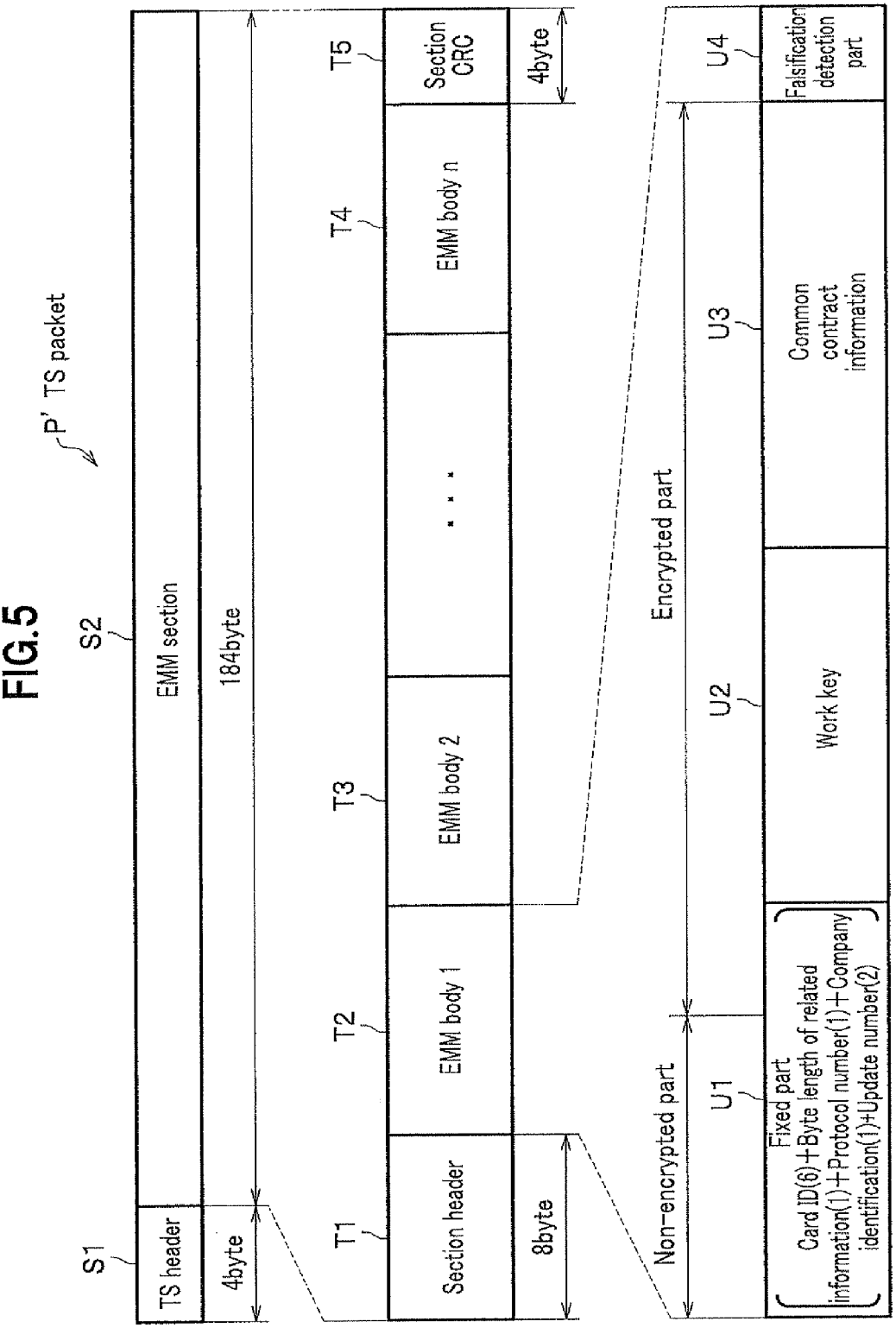
FIG. 5 is a frame format which schematically shows a configuration of a TS packet including an EMM which is generated by the EMM generation unit of the individual contract information transmitting apparatus of the first embodiment of the present invention.

A configuration of an EMM is described with reference to FIG. 5 (see FIGS. 1 and 2 as appropriate). FIG. 5 is a frame format which schematically shows a configuration of a TS packet including an EMM.

The TS packet P' is comprised of a TS header S1 and an EMM section S2. The EMM section S2 is comprised of a section header T1, a plurality of an EMM body 1 T2, an EMM body2 T3 to an EMM body n T4 and a section CRC T5. Furthermore, each EMM body (the EMM body1 T2 is used in FIG. 5) is comprised of a fixed part U1, a work key U2, common contract information U3 and a falsification detection part U4. The fixed part U1 here includes a card ID, a byte length of related information, a protocol number indicating a type of information included in the EMM body, a company identification for identifying a company distributing the content, and an update number.

The work key U2 is a work key which has been encrypted with the device key. The common contract information U3 is information common to all of the content receivers 3, 3, . . . , such as a condition of use or a use period of the work key.

Returning to FIG. 2, the description is continued. The multiplexing unit 15 multiplexes the encrypted content generated by the scrambler 11, the ECM generated by the ECM generation unit 13, the EMM generated by the EMM generation unit 14 to generate multiplexed content. The multiplexed content generated here is transmitted to the content receivers 3, 3, . . . via the broadcast wave W.

By configuring the individual contract information transmitting apparatus 1 as described above, the individual contract information transmitting apparatus 1 generates the encrypted content, the ECM in which the individual contract information and the scramble key are encrypted and the EMM, and transmits them too the content receivers 3, 3, . . . .

(Configuration of Content Receiver)

Figure 6:
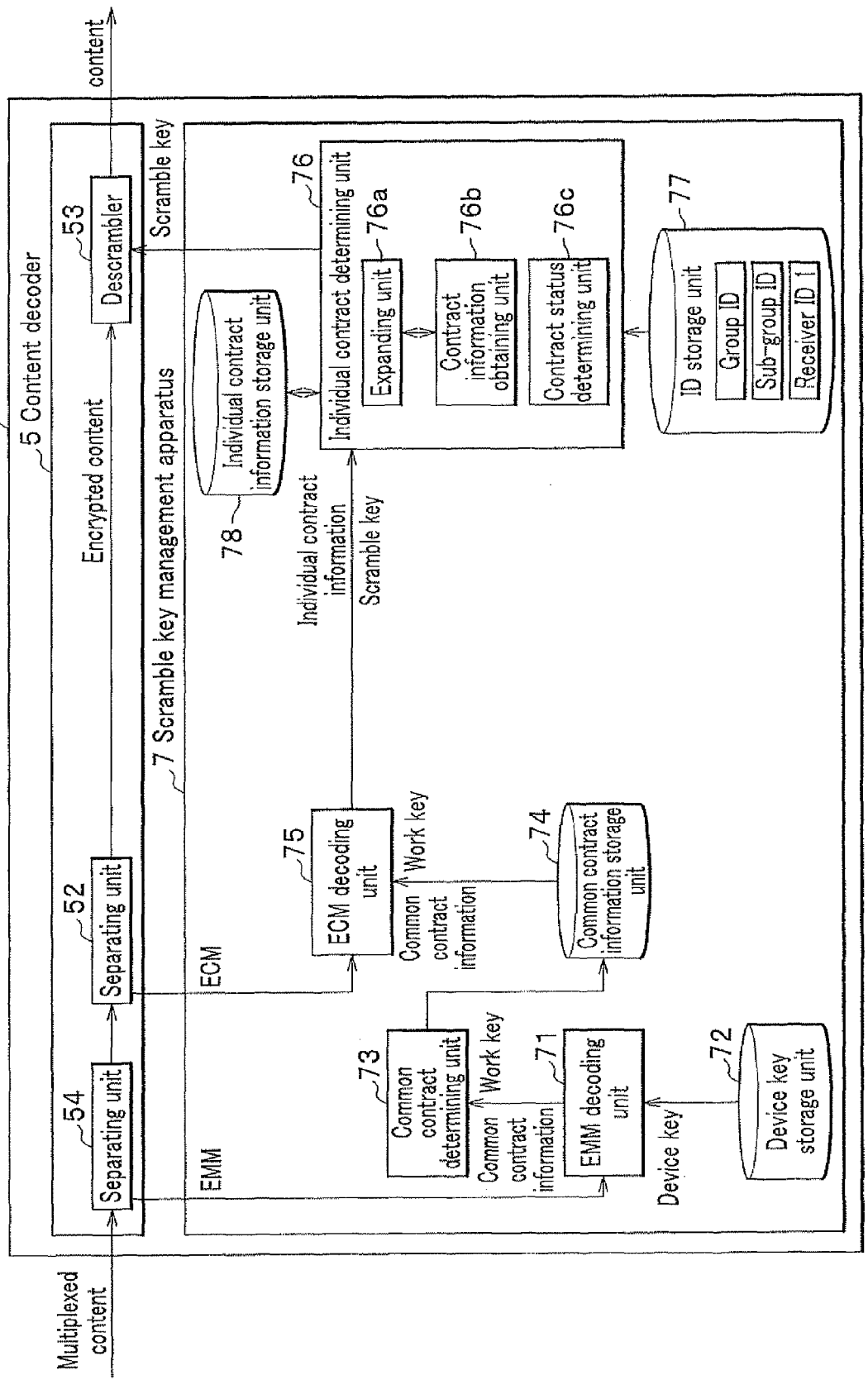
FIG. 6 is a block diagram showing a configuration of a content receiver including the scramble key management apparatus of the first embodiment of the present invention.

Next, a configuration of the content receiver 3 is described with reference to FIG. 6 (see FIG. 1 as appropriate). FIG. 6 is a block diagram showing the configuration of the content receiver including a scramble key management apparatus of the present invention. The content receiver 3 here includes a content decoder 5 and a scramble key management apparatus 7.

The content decoder (content obtaining unit) 5 receives multiplexed content transmitted from the individual contract information transmitting apparatus 1, extracts the encrypted content, decodes the encrypted content with a scramble key input from the scramble key management apparatus 7 and viewably outputs the content for displaying the content. The content decoder 5 includes a separating unit 51, a separating unit 52 and a descrambler 53.

The separating unit 51 receives the multiplexed content transmitted from the individual contract information transmitting apparatus 1 via the broadcast wave W, and separates the multiplexed EMM. The EMM which is separated here is output to an EMM decoding unit 71 of the scramble key management apparatus 7. The encrypted content and the ECM which remain after the EMM is separated from the multiplexed content is output to the separating unit 52.

The separating unit 52 separates the ECM from the multiplexed encrypted content and ECM which are input from the separating unit 51. The ECM separated here is output to an ECM decoding unit 75 of the scramble key management apparatus 7. The encrypted content is output to the descrambler 53.

The descrambler 53 decodes the encrypted content input from the separating unit 52 with a scramble key which is input from an individual contract determining unit 76 of the scramble key management apparatus 7. The contents decoded here is output to a display apparatus or the like (not shown).

The scramble key management apparatus (license information management apparatus) 7 extracts the individual contract information and the common contract information from the ECM and the EMM which are input from the content decoder 5 to determine the contract status of the content receiver 3, and manages the output of the scramble key (license information) based on the contract status. The scramble key management apparatus 7 includes an EMM decoding unit 71, a device key storage unit 72, a common contract determining unit 73, a common contract information storage unit 74, an ECM decoding unit 75, an individual contract determining unit 76, an ID storage unit 77 and an individual contract information storage unit 78.

The EMM decoding unit 71 decodes the EMM input from the separating unit 51 of the content decoder 5 with a device key stored in the device key storage unit 72 to extract the work key and the common contract information. The work key and the common contract information extracted here are output to the common contract determining unit 73.

The device key storage unit 72 stores the device key in advance and is a storage means made of a semiconductor memory or the like. The device key is a secret key which is commonly assigned in advance to all the content receivers 3, 3, . . . in the content distributing system S. The device key stored here is retrieved and used by the EMM decoding unit 71 when decoding the EMM.

The common contract determining unit 73 determines whether or not the work key is valid based on an expiration date of the work key indicated by the common contract information which has been decoded by the EMM decoding unit 71. If the work key is valid, the common contract determining unit 73 stores the work key and the common contract information in the common contract information storage unit 74.

The common contract information storage unit 74 is a storing means made of a semiconductor memory or the like for storing the common contract information and the work key input from the common contract determining unit 73. The work key and the common contract information stored here are retrieved and used by the ECM decoding unit 75 when decoding the ECM.

The ECM decoding unit (scramble key management information decoding unit, license management information decoding unit) 75 decodes the ECM input from the separating unit 52 of the content decoder 5 with the work key and the common contract information stored in the common contract information storage unit 74 to extract the scramble key and the individual contract information. When the ECM is input, the ECM decoding unit 75 retrieves the work key and the common contract information from the common contract information storage unit 74 and determines whether or not the work key is valid based on an expiration date of the work key indicated by the common contract information. If the work key is valid, the ECM decoding unit 75 decodes the ECM. The scramble key and the individual contract information which are decoded here are output to the individual contract determining unit 76.

The individual contract determining unit 76 determines the contract status of the content receiver 3 based on the individual contract information input from the ECM decoding unit 75. If the contract status of the content receiver 3 is valid, the individual contract determining unit 76 outputs the scramble key to the descrambler 53 of the content decoder 5. The individual contract determining unit 76 includes an expanding unit 76a, a contract information obtaining unit 76b and a contract status determining unit 76c.

The expanding unit 76a expands the compressed bit string included in the individual contract information input from the contract information obtaining unit 76b, which is described later. The expanding unit 76a expands the bit string which has been compressed by the compression unit 12c of the individual contract information transmitting apparatus 1 based on the contract rate information added to the bit string. The bit string expanded here and the group ID and the sub-group ID included in the individual contract information input from the ECM decoding unit 75 are output to the contract information obtaining unit 76b.

The contract information obtaining unit (authorization information obtaining unit) 76b obtains the contract information of the content receiver 3 from the bit string of the individual contract information expanded by the expanding unit 76a based on the group ID, the sub-group ID and the receiver ID stored in the ID storage unit 77. The contract information obtained here is stored in the individual contract information storage unit 78.

The individual contract information including contract information of various content receivers 3, 3, . . . is input to the contract information obtaining unit 76b from the ECM decoding unit 75 one after another. The contract information obtaining unit 76b determines whether or not the group ID and the sub-group ID included in the individual contract information ID coincides with the group ID and the sub-group ID of the content receiver 3 (content decoder 5) stored in the storage unit 77. If they do not coincide with each other, the contract information obtaining unit 76b determines that the individual contract information does not include the contract information of the content receiver 3. If they coincide with each other, the contract information obtaining unit 76b determines that the individual contract information includes the contract information of the content receiver 3, and outputs the individual contract information to the expanding unit 76a. Further, the contract information obtaining unit 76b extracts the contract information of the content receiver 3 from the individual contract information whose bit string is expanded by the expanding unit 76a based on the receiver ID which is stored in the ID storage unit 77.

Since the individual contract information here is formed in such a manner that one bit information indicating contract information is arranged in the order of the receiver ID in its bit string, the contract information obtaining unit 76b obtains, as the contract information of the content receiver 3, the one bit information positioned at the numerical order of the receiver ID counted from the left end of the bit string of the individual contract information based on the number of the receiver ID stored in the ID storage unit 77. If the receiver ID is "5", the contract information obtaining unit 76b obtains the fifth bit from the left end of the bit string of the individual contract information.

The individual contract information is transmitted from the individual contract information transmitting apparatus 1 all the time regardless of the contract status, however, the contract information obtaining unit 76b may overwrite the input contract information on the individual contract information storage unit 78 only when the contract information included in the input individual contract information and the contract information included in the individual contract information storage unit 78 are different. With this configuration, the processing load of the scramble key management apparatus 7 can be reduced.

The contract status determining unit (authorization status determining unit) 76c determines whether or not the content receiver 3 is under a contract based on the contract information stored in the individual contract information storage unit 78. If it is determined that the content receiver 3 is under the contract, the contract status determining unit 76c outputs the scramble key input from the ECM decoding unit 75 to the descrambler 53 of the content decoder 5. If it is determined that the content receiver 3 is not under the contract, the contract status determining unit 76c outputs a notification indicating that no contract is made to the descrambler 53 of the content decoder 5. The contract status determining unit 76c determines whether or not the content receiver 3 is under a contract every time the ECM is input to the ECM decoding unit 75 here, however, the contract status determining unit 76c may determine it at the time when the content receiver 3 starts to receive the multiplexed content or the descrambler 53 decodes the encrypted content, for example, or in an interval of dozens of seconds in order to reduce the processing load of the scramble key management apparatus 7 imposed by the ECMs input by a few seconds.

The ID storage unit 77 is a storage unit made of a semiconductor memory or the like for storing in advance the group ID, the sub-group ID and the receiver ID assigned to the content receiver 3 (content decoder 5) in advance. The group ID, the sub-group ID and the receiver ID stored here is retrieved and used when obtaining the contract information of the content receiver 3 from the individual contract information input from the contract information obtaining unit 76b.

The individual contract information storage unit 78 is a storage unit made of a semiconductor memory or the like for storing the contract information obtained by the contract information obtaining unit 76b. The contract information stored here is referred to and used by the contract status determining unit 76c when the contract status determining unit 76c determines the contract status.

By configuring the content receiver 3 as described above, the content receiver receives the multiplexed content and decodes the encrypted content based on the contract status of the content receiver 3.

People who try to misuse the content may delete the ECM from the multiplexed content. If the ECM is deleted, however, the scramble key required to decode the encrypted content can not be obtained either. Thus, the scramble key management apparatus 7 enables to prevent the misuse of the content.

Since the individual contract information transmitting apparatus 1 transmits the encrypted content together with the individual contract information to the content receiver 3 all the time, the individual contract information storage unit 78 always stores the latest contract information. Therefore, if a person who has not made a contract and tries to misuse the content obtains the work key in any way, falsifies the individual contract information and inputs the falsified individual contract information to the content receiver 3, the person can watch the content illegally. However, the content receiver 3 receives correct individual contract information a short time later by receiving the multiplexed content, and the contract information of the individual contract information storage unit 78 is overwritten. Thus, the scramble key management apparatus 7 enables to prevent illegal use of the content and to ensure high security even if a digital signature is not added to the individual contract information. The scramble key management apparatus 7 is preferably implemented by a tamper resistance module such as an IC card from a safety stand point.

The content receiver 3 may be incorporated in a display apparatus (not shown), and the scramble key management apparatus 7 may be configured as a device separated from the content decoder 5.

Furthermore, the scramble key management apparatus 7 may be realized as functional programs in a computer, each of which realizes each unit. By combining the each functional program, the functional programs may be operated as a scramble key management program.

<Operation of Content Distributing System>

Figure 7:
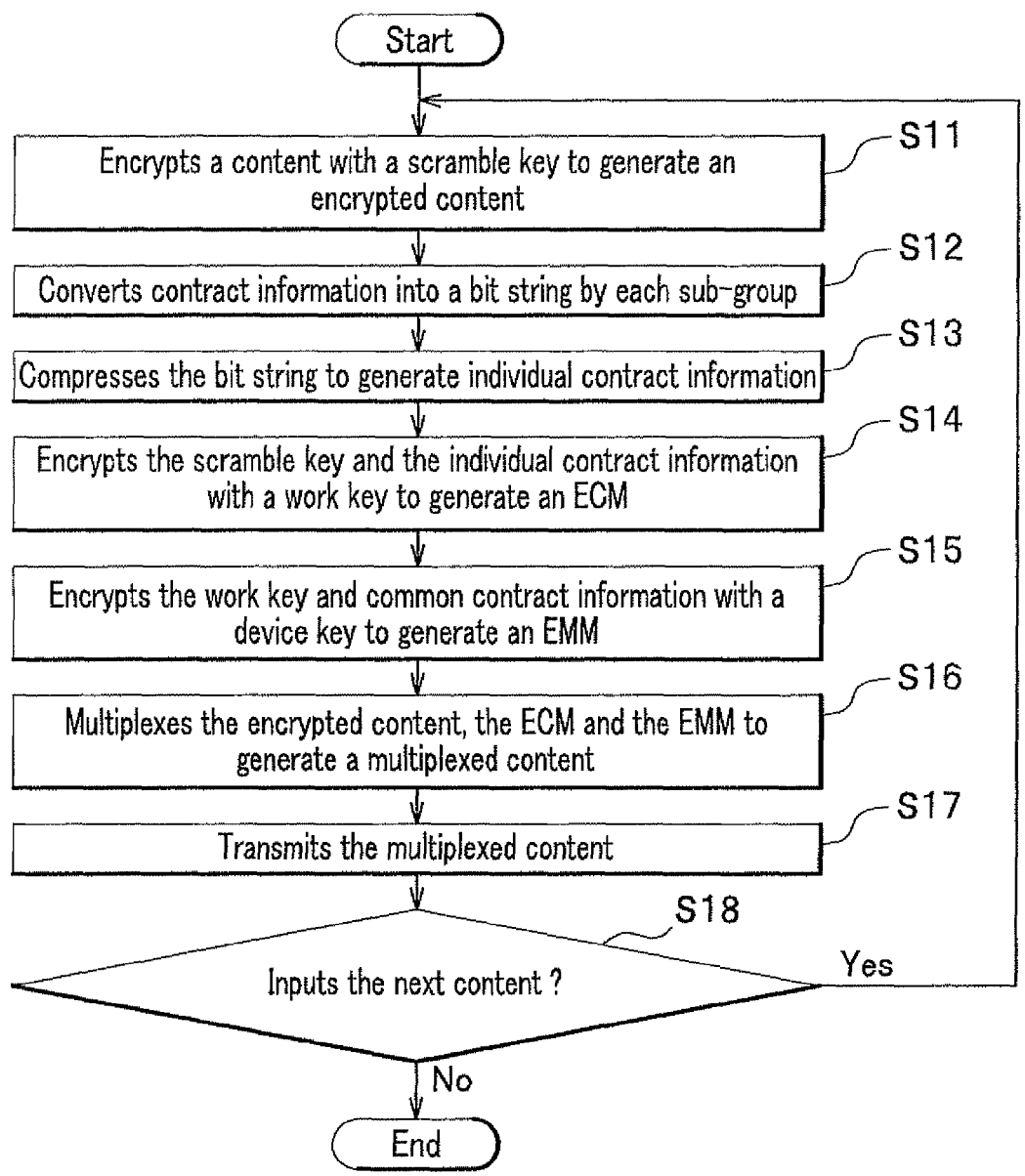
FIG. 7 is a flow chart showing an operation of the individual contract information transmitting apparatus according to the first embodiment of the present invention for generating and transmitting multiplexed content.
Figure 8:
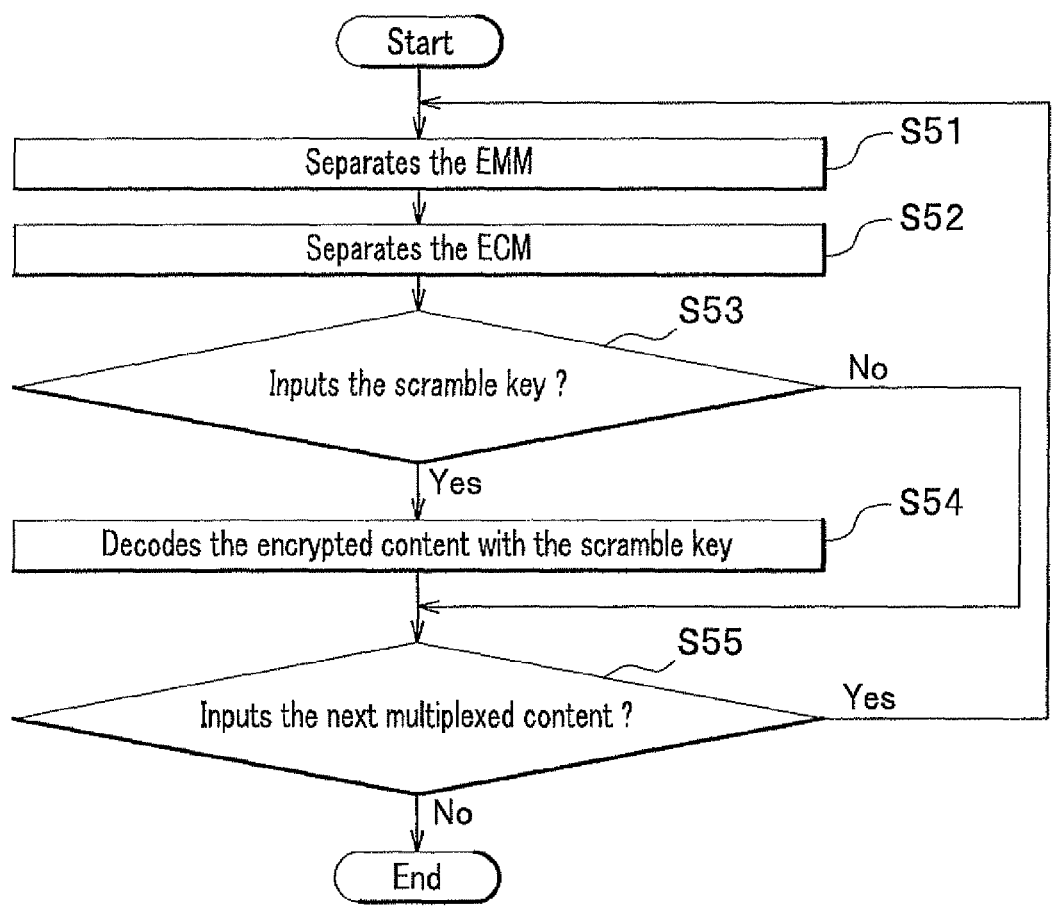
FIG. 8 is a flow chart showing an operation of a content decoder for receiving the multiplexed content and decoding the contents.
Figure 9:
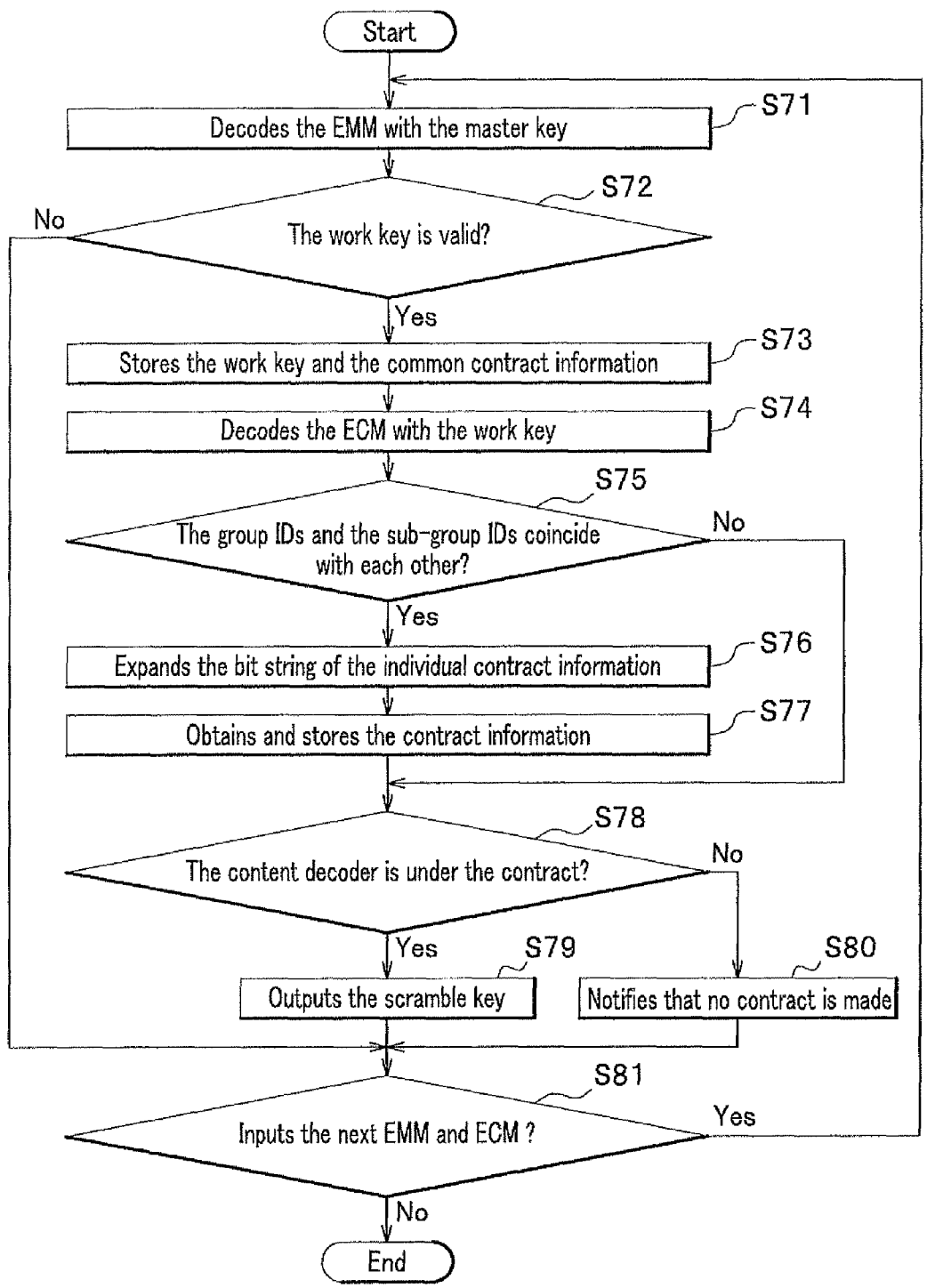
FIG. 9 is a flow chart showing an operation of the scramble key management apparatus of the first embodiment of the present invention for determining a contract status from the EMM and the ECM input thereto.

An operation of the content distributing system S of the present invention is described with reference to FIGS. 7 to 9.

<Operation of Individual Contract Information Transmitting Apparatus>

An operation of the individual contract information transmitting apparatus 1 for transmitting the multiplexed content is described with reference to FIG. 7 (see FIGS. 1 and 2 as appropriate). FIG. 7 is a flow chart showing the operation of the individual contract information transmitting apparatus according to the present invention for generating and transmitting multiplexed content.

The individual contract information transmitting apparatus 1 encrypts a content which is input from outside of the individual contract information transmitting apparatus 1 with a scramble key by the scrambler 11 to generate an encrypted content (Step 11). The individual contract information transmitting apparatus 1 converts contract information which has been grouped by the grouping unit 12a into a bit string for a sub-group, and adds a group ID and a sub-group ID to the bit string by the bit string processing unit 12b of the individual contract information generation unit 12 (Step 12). New contract information is input to the individual contract information transmitting apparatus 1 one after another, and every time the new contract information is input, the new contract information is grouped by the grouping unit 12a of the individual contract information generation unit 12.

Subsequently, the individual contract information transmitting apparatus 1 losslessly compresses the bit string which has been generated in Step 12 by the compression unit 12c and adds the group ID and the sub-group ID to generate individual contract information (Step 13). The individual contract information transmitting apparatus 1 encrypts by the ECM generation unit 13 the individual contract information generated in Step 13 and the scramble key used for encrypting the content in Step 11 with a work key which is input from outside of the individual contract information transmitting apparatus 1 to generate the ECM (Step 14).

The individual contract information transmitting apparatus 1 encrypts the work key used in Step 14 and common contract information which is input from outside of the individual contract information transmitting apparatus 1 with a device key which is input from outside of the individual contract information transmitting apparatus 1 to generate an EMM (Step 15). The individual contract information transmitting apparatus 1 multiplex the encrypted content generated in Step 11, the ECM generated in Step 14 and the EMM generated in Step 15 by the multiplexing unit 15 to generate multiplexed content (Step 16). The individual contract information transmitting apparatus 1 transmits the multiplexed content generated by the multiplexing unit 15 in Step 16 to the content receivers 3, 3, . . . via the broadcast wave W (Step 17).

Furthermore, the individual contract information transmitting apparatus 1 determines whether or not the next content is input to the scrambler 11 (Step 18). If the next content is input (Yes in Step 18), the processing returns to Step 11 and performs the operation for encrypting the next content by the scrambler 11 and the following operations. If the next content is not input (No in Step 18), the processing terminates the operation without performing any operation.

(Operation of Content Decoder)

Next, an operation of the content decoder 5 for receiving the multiplexed content and decoding the encrypted content is described with reference to FIG. 8 (see FIGS. 1 and 6 as appropriate). FIG. 8 is a flow chart showing the operation of the content decoder for receiving the multiplexed content and decoding the encrypted content.

The content decoder 5 separates the EMM from the multiplexed content input from outside of the content decoder 5 by the separating unit 51 (Step 51). The EMM separated here is output to the scramble key management apparatus 7.

The content decoder 5 further separates by the separating unit 52 the ECM from the multiplexed encrypted content and ECM from which the EMM has been separated in Step 51 (Step 52). The ECM separated here is output to the scramble key management apparatus 7.

The content decoder 5 determines whether or not a scramble key is input to the descrambler 53 from the scramble key management apparatus 7 (Step 53). If the scramble key is input (Yes in Step 53), the content decoder 5 decodes the encrypted content obtained by separating the ECM in Step 52 with the scramble key by the descrambler 53 (Step 54). If the scramble key is not input (No in Step 53), the processing proceeds to Step 55.

The content decoder 5 then determines whether or not the next multiplexed content is input to the separating unit 51 (Step 55). If the next multiplexed content is input (Yes in Step 55), the processing returns to Step 51 and performs the operation for separating the EMM from the multiplexed content and the following operations. If the next multiplexed content is not input (No in Step 55), the processing terminates the operation.

(Operation of Scramble Key Management Apparatus)

An operation of the scramble key management apparatus 7 for determining a contract status from the EMM and the ECM input thereto is described with reference to FIG. 9 (see FIGS. 1 and 6 as appropriate). FIG. 9 is a flow chart showing the operation of the scramble key management apparatus 7 of the present invention for determining a contract status from the EMM and the ECM input thereto.

The scramble key management apparatus 7 decodes the EMM input from the content decoder 5 with the device key stored in the device key storage unit 72 by the EMM decoding unit 71 (Step 71). With this operation, the common contract information and the work key can be obtained.

Then the scramble key management apparatus 7 determines by the common contract determining unit 73 whether or not the work key is valid based on the common contract information obtained in Step 71 (Step 72). If the work key is not valid (No in Step 72), the processing proceeds to Step 81. If the work key is valid (Yes in Step 72), the scramble key management apparatus 7 stores the common contract information and the work key obtained in Step 71 in the common contract information storage unit 74 (Step 73).

Subsequently, the scramble key management apparatus 7 retrieves the common contract information and the work key which has been stored in the common contract information storage unit 74 in Step 73 by the ECM decoding unit 75. If the work key is within its expiration date which is indicated by the common contract information, the scramble key management apparatus 7 decodes the ECM input from the content decoder 5 with the work key (Step 74; scramble key management information decoding step). Thus, the individual contract information and the scramble key can be obtained.

(Authorization Information Obtaining Step)

Subsequently, the scramble key management apparatus 7 determines by the contract information obtaining unit 76b whether or not the group ID and the sub-group ID added to the individual contract information obtained in Step 74 coincides with the group ID and the sub-group ID stored in the ID storage unit 77 (Step 75). If they do not coincide with each other (No in Step 75), the processing proceeds to Step 78. If they coincide with each other (Yes in Step 75), the scramble key management apparatus 7 expands the compressed bit string of the individual contract information obtained in Step 74 by the expanding unit 76a of the individual contract determining unit 76 (Step 76). Furthermore, the scramble key management apparatus 7 extracts the contract information of the content receiver 3 from the individual contract information based on the receiver ID stored in the ID storage unit 77 by the contract information obtaining unit 76b and stores the contract information in the individual contract information storage unit 78 (Step 77).

Subsequently, the scramble key management apparatus 7 determines by the contract status determining unit 76c whether or not the content receiver 3 is under a contract based on the contract information stored in the individual contract information storage unit 78 (Step 78; authorization status determining step). If the content receiver 3 is under the contract (Yes in Step 78), the scramble key management apparatus 7 outputs the scramble key obtained in Step 74 to the content decoder 5 By the contract status determining unit 76c (Step 79; key output step). If the content receiver 3 is not under the contract (No in Step 78), the scramble key management apparatus 7 outputs information notifying that the content receiver 3 is not under a contract to the content decoder 5 by the contract status determining unit 76c (Step 80).

Then, the scramble key management apparatus 7 determines whether or not the next EMM and ECM are input to the EMM decoding unit 71 and the ECM decoding unit 75 (Step 81). If the next EMM and ECM are input to the EMM decoding unit 71 and the ECM decoding unit 75 (Yes in Step 81), the processing returns to Step 71 and performs the operation for decoding the EMM with the device key and the following operations. If the next EMM and ECM are not input to the EMM decoding unit 71 and the ECM decoding unit 75 (No in Step 81), the processing terminates the operation.

The scramble key management apparatus 7 described here is configured to expand the bit string by the expanding unit 76a (Step 76) after determining by the contract information obtaining unit 76b whether or not the group ID and the sub-group ID added to the individual contract information coincide with the group ID and the sub-group ID stored in the ID storage unit 77 (Step 75). With this configuration, it is enough to expand only the bit string of the individual contract information including the contract information of the content receiver by the expanding unit 76a of the individual contract determining unit 76 of the scramble key management apparatus 7, which allows to reduce the processing load imposed by expansion.

For example, however, all of the group ID, the sub-group ID and the bit string may be compressed by the compression unit 12c of the individual contract information generation unit 12 of the individual contract information transmitting apparatus 1 to generate the individual contract information, and the individual contract information may be expanded by the expanding unit 76a of the individual contract determining unit 76 of the scramble key management apparatus 7. After the scramble key management apparatus 7 expands the input individual contract information by the expanding unit 76a (Step 76), the contract information obtaining unit 76b may determine whether or not the group ID and the sub-group ID included in the individual contract information coincide with the group ID and the sub-group ID stored in the ID storage unit 77 (Step 75).

With the above described configuration of the content distributing system S, it is possible to dramatically enhance the transmission efficiency of the individual contract information while ensuring the same level of high security compared with conventional methods in which individual contract information encrypted with a mater key unique to a receiver is transmitted, or individual contract information which is encrypted with a common work key and is added a digital signature is transmitted.

In the case where individual contract information is transmitted to ten-million content receivers 3, 3, . . . at the transmission rate of 10 kbps, the conventional method in which individual contract information encrypted with a master key is transmitted takes approximately 70 hours to transmit all individual contract information, and the conventional method in which individual contract information which is added a digital signature is transmitted takes 25 hours. On the other hand, in the content distributing system S according to the present invention, the individual contract information transmitting apparatus 1 is allowed to transmit individual contract information of all content receivers 3, 3, . . . in 21 minutes and 46 seconds.

In the first embodiment of the present invention, the scramble key management apparatus 7 obtains the scramble key by decoding scramble key management information in which the individual contract information and the scramble key are encrypted by the ECM decoding unit 75, however, the scramble key may not be included in the scramble key management information, and the scramble key may be received by an ECM which is different from the individual contract information or an EMM, or may be obtained via a storage medium such as a magnetic disk.

The scramble key management apparatus (license information management apparatus) 7 is configured to manage the output of the scramble key (license information) from the individual contract determining unit 76 to the descrambler 53 of the content decoder (content obtaining unit) 5 based on the contract information stored in the individual contract information storage unit 78, however, the content may not be encrypted by the scrambler 11 (see FIG. 2) of the individual contract information transmitting apparatus 1 and may be transmitted in a non-scrambled status, and the license information management apparatus 7 may directly control the availability of watching the content based on the contract information. In this case, an output control unit for controlling the propriety of output of the content is provided to the content obtaining unit 5 shown in FIG. 6 instead of the descrambler 53, and the license information management apparatus 7 manages the output of the content by using, as license information output from the individual contract determining unit 76, contract information indicating whether or not the receiver is under a contract instead of the scramble key to control the propriety of the output of the content by the output control unit.

Second Embodiment

Next, configurations of an individual contract information transmitting apparatus 1B and a scramble key management apparatus 7B according to a second embodiment of the present invention are described with reference to the accompanying drawings as appropriate.

Figure 12:
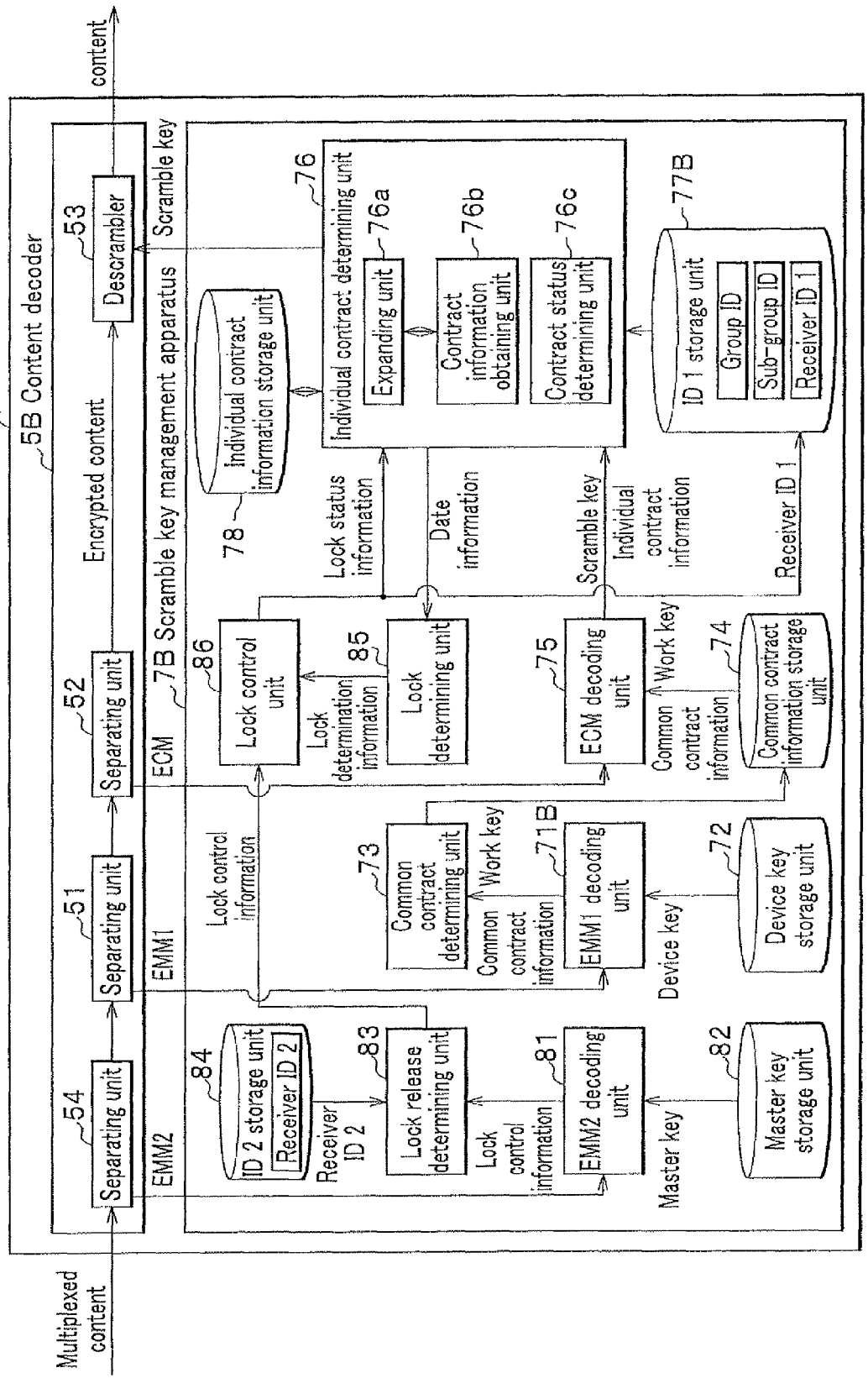
FIG. 12 is a block diagram showing a configuration of a content receiver including the scramble key management apparatus of the second embodiment of the present invention.

In the second embodiment, instead of the individual contract information transmitting apparatus 1 and the content receivers 3, 3, . . . according to the first embodiment shown in FIG. 1, a content distributing system S is configured by using an individual contract information transmitting apparatus 1B (see FIG. 10) and a content receiver 3B (see FIG. 12). The content receiver 3B (see FIG. 12) is configured by using the content decoder 5B and the scramble key management apparatus 7B instead of the content decoder 5 and the scramble key management apparatus 7.

At first, the difference between the first embodiment and the second embodiment is explained. Similarly to the content distributing system S of the first embodiment, in the content distributing system S of the second embodiment, the individual contract information transmitting apparatus 1B distributes multiplexed content resulting from multiplexing an encrypted content which has been encrypted, a scramble key for decoding the encrypted content, individual contract information (individual authorization information) indicating contract statuses (authorization status) of each content receivers 3, 3, . . . , and common contract information indicating contract information which is common to all of the content receivers 3B, 3B, . . . by a broadcast wave W. The content receivers 3B, 3B, . . . receive the multiplexed content, and if there is a content receiver 3B which is under a contract, the content receiver 3B decodes (output) the encrypted content in a status where the content is watchable.

In the first embodiment, a plurality of content receivers 3, 3, . . . is grouped, and the individual contract information for content receivers 3, 3, . . . in a group is arranged as a bit string. Thus, the individual contract information can be efficiently transmitted to all the content receivers 3, 3, . . . . However, the number of the content receivers 3, 3, . . . that can be practically used in the system is about tens of millions of the content receivers 3, 3, . . . . This means that the total number of the receiver IDs to which the individual contract information can be transmitted is also about tens of millions, and if one receiver ID is assigned to one content receiver 3, it is necessary to keep the production of the content receivers 3 below the number of the receiver IDs. However, all the content receivers 3, 3, . . . may not be under a contract, or there may be a content receiver 3 to which the individual contract information does not have to be transmitted since the content receiver 3 does not have any receiving history for a long time although it is under a contract.

In the second embodiment, such a content receiver 3B to which the individual contract information does not have to be transmitted is determined, and the content receiver 3B is locked (invalidated) to be in a status the content receiver 3B can not use the individual contract information associated with the ID assigned to the content receiver 3B. To be more specific, the output of the scramble key (license information) from the scramble key management apparatus (license information management apparatus) 7B to the content decoder (content obtaining unit) 5B based on a receiver ID1 (a first receiver ID) assigned to the content receiver 3B is set to be prohibited. This allows to increase the upper limit of the production of the content receivers 3B by assigning the receiver ID1 to a newly produced content receiver 3B for reuse.

In addition to configuring to lock the content receiver 3B in a status where the output of the scramble key from the scramble key management apparatus 7B to the content decoder 5B is prohibited, the second embodiment is configured in such a manner that, in order to release the lock of the content receiver 3B which has been locked before to allow the output of the scramble key from the scramble key management apparatus 7B to the content decoder 5B, a receiver ID2 (a second receiver ID) which is fixed and unique to a content receiver 3B is assigned to the content receiver 3B, and a lock control information for locking or releasing a lock is transmitted based on the receiver ID2 so that a locking or releasing operation can be performed with a complete control.

A configuration for this is described in detail below.

The individual contract information transmitting apparatus (a license management information transmitting apparatus) 1B multiplexes the encrypted content, ECM (license management information) in which the scramble key and the individual contract information are encrypted with a work key, an EMM1 (a first EMM) in which the work key and the common contract information are encrypted with a device key, and an EMM2 (a second EMM, lock control information) in which lock control information is encrypted with a master key and which is assigned a receiver ID2 to generate a multiplexed content, and transmits the multiplexed content to the content receiver 3B by broadcast wave W.

The content receiver 3B receives the multiplexed content which is transmitted from the individual contract information transmitting apparatus 1B, and determines its contract status. Only if the content receiver 3B is under a contract, the content receiver 3B decodes the encrypted content. The individual contract information transmitting apparatus 1 and the content receiver 3B in the content distributing system S are described in detail below.

(Configuration of Individual Contract Information Transmitting Apparatus)

Figure 10:
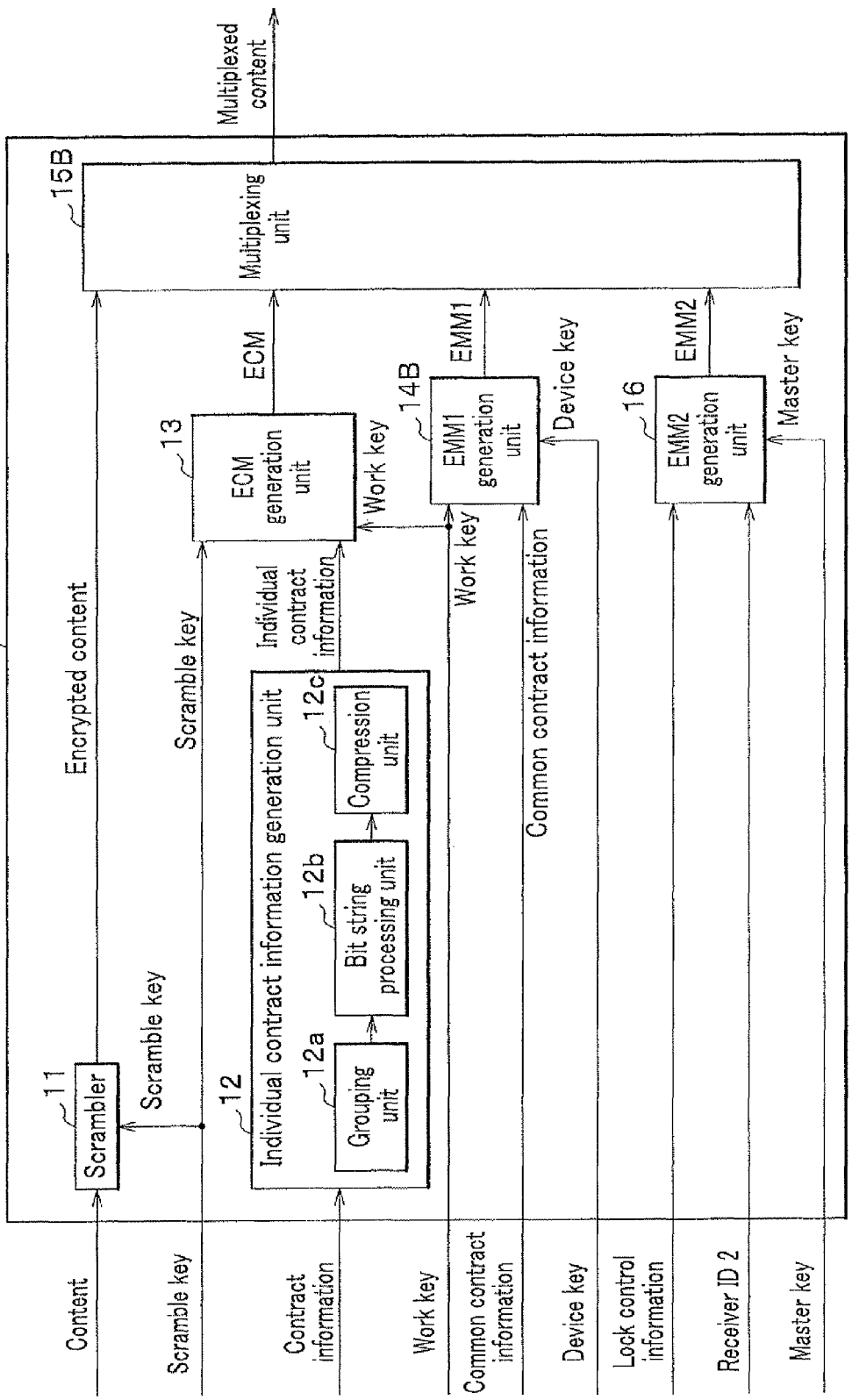
FIG. 10 is a block diagram showing a configuration of an individual contract information transmitting apparatus of a second embodiment of the present invention.

A configuration of the individual contract information transmitting apparatus 1B is firstly described with reference to FIG. 10 (refer to FIG. 1 as appropriate). FIG. 10 is a block diagram showing the configuration of the individual contract information transmitting apparatus of the present invention. In FIG. 10, the individual contract information transmitting apparatus 1B includes a scrambler 11, an individual contract information generation unit 12, an ECM generation unit 13, an EMM 1 generation unit 14B, an EMM 2 generation unit 16 and a multiplexing unit 15.

The scrambler 11, the individual contract information generation unit (individual authorization information generation unit) 12, the ECM generation unit (license management information generation unit) 13 are the same as those of the first embodiment shown in FIG. 2, and thus the same reference numerals are assigned and the detailed description thereof is omitted. The EMM1 generation unit 14B corresponds to the EMM generation unit 14 of the first embodiment shown in FIG. 2, and an EMM1 generated is the same as the EMM shown in FIG. 5, and thus the detailed description thereof is omitted. The EMM2 is input to the multiplexing unit 15B in addition to the encrypted content, the ECM and the EMM1, and the multiplexing unit 15B multiplex the input information.

The receiver ID1 in the second embodiment corresponds to the receiver ID of the first embodiment and is assigned to each content receiver 3B as, for example, a 24 bit ID for identifying a transmission target of the individual contract information. The receiver ID1 may be reused later, and when the receiver ID1 is assigned, the receiver ID1 which has never been used or is not currently used is assigned under the management of a broadcasting company.

The receiver ID2 (a second receiver ID) is, for example, a 48 bit ID which can identify substantially unlimited number of content receivers 3B and is assigned to each content receiver 3B as a unique ID which is never changed (configured by a manufacturer code, a model code and a serial number, etc.).

The EMM2 generation unit (lock control information generation unit) 16 generates an EMM2 (second EMM) in which the lock control information input from outside is encrypted with a master key input form outside and a receiver ID2 is assigned. The EMM2 generated here is output to the multiplexing unit 15B.

It is to be noted that the master key is a secret key which is unique to each content receiver 3B and is assigned in advance to each content receiver 3B based on the receiver ID2 assigned to the content receiver 3B.

Figure 11:
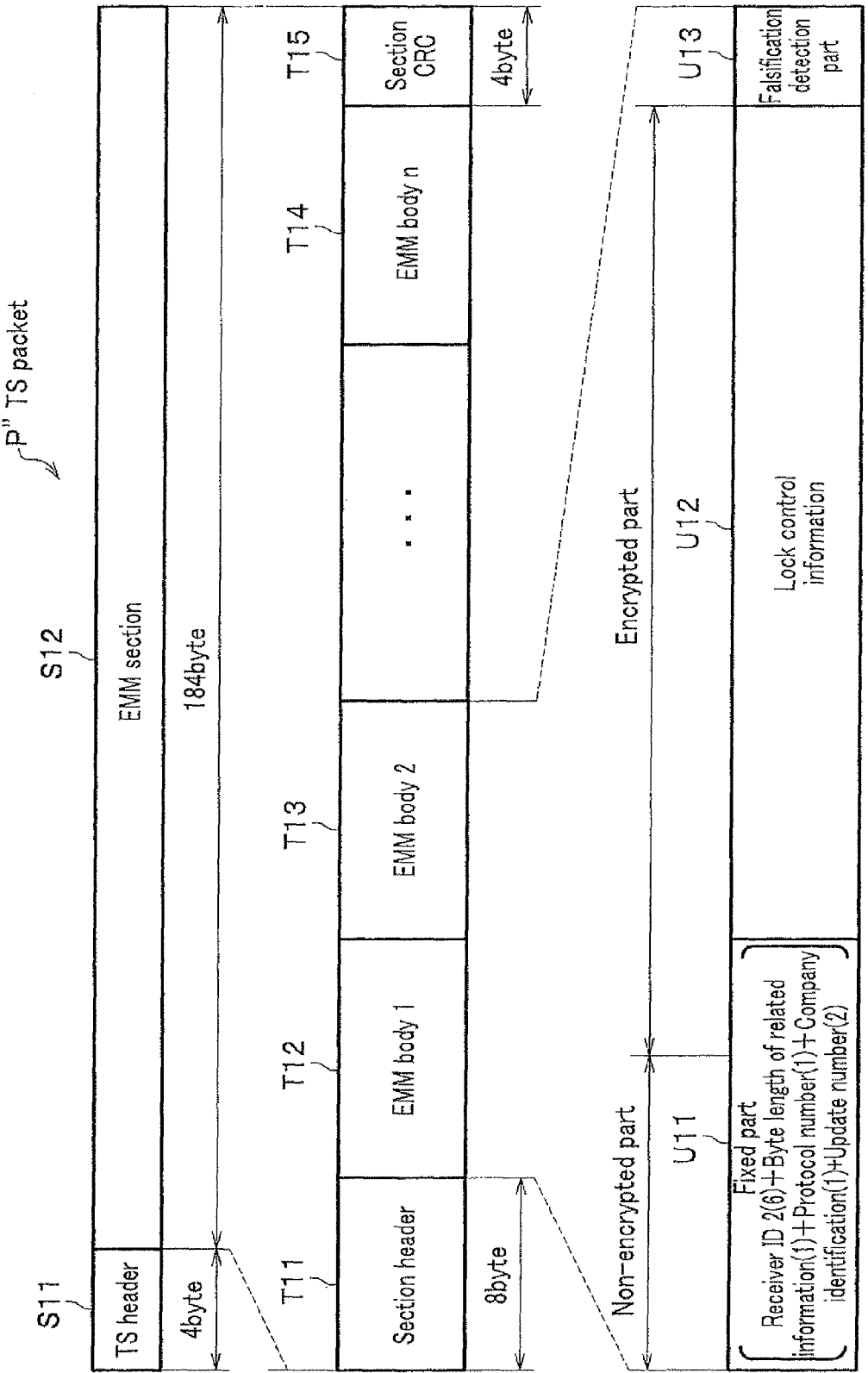
FIG. 11 is a frame format which schematically shows a configuration of a TS packet including an EMM2 generated by an EMM2 generation unit of the individual contract information transmitting apparatus of the second embodiment of the present invention.

A configuration of the EMM2 is described with reference to FIG. 11 (see FIGS. 1 and 10 as appropriate). FIG. 11 is a frame format which schematically shows a configuration of a TS packet including the EMM2.

The TS packet P' is comprised of a TS header S11 and an EMM section S12. The EMM section S12 is comprised of a section header T11, a plurality of EMM body 1 T12, EMM body 2 T13, EMM body n T14 and a section CRC T15. Furthermore, each EMM body (the EMM body1 T12 is used in FIG. 11) is comprised of a fixed part U11, lock control information U12 and a falsification detection part U13. The fixed part U11 here includes a receiver ID2, a byte length of related information, a protocol number indicating a type of information included in the EMM body, a company identification for identifying a company distributing the content, and an update number.

Returning to FIG. 10, the description is continued. The multiplexing unit 15B multiplexes the encrypted content generated by the scrambler 11, the ECM generated by the ECM generation unit 13, the EMM1 generated by the EMM1 generation unit 14B and the EMM2 generated by the EMM2 generation unit 16 to generate multiplexed content. The multiplexed content generated here is transmitted to the content receivers 3B, 3B, . . . via the broadcast wave W.

By configuring the individual contract information transmitting apparatus 1B as described above, the individual contract information transmitting apparatus 1B generates the encrypted content, the ECM in which the individual contract information and the scramble key are encrypted, the EMM1 and the EMM2, and transmits them too the content receivers 3B, 3B, . . . .

(Configuration of Content Receiver)

Next, a configuration of the content receiver 3B is described with reference to FIG. 12 (see FIG. 1 as appropriate). FIG. 12 is a block diagram showing the configuration of the content receiver including a scramble key management apparatus of the second embodiment of the present invention. The content receiver 3B here includes a content decoder 5B and a scramble key management apparatus 7B.

The content decoder (content obtaining unit) 5B receives the multiplexed content transmitted from the individual contract information transmitting apparatus 1B, extracts the encrypted content, decodes the encrypted content with a scramble key (license information) input from the scramble key management apparatus (license information management apparatus) 7B and viewably outputs the content for displaying the content. The content decoder 5B includes a separating unit 54, a separating unit 51, a separating unit 52 and a descrambler 53.

The separating unit 54 receives the multiplexed content transmitted from the individual contract information transmitting apparatus 1B via the broadcast wave W, and separates the multiplexed EMM2. The EMM2 which is separated here is output to an EMM2 decoding unit 81 of the scramble key management apparatus 7B. The encrypted content, the ECM and the EMM1 which remain after the EMM2 is separated from the multiplexed content are output to the separating unit 51.

The separating unit 51 separates the EMM1 from the multiplexed encrypted content, ECM and EMM1 input from the separating unit 54. The EMM1 separated here is output to the EMM1 decoding unit 71B of the scramble key management apparatus 7B. The encrypted content and the ECM are output to the separating unit 52.

The separating unit 52 separates the ECM from the multiplexed encrypted content and ECM which are input from the separating unit 51. The ECM separated here is output to an ECM decoding unit 75 of the scramble key management apparatus 7B. The encrypted content is output to the descrambler 53.

The descrambler 53 decodes the encrypted content input from the separating unit 52 with a scramble key which is input from an individual contract determining unit 76B of the scramble key management apparatus 7B. The contents decoded here is output to a display apparatus or the like (not shown).

The scramble key management apparatus (license information management apparatus) 7B extracts the individual contract information, the common contract information and the lock control information from the ECM, the EMM1 and the EMM2 which are input from the content decoder 5B to determine the contract status and the lock status of the content receiver 3B, and manages the output of the scramble key (license information) based on the contract status and the lock status. The scramble key management apparatus 7B includes an EMM1 decoding unit 71B, a device key storage unit 72, a common contract determining unit 73, a common contract information storage unit 74, an ECM decoding unit 75, an individual contract determining unit 76B, an ID1 storage unit 77B (a first receiver ID storage unit), an individual contract information storage unit 78, the EMM2 decoding unit 81, a master key storage unit 82, a lock release determining unit 83, an ID2 storage unit 84, a lock determining unit 85 and the lock control unit 86.

The EMM1 decoding unit 71B decodes the EMM1 input from the separating unit 51 of the content decoder 5B with a device key stored in the device key storage unit 72 to extract the work key and the common contract information. The work key and the common contract information extracted here are output to the common contract determining unit 73.

The device key storage unit 72 stores the device key in advance and is a storage means made of a semiconductor memory or the like. The device key is a secret key which is commonly assigned in advance to all the content receivers 3B, 3B, . . . in the content distributing system S. The device key stored here is retrieved and used by the EMM1 decoding unit 71B when decoding the EMM1.

The common contract determining unit 73 determines whether or not the work key is valid based on an expiration date of the work key indicated by the common contract information which has been decoded by the EMM1 decoding unit 71B. If the work key is valid, the common contract determining unit 73 stores the work key and the common contract information in the common contract information storage unit 74.

The common contract information storage unit 74 is a storing means made of a semiconductor memory or the like for storing the common contract information and the work key input from the common contract determining unit 73. The work key and the common contract information stored here are retrieved and used by the ECM decoding unit 75 when decoding the ECM.

The ECM decoding unit (license management information decoding unit) 75 decodes the ECM input from the separating unit 52 of the content decoder 5B with the work key and the common contract information stored in the common contract information storage unit 74 to extract the scramble key and the individual contract information. When the ECM is input, the ECM decoding unit 75 retrieves the work key and the common contract information from the common contract information storage unit 74 and determines whether or not the work key is valid based on an expiration date of the work key indicated by the common contract information. If the work key is valid, the ECM decoding unit 75 decodes the ECM. The scramble key and the individual contract information which are decoded here are output to the individual contract determining unit 76B.

The individual contract determining unit 76B determines the contract status and the lock status of the content receiver 3 based on the individual contract information input from the ECM decoding unit 75 and the lock status information input from the lock control unit 86 described later. If the contract status of the content receiver 3 is valid and the content receiver 3 is not locked, the individual contract determining unit 76 outputs the scramble key to the descrambler 53 of the content decoder 5B. The individual contract determining unit 76B includes an expanding unit 76a, a contract information obtaining unit 76b and a contract status determining unit 76c.

The expanding unit 76a expands the compressed bit string included in the individual contract information input from the contract information obtaining unit 76b, which is described later. The expanding unit 76a expands the bit string which has been compressed by the compression unit 12c of the individual contract information transmitting apparatus 1B based on the contract rate information added to the bit string. The bit string expanded here and the group ID and the sub-group ID included in the individual contract information input from the ECM decoding unit 75 are output to the contract information obtaining unit 76b.

The contract information obtaining unit (authorization information obtaining unit) 76b obtains the contract information of the content receiver 3B from the bit string of the individual contract information expanded by the expanding unit 76a based on the group ID, the sub-group ID and the receiver ID1 stored in the ID1 storage unit 77B. The contract information obtained here is stored in the individual contract information storage unit 78.

The individual contract information including contract information of various content receivers 3B, 3B, . . . is input to the contract information obtaining unit 76b from the ECM decoding unit 75 one after another. The contract information obtaining unit 76b determines whether or not the group ID and the sub-group ID included in the input individual contract information coincides with the group ID and the sub-group ID of the content receiver 3B (content decoder 5B) stored in the ID1 storage unit 77B. If they do not coincide with each other, the contract information obtaining unit 76b determines that the individual contract information does not include the contract information of the content receiver 3B. If they coincide with each other, the contract information obtaining unit 76b determines that the individual contract information includes the contract information of the content receiver 3B, and outputs the individual contract information to the expanding unit 76a. Further, the contract information obtaining unit 76b extracts the contract information of the content receiver 3B from the individual contract information whose bit string is expanded by the expanding unit 76a based on the receiver ID1 which is stored in the ID1 storage unit 77B.

Since the individual contract information here is formed in such a manner that one bit information indicating contract information is arranged in the order of receiver IDs 1 in its bit string, the contract information obtaining unit 76b obtains, as the contract information of the content receiver 3B, the one bit information positioned at the numerical order of the receiver ID1 counted from the left end of the bit string of the individual contract information based on the number of the receiver ID1 stored in the ID1 storage unit 77B. If the receiver ID1 is "5", the contract information obtaining unit 76b obtains the fifth bit from the left end of the bit string of the individual contract information.

The individual contract information is transmitted from the individual contract information transmitting apparatus 1B all the time regardless of the contract status, however, the contract information obtaining unit 76b may overwrite the input contract information on the individual contract information storage unit 78 only when the contract information included in the input individual contract information and the contract information included in the individual contract information storage unit 78 are different. With this configuration, the processing load of the scramble key management apparatus 7B can be reduced.

The contract status determining unit (authorization status determining unit) 76c determines whether or not the content receiver 3B is under a contract based on the contract information stored in the individual contract information storage unit 78. If it is determined that the content receiver 3B is under the contract, the contract status determining unit 76c outputs the scramble key input from the ECM decoding unit 75 to the descrambler 53 of the content decoder 5B. If it is determined that the content receiver 3B is not under the contract, the contract status determining unit 76c outputs a notification indicating that no contract is made to the descrambler 53 of the content decoder 5B. The contract status determining unit 76c determines whether or not the content receiver 3B is under a contract every time the ECM is input to the ECM decoding unit 75 here, however, the contract status determining unit 76c may determine it at the time when the content receiver 3B starts to receive the multiplexed content or the descrambler 53 decodes the encrypted content, for example, or in an interval of dozens of seconds in order to reduce the processing load of the scramble key management apparatus 7B imposed by the ECMs input by a few seconds.

Further, the contract status determining unit 76c outputs the scramble key to the descrambler 53 of the content decoder 5B based on the contract information stored in the individual contract information storage unit 78 if the content receiver 3B is in a status where its lock is released (a status where the output of the scramble key is allowed) based on the lock status information. If the content receiver 3B is in a status where the content receiver 3B is locked (a status where the output of the scramble key is prohibited), the contract status determining unit 76c prohibits the output of the scramble key to the descrambler 53 of the content decoder 5B regardless of the contract information.

The contract status determining unit 76c also stores date information, such as a purchase date of the content receiver 3B, a date when broadcasting is received at last and a date when a receiver contract is cancelled, in the individual contract information storage unit 78 and retrieves the stored date information to output it to the lock determining unit 85 which is described later.

The ID1 storage unit 77B (a first receiver ID storage unit) is a storage unit made of a semiconductor memory or the like for storing in advance the group ID, the sub-group ID and the receiver ID1 which are assigned to the content receiver 3B in advance.

The group ID, the sub-group ID and the receiver ID1 stored here is retrieved and used when the contract information obtaining unit 76b obtains the contract information of the content receiver 3B from the input individual contract information.

The receiver ID1 stored in the ID1 storage unit 77B is updated to be a newly assigned receiver ID1 when the lock control unit 86 releases the lock of the content receiver 3.

The individual contract information storage unit 78 is a storage unit made of a semiconductor memory or the like for storing the contract information obtained by the contract information obtaining unit 76b. The contract information stored here is referred to and used by the contract status determining unit 76c when the contract status determining unit 76c determines the contract status.

The individual contract information storage unit 78 further stores date information, such as a purchase date of the content receiver 3B, a date when broadcasting is received at last and a date when a receiver contract is cancelled. The stored date information is retrieved by the individual contract determining unit 76B and is output to the lock determining unit 85 to be referred to and used when performing the lock determination processing.

The EMM2 decoding unit 81 decodes the EMM2 input by the separating unit 54 of the content decoder 5B with a master key stored in the master key storage unit 82 to extract lock control information. The lock control information decoded here is output to the lock control unit 86.

The master key storage unit 82 is a storage unit made of a semiconductor memory or the like for storing the master key in advance. The master key is a secret key unique to each content receiver 3B, 3B, . . . . The master key stored here is retrieved and used when the EMM2 decoding unit 81 decodes the EMM2.

The lock release determining unit (lock control information obtaining unit) 83 determines whether or not the input lock control information is information for the content receiver 3B based on the lock control information decoded by the EMM2 decoding unit 81. If the input lock control information is information for the content receiver 3B, the lock control information is output to the lock control unit 86.

The lock release determining unit 83 determines whether or not the receiver ID2 added to the input lock control information coincides with the receiver ID2 of the content receiver 3B stored in the ID2 storage unit 84. If they coincide with each other, the lock release determining unit 83 determines that the lock control information is the lock control information for the content receiver 3B and outputs the lock control information to the lock control unit 86.

It has been described that the individual contract information transmission apparatus 1B (see FIG. 10) transmits the lock control information by using the EMM (EMM2), however, the lock control information to which the receiver ID2 is added may be transmitted by using the ECM instead of the EMM. In this case, the scramble key management apparatus 7B extracts and obtains the lock control information associated with the receiver ID2 from the ECM separated from the multiplexed content the content decoder 5B has received.

The ID2 storage unit 84 is a storage unit made of a semiconductor memory or the like for storing in advance the receiver ID2 assigned to the content receiver 3B in advance. The receiver ID2 stored here is retrieved and used when the lock release determining unit 83 determines whether or not the input lock control information is information for the content receiver 3B.

The lock determining unit 85 detects a period in which the content receiver 3B has not been receiving broadcasting based on the date information, such as a purchase date of the content receiver 3B, a date when broadcasting is received at last and a date when a receiver contract is cancelled, which is stored in the individual contract information storage unit 78 and is input via the individual contract determining unit 76B and the present date obtained by an internal clock (not shown) provided to the content receiver 3B. The lock determining unit 85 further determines whether to change the lock status to be a status where the output of the scramble key to the content decoder 5B from the scramble key management apparatus 7B is prohibited, and outputs lock determination information which is the result of the process to the lock control unit 86.

The present date information may be obtained via the broadcast wave W. In this case, information including a content, an ECM, an EMM1, an EMM2 and SI (Service Information) including TOT (Time Offset Table) may be multiplexed and transmitted when the individual contract information transmission apparatus 1B generates a multiplexed content. A separating unit for separating SI may be provided to the content decoder 5B of the content receiver 3B to detect the SI including TOT so that the date information is obtained.

The lock control unit 86 performs a lock control process for setting the lock status based on the lock control information input by the lock release determining unit 83 or the lock determination information input by the lock determining unit 85.

The lock control unit 86 determines whether the input lock control information is information for releasing a lock (changing the lock status to allow the output) or information for locking a lock (changing the lock status to prohibit the output), performs the lock control process based on the lock control information and outputs the lock status information after the lock control process to the individual contract determining unit 76B.

If the input lock control information is information for releasing a lock, the lock control unit 86 rewrites the receiver ID1 stored in the ID1 storage unit 77B as the receiver ID1 which is added to the lock control information and is newly assigned to the content receiver 3.

If the lock status is changed to be the status where the output of the scramble key is prohibited, the content receiver 3 keeps the status where the output of the scramble key is prohibited until the content receiver 3 receives information for releasing the lock via the EMM2 transmitted by the individual authorization transmitting unit 1B.

If the lock determination information is input to the lock control unit 86 from the lock determining unit 85, the lock control unit 86 changes the lock status to the status where the output of the scramble key is prohibited, and outputs thee lock status information indicating the status where the output of the scramble key is prohibited to the individual contract determining unit 76B.

The lock status information may be stored in a storage means made of a semiconductor memory or the like, and the individual contract determining unit 76B may refer to the lock status information stored in the storage means. The storage means may be provided to the lock control unit 86 or the individual contract information storage unit 78 may be used for the storage means.

By configuring the content receiver 3B as described above, the content receiver 3B receives the multiplexed content and decodes the encrypted content based on the contract status of the content receiver 3B. By controlling the output of the scramble key to the descrambler 53 to prohibit the output of the scramble key based on the lock status information, it is possible to substantially invalidate the receipt of the contract information for the receiver ID1 and to make the receiver ID1 be in a non-use status. Therefore, the receiver ID1 can be assigned to another content receiver 3B for reuse.

The scramble key management apparatus 7B is preferably implemented with a tamper resistance module such as an IC card from a safety standpoint.

The content receiver 3B may be incorporated in a display apparatus (not shown), and the scramble key management apparatus 7B may be configured as a device separated from the content decoder 5B.

Furthermore, the scramble key management apparatus 7B may be realized as functional programs in a computer, each of which realizes each unit. By combining the each functional program, the functional programs may be operated as a scramble key management program.

<Operation of Content Distributing System>

Next, an operation of the content distributing system S of the second embodiment of the present invention is described with reference to FIGS. 13 to 17.

<Operation of Individual Contract Information Transmitting Apparatus>

Figure 13:
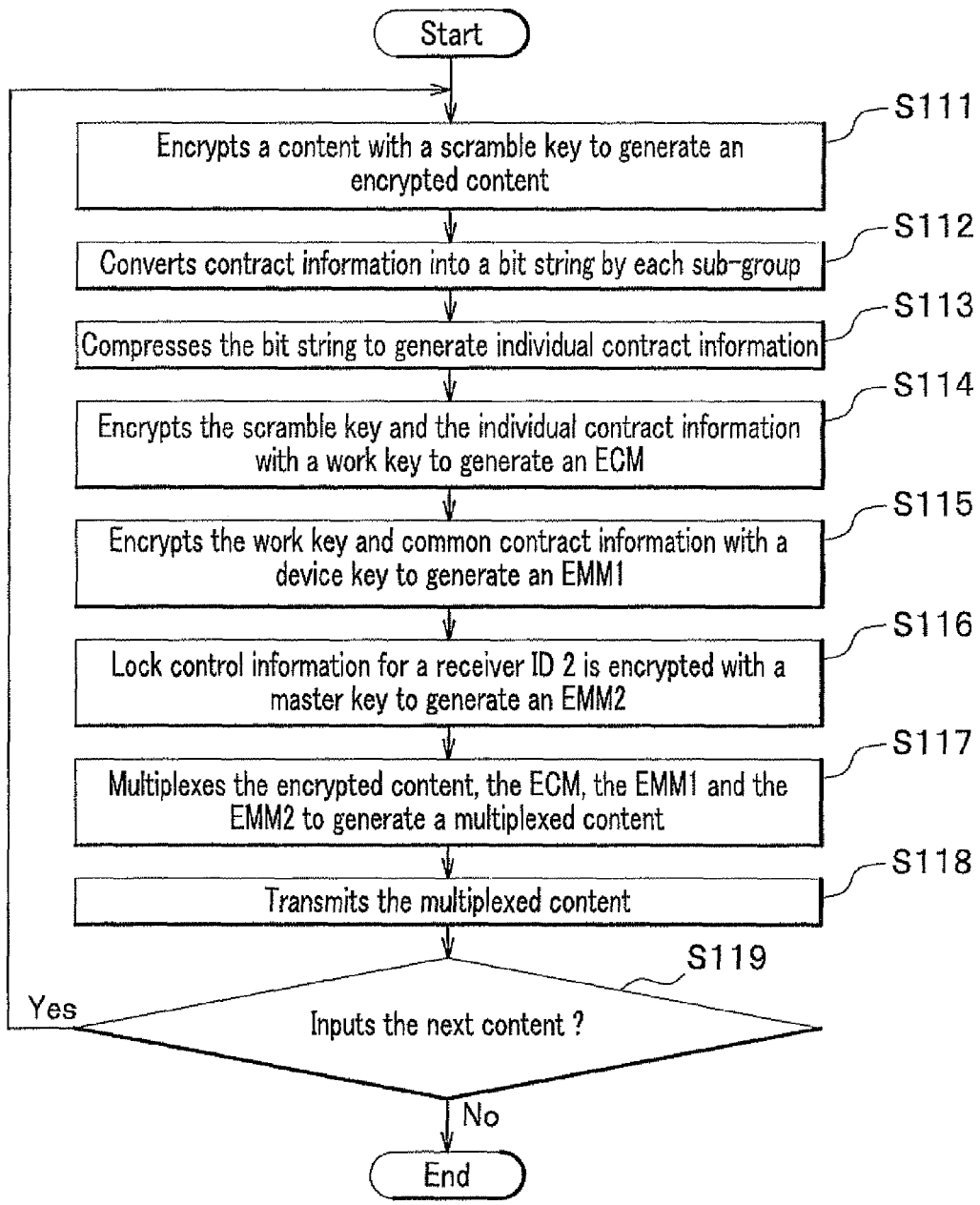
FIG. 13 is a flow chart showing an operation of the individual contract information transmitting apparatus according to the second embodiment of the present invention for generating and transmitting the multiplexed content.

An operation of the individual contract information transmitting apparatus 1B for transmitting the multiplexed content is described with reference to FIG. 13 (see FIGS. 1 and 10 as appropriate). FIG. 13 is a flow chart showing the operation of the individual contract information transmitting apparatus according to the second embodiment of the present invention for generating and transmitting the multiplexed content.

The individual contract information transmitting apparatus 1B encrypts a content which is input from outside of the individual contract information transmitting apparatus 1B with a scramble key by the scrambler 11 to generate an encrypted content (Step 111). The individual contract information transmitting apparatus 1B converts contract information which has been grouped by the grouping unit 12a into a bit string for a sub-group, and adds a group ID and a sub-group ID to the bit string by the bit string processing unit 12b of the individual contract information generation unit 12 (Step 112). New contract information is input to the individual contract information transmitting apparatus 1B one after another, and every time the new contract information is input, the new contract information is grouped by the grouping unit 12a of the individual contract information generation unit 12.

Subsequently, the individual contract information transmitting apparatus 1B losslessly compresses the bit string which has been generated by the compression unit 12c in Step 12 and adds the group ID and the sub-group ID to generate individual contract information (Step 113). The individual contract information transmitting apparatus 1B encrypts the individual contract information generated by the ECM generation unit 13 in Step 13 and the scramble key used for encrypting the content in Step 111 with a work key which is input from outside of the individual contract information transmitting apparatus 1 to generate the ECM (Step 114).

The individual contract information transmitting apparatus 1B encrypts by the EMM1 generation unit 14B the work key used in Step 114 and common contract information which is input from outside of the individual contract information transmitting apparatus 1 with a device key which is input from outside of the individual contract information transmitting apparatus 1 to generate the EMM1 (Step 115).

Furthermore, the individual contract information transmitting apparatus 1B generates by the EMM2 generation unit 16 an EMM2 in which the lock control information input from outside is encrypted with a master key input from outside and a receiver ID2 input from outside is included (Step 116).

The individual contract information transmitting apparatus 1B multiplexes by the multiplexing unit 15B the encrypted content generated in Step 111, the ECM generated in Step 114, the EMM1 generated in Step 115, and the EMM2 generated in Step 116 to generate a multiplexed content (Step 117). The individual contract information transmitting apparatus 1B then transmits the multiplexed content generated by the multiplexing unit 15B in Step 117 to the content receivers 3B, 3B, . . . via the broadcast wave W (Step 118).

Furthermore, the individual contract information transmitting apparatus 1B determines whether or not the next content is input to the scrambler 11 (Step 119). If the next content is input (Yes in Step 119), the processing returns to Step 111 and performs the operation for encrypting the next content by the scrambler 11 and the following operations. If the next content is not input (No in Step 119), the processing terminates the operation without performing any operation.

(Operation of Content Decoder)

Figure 14:
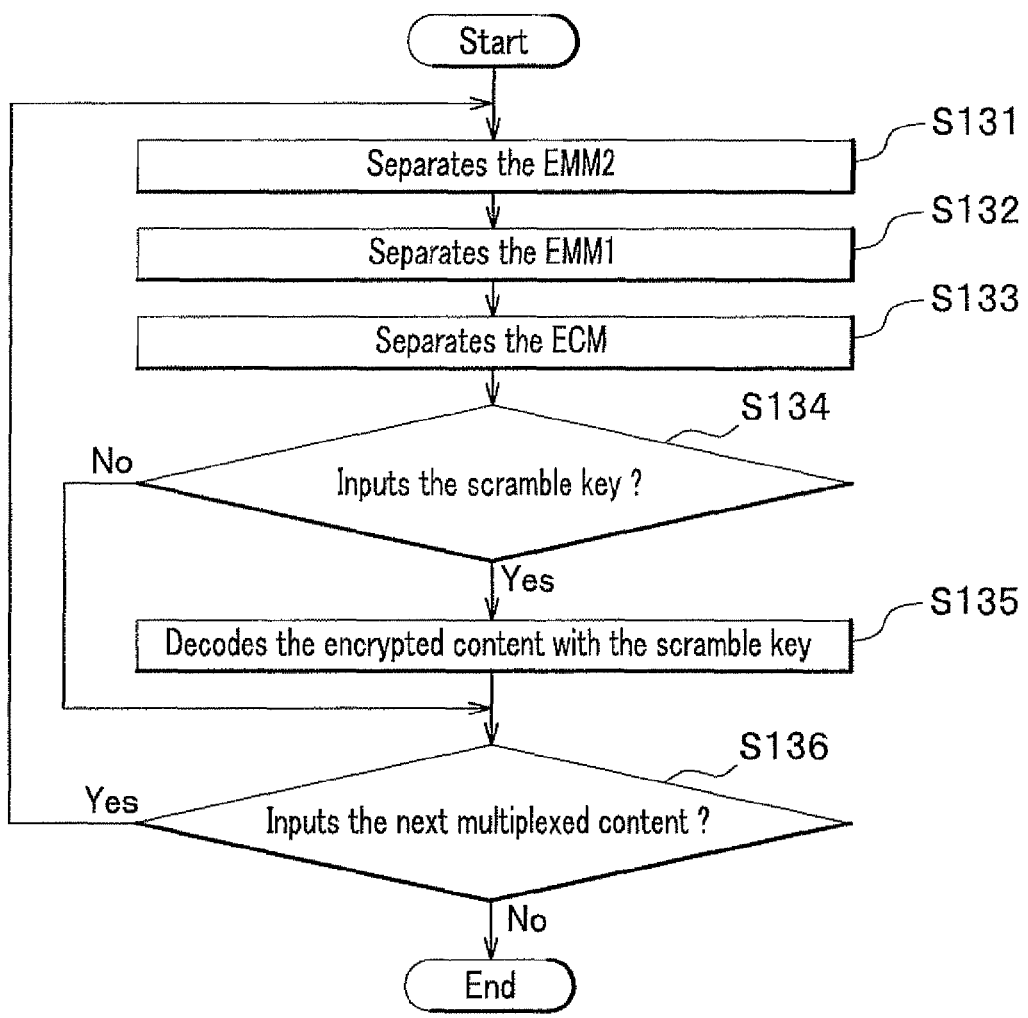
FIG. 14 is a flow chart showing an operation of the content decoder of the second embodiment of the present invention for receiving the multiplexed content and decoding the encrypted content.

Next, an operation of the content decoder 5B for receiving the multiplexed content and decoding the encrypted content is described with reference to FIG. 14 (see FIGS. 1 and 12). FIG. 14 is a flow chart showing the operation of the content decoder for receiving the multiplexed content and decoding the encrypted content.

The content decoder 5B separates the EMM2 from the multiplexed content input from outside of the content decoder 5B by the separating unit 54 (Step 131). The EMM2 separated here is output to the scramble key management apparatus 7B.

Then, the content decoder 5B separates the EMM1 from the multiplexed encrypted content, EMM1 and ECM from which the EMM2 is separated by the separating unit 51 in Step 131 (Step 132). The EMM1 separated here is output to the scramble key management apparatus 7B.

The content decoder 5B further separates the ECM from the multiplexed encrypted content and ECM from which the EMM1 has been separated in Step 132 by the separating unit 52 (Step 133). The ECM separated here is output to the scramble key management apparatus 7B.

The content decoder 5B determines whether or not a scramble key is input to the descrambler 53 from the scramble key management apparatus 7B (Step 134). If the scramble key is input (Yes in Step 134), the content decoder 5B decodes the encrypted content obtained by separating the ECM in Step 52 with the scramble key by the descrambler 53 (Step 135). If the scramble key is not input (No in Step 134), the processing proceeds to Step 136.

The content decoder 5B determines whether or not the next multiplexed content is input to the separating unit 54 (Step 136). If the next multiplexed content is input (Yes in Step 136), the processing returns to Step 131 and performs the operation for separating the EMM2 from the multiplexed content and the following operations. If the next multiplexed content is not input (No in Step 136), the processing terminates the operation.

(Operation of Scramble Key Management Apparatus)

Figure 15:
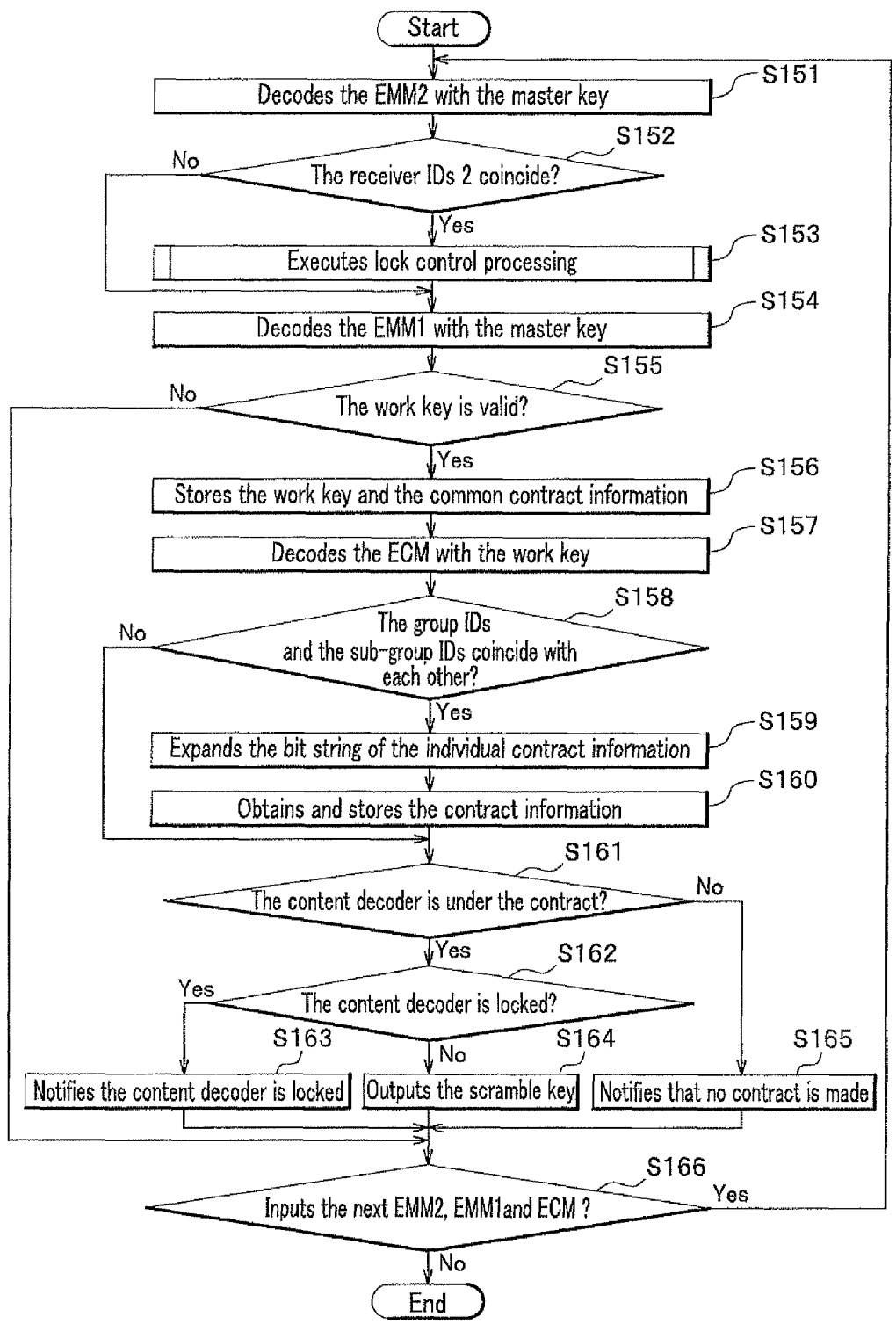
FIG. 15 is a flow chart showing an operation performed by the scramble key management apparatus of the second embodiment of the present invention for determining the contract status or executing a lock control process from an EMM2, an EMM1 and an ECM input thereto.

Next, a lock control processing performed by the scramble key management apparatus 7B for performing a lock control process by receiving the EMM2, the EMM1 and the ECM and determining the contract status is described with reference to FIG. 15 (see FIGS. 1 and 12 as appropriate). FIG. 15 is a flow chart showing an operation performed by the scramble key management apparatus 7B for receiving the EMM2, the EMM1 and the ECM and determining the contract status or performing a lock control process.

The scramble key management apparatus 7B decodes the EMM2 input from the content decoder 5B with a master key stored in the master key storage unit 82 by the EMM2 decoding unit 81 (Step 151). Thus, the lock control information to which the receiver ID2 is assigned can be obtained.

The scramble key management apparatus 7B compares the receiver ID2 assigned to the lock control information with the receiver ID2 stored in the ID2 storage unit 84 by the lock release determining unit 83 for determining whether or not they coincide with each other (Step 152). If they coincide with each other (Yes in Step 152), the lock release determining unit 83 determines that the obtained lock control information is information for the content receiver 3B and outputs the obtained lock control information to the lock control unit 86. The lock control unit 86 performs a lock control processing based on the lock control information (Step 153; lock control processing step). On the other hand, if they do not coincide with each other (No in Step 152), the lock release determining unit 83 determines that the obtained lock control information is not information for the content receiver 3B, and the processing proceeds to Step 154 without performing the lock control processing.

If the receiver ID2 included in the EMM2 is not encrypted with a master key, the order of Step 151 and Step 152 may be exchanged. More specifically, before decoding the lock control information included in the EMM2 with the master key (Step 151), the EMM2 decoding unit 81 refers to the receiver ID2 which is included in the fixed part of the EMM body1T12 (see FIG. 11) and is added to the lock control information U12 (see FIG. 11), and compares the receiver ID2 with the receiver ID2 stored in the ID2 storage unit 84 to determine whether or not they coincide with each other (Step 152). If they coincide with each other, the EMM2 decoding unit 81 decodes the EMM2 (lock control information) with the master key (Step 151), and then the lock control processing is performed (Step 153). If they do not coincide with each other, the processing may proceed to Step 154 without executing Step 151 and Step 153.

Next, the scramble key management apparatus 7B decodes the EMM1 input from the content decoder 5B with the device key stored in the device key storage unit 72 by the EMM1 decoding unit 71 (Step 154). Thus, the common contract information and the work key can be obtained.

Then the scramble key management apparatus 7B determines whether or not the work key is valid by the common contract determining unit 73 based on the common contract information obtained in Step 154 (Step 155). If the work key is not valid (No in Step 155), the processing proceeds to Step 166. If the work key is valid (Yes in Step 155), the scramble key management apparatus 7B stores the common contract information and the work key obtained in Step 154 in the common contract information storage unit 74 (Step 156).

Subsequently, the scramble key management apparatus 7B retrieves the common contract information and the work key which has been stored in the common contract information storage unit 74 in Step 156 by the ECM decoding unit 75. If the work key is within its expiration date indicated by the common contract information, the scramble key management apparatus 7B decodes the ECM input from the content decoder 5B with the work key (Step 157; license management information decoding step). Thus, the individual contract information and the scramble key can be obtained.

(Authorization Information Obtaining Step)

Subsequently, the scramble key management apparatus 7B determines whether or not the group ID and the sub-group ID added to the individual contract information obtained by the contract information obtaining unit 76*b* in Step 157 coincide with the group ID and the sub-group ID stored in the ID1 storage unit 77B (Step 158). If they do not coincide with each other (No in Step 158), the processing proceeds to Step 161. If they coincide with each other (Yes in Step 158), the scramble key management apparatus 7B expands the compressed bit string of the individual contract information obtained in Step 157 by the expanding unit 76*a* of the individual contract determining unit 76B (Step 159). Furthermore, the scramble key management apparatus 7B extracts the contract information of the content receiver 3B from the individual contract information based on the receiver ID1 stored in the ID1 storage unit 77B by the contract information obtaining unit 76*b* and stores the contract information in the individual contract information storage unit 78 (Step 160).

Subsequently, the scramble key management apparatus 7B determines whether or not the content receiver 3B is under a contract by the contract status determining unit 76*c* based on the contract information stored in the individual contract information storage unit 78 (Step 161; authorization status determining step). If the content receiver 3B is under the contract (Yes in Step 161), the contract status determining unit 76*c* determines whether or not the content receiver is locked (Step 162). If the content receiver 3B is locked (Yes in Step 162), the information for notifying that the content receiver 3B is locked is output to the content decoder 5B (Step 163). If the content receiver 3B is not locked (No in Step 162), the scramble key management apparatus 7B outputs the scramble key obtained in Step 157 to the content decoder 5B by the contract status determining unit 76*c* (Step 164; license information output step). If the content receiver 3 is not under the contract (No in Step 161), the scramble key management apparatus 7B outputs information notifying that the content receiver 3B has made no contract to the content decoder 5B by the contract status determining unit 76*c* (Step 165).

Then, the scramble key management apparatus 7B determines whether or not the next EMM2, EMM1 and ECM are input to the EMM2 decoding unit 81, EMM1 decoding unit 71B and the ECM decoding unit 75 (Step 166). If the next EMM2, EMM1 and ECM are input to the EMM2 decoding unit 81, EMM1 decoding unit 71B and the ECM decoding unit 75 (Yes in Step 166), the processing returns to Step 151 and performs the operation for decoding the EMM2 with the master key and the following operations. If the next EMM2, EMM1 and ECM are not input to the EMM2 decoding unit 81, EMM1 decoding unit 71B and the ECM decoding unit 75 (No in Step 166), the processing terminates the operation.

It has been described here that the contract status determining unit 76*c* determines whether or not the content receiver 3B is locked (Step 162) after determining whether or not the content receiver is under a contract based on the obtained individual contract information (Step 161). However, since the output of the scramble key is prohibited regardless of the contract status in the case where the content receiver 3B is locked, the lock status may be checked after obtaining the lock control information from the EMM2 and determining by the lock release determining unit 83 that the receiver IDs 2 do not coincide with each other (No in Step 152). Otherwise, the lock status may be checked after the lock control processing of the lock control unit 86 (Step 153) (i.e. before Step 154), and if the content receiver 3B is locked, the processing may proceed to Step 166 without executing Step 154 to Step 165, omitting the processing for determining the contract status. (Lock Control Processing)

Figure 16:
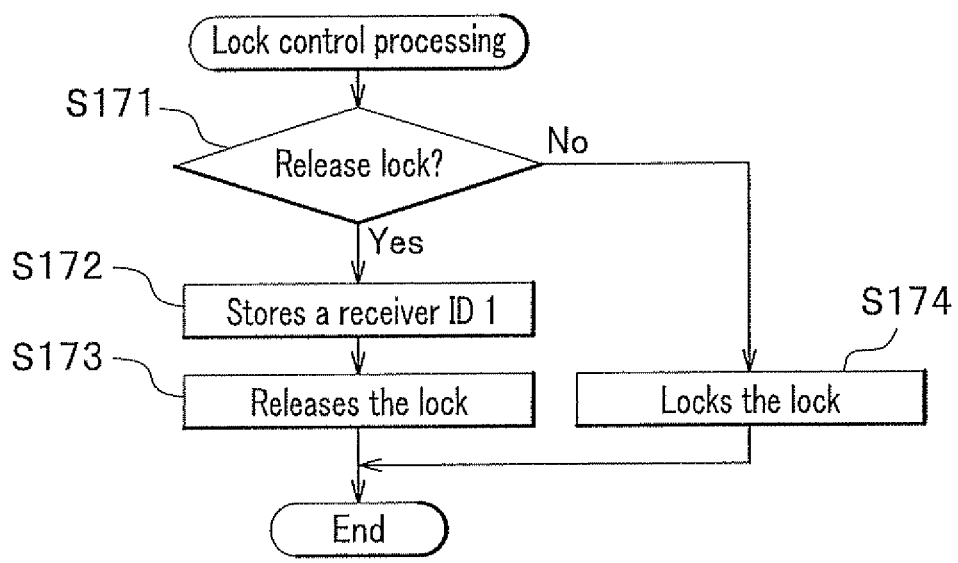
FIG. 16 is a flow chart showing a lock control processing performed by the scramble key management apparatus of the second embodiment of the present invention for changing the lock status based on the lock control information obtained by the EMM2 input thereto.

Next, the lock control processing (Step 153 in FIG. 15) is described with reference to FIG. 16 (see FIGS. 11 and 12). FIG. 16 is a flow chart showing the lock control processing performed by the scramble key management apparatus of the second embodiment of the present invention for changing the lock status based on the lock control information obtained by receiving the EMM2.

The scramble key management apparatus 7B performs the lock control processing by the lock control unit 86 based on the lock control information which is input by the EMM2 decoding unit 81 and is determined by the lock release determining unit 8 to be the lock control information for the content receiver 3B.

The scramble key management apparatus 7B firstly determines whether or not the lock control information is for releasing a lock by the lock control unit 86 (Step 171).

The lock control information is included in the lock control information U12 of the EMM body 1 T12 in the configuration of the EMM2 shown in FIG. 11. The lock control information U12 includes information indicating whether to change the lock status to prohibit the output of the scramble key (lock) or to change the lock status to allow the output of the scramble key (release) and a newly assigned receiver ID1 if the lock control information is to release the lock. In addition to the receiver ID1, a group ID and a sub-group ID may be newly assigned.

Returning to FIG. 16, the description is continued. If the scramble key management apparatus 7B determines that the lock control information is for releasing the lock by the input lock control unit 86 (Yes in Step 171), the scramble key management apparatus 7B stores the newly assigned receiver ID1 in place of the receiver ID1 which has been stored in the ID1 storage unit 77B, locked and has not been used in the content receiver 3B till now (Step 172), and releases the lock to change the lock status to a status where the output of the scramble key is allowed (Step 173) by the lock control unit 86. Thus, the individual contract determining unit 76B is allowed to output the scramble key to the descrambler 53 of the content decoder 5B based on the determination result of the contract status determining unit 76*c*.

On the other hand, if the lock control information is not information for releasing the lock (i.e. information for locking the lock) (No in Step 171), the scramble key management apparatus 7B locks the content receiver 3B to prohibit the output of the scramble key by the lock control unit 86 (Step 174). Thus, the individual contract determining unit 76B is prohibited to output the scramble key to the descrambler 53 of the content decoder 5B regardless of the contract status.
(Lock Determination Process)

Figure 17:
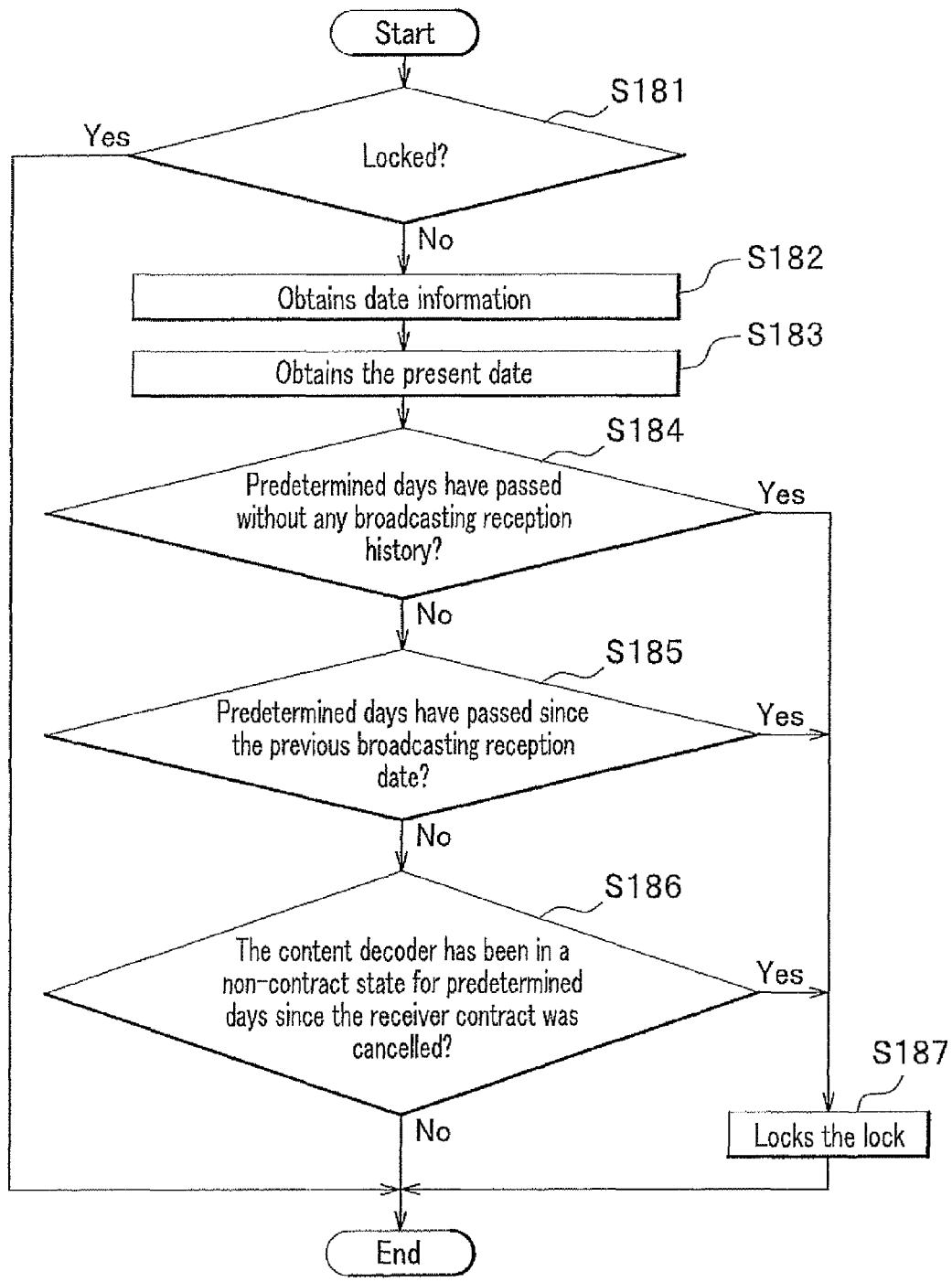
FIG. 17 is a flowchart showing lock determination process performed by the scramble key management apparatus of the second embodiment of the present invention for changing the lock status based on date information.

Next, a lock determination process step performed by the scramble key management apparatus 7B for determining whether to lock the content receiver 3B based on date information is described with reference to FIG. 17 (see FIG. 12 as appropriate). FIG. 17 is a flowchart showing the lock determination process performed by the scramble key management apparatus of the second embodiment of the present invention for changing the lock status based on date information.

The scramble key management apparatus 7B of the second embodiment of the present invention determines by itself whether the content receiver 3B has not received broadcasting for a long time, and changes the lock status to a status where the output of the scramble key to the content decoder 5B from the scramble key management apparatus 7B is prohibited if predetermined conditions are met.

The lock control processing of the content receiver 3B is performed by using the EMM2. In order to perform the control by the broadcast wave W, the content receiver 3B needs to select the broadcast wave W to receive the broadcast wave W.

Thus, if the content receiver 3B has not received the broadcasting for a long time, a broadcasting company can not detect whether or not the content receiver 3B is changed to be locked. In such a situation, if the content receiver 3B receives broadcasting again after assigning the receiver ID1 of the content receiver 3B which is assumed not to be used to another content receiver 3B, the content receiver 3B may be allowed to watch a content based on the contract of the another content receiver 3B.

The scramble key management apparatus 7B of the second embodiment executes the lock determination process step for determining by itself that the content receiver 3B has not been used and locking itself based on date information, such as a purchase date of the content receiver 3B, a date when broadcasting is received at last and a date when a receiver contract is cancelled.

In the flowchart shown in FIG. 17, the scramble key management apparatus 7B determines whether or not the following three conditions are met. If any one of the three conditions is met, the scramble key management apparatus 7B locks itself to change its lock status to the status where the output of the scramble key is prohibited.

(Condition 1)

A predetermined period (e.g. one year from a purchase date) has lapsed without receiving any broadcasting since the content receiver 3B was purchased.

(Condition 2)

The content receiver 3B has received broadcasting at least one time after the content receiver 3B is purchased, however, a predetermined period (e.g. two years) has lapsed since the last time the content receiver 3B received broadcasting.

(Condition 3)

The contact receiver 3B made a contract for watching broadcasting before, however, the contract was cancelled later and a non contract state has continued for a predetermined period of time (e.g. half a year).

The operation of the scramble key management apparatus 7B in the lock determination process step is described below.

It is enough to perform the lock determination process one time a day, and thus, the lock determination process is executed at least one of the time when the content receiver 3B is switched on, or the time when a predetermined time is reached. Preferably, the lock determination process is executed at both of the times. By configuring to execute the lock determination process at the time when the content receiver 3B is switched on, it is possible to reliably execute the lock determination process on the content receiver 3B which has been left turned-off or the content receiver 3B which always turns off its power at a predetermined time. By configuring to execute the lock determination process at a predetermined time, it is possible to reliably execute the lock determination process one time a day on the content receiver 3B which is always kept turned-on. Thus, by configuring to execute the lock determination process at both of the times, it is possible to reliably lock the content receiver 3B which has not been used for a predetermined period of time to change its lock status to be prohibited from outputting the scramble key.

At first, the scramble key management apparatus 7B checks by the lock control unit 86 whether or not the content receiver 3B is locked (Step 181). If the content receiver 3B is locked (Yes in Step 181), the content receiver 3B is already locked and is in the status where the output of the scramble key is prohibited, and thus the following lock determination process does not need to be executed and the processing ends.

On the other hand, if it is not locked (No in Step 181), the scramble key management apparatus 7B obtains by the lock determining unit 85 date information stored in the individual contract information storage unit 78 via the individual contract determining unit 76B (Step 182). The date information includes a purchase date of the content receiver 3B, a date when the content receiver 3B received broadcasting at last and a date when a receiver contract was cancelled. Instead of the date when the content receiver 3B received broadcasting at last, the expiration date of the work key stored in the common contract information storage unit 74 may be referred to, for example.

Next, the scramble key management apparatus 7B obtains by the lock determining unit 85 the present date from, for example, an internal clock (not shown) (Step 183). In order to determine whether or not the condition 1 is met, the scramble key management apparatus 7B checks by the lock determining unit 85 whether or not the content receiver 3B has never received broadcasting since the content receiver 3B was purchased, compares the purchase date included in the date information obtained in Step 182 with the present date obtained in Step 183, and determines whether or not the present date has passed a predetermined date (e.g. a date one year after the purchase date) (Step 184). Whether or not the content receiver 3B has never received broadcasting since the content receiver 3B was purchased can be determined by checking whether or not the previous broadcasting reception date antedates the purchase date of the content receiver 3B or by checking whether or not a predetermined default value which can not be real, such as 99 99, 9999, is set as the previous broadcasting reception date. If it is determined that the present date has passed the predetermined date (Yes in Step 184), the processing proceeds to Step 187.

If the present date has not passed the predetermined date (No in Step 184), processing for checking the condition 2 is executed (Step 185).

The scramble key management apparatus 7B compares by the lock determining unit 85 the previous broadcasting reception date included in the date information obtained in Step 182 with the present date obtained in Step 183 to determine a predetermined period of time has passed (e.g. 2 years) (Step 185) for determining whether or not the condition 2 is met. If the predetermined period of time has passed (Yes in Step 185), the processing proceeds to Step 187.

If the predetermined period of time has not passed (No in Step 185), the processing for checking the condition 3 is executed (Step 186).

The scramble key management apparatus 7B compares by the lock determining unit 85 the contract cancel date included in the date information obtained in Step 182 with the present date obtained in Step 183 to determine a predetermined period of time (half a year) has passed (Step 186) for determining whether or not the condition 3 is met. If the predetermined period of time has passed (Yes in Step 186), the processing proceeds to Step 187.

If the predetermined period of time has not passed (No in Step 186), there is no condition met for locking the content receiver 3B, and thus the processing ends.

If any one of the conditions 1 to 3 checked in Step 184, Step 185 and Step 186 is met (Yes in any one of Steps 184 to 186), the lock determining unit 85 transmits the lock determination information for locking the content receiver 3B to the lock control unit 86, and the lock control unit 86 locks the content receiver 3B to prohibit the scramble key management apparatus 7B from outputting the scramble key to the content decoder 5B (Step 187), and the processing ends.

As described above, it is possible to reliably lock the content receiver 3B which has not received broadcasting for more than a predetermined period of time by the lock determination process, whereby the use of a receiver ID1 by the content receiver 3B can be invalidated. Thus, a broadcasting company is allowed to reuse the receiver ID1 in another content receiver 3B.

It is to be noted that conditions for determining to lock the content receiver 3B are not limited to the 3 conditions. Some conditions may be omitted, or another condition may be further added. The predetermined period of time may be changed based on the kind of a contracted content or channel.

If the content receiver 3B automatically performs the lock determination process by the lock determination process, only the lock control information for releasing the lock may be transmitted as the lock control information based on the receiver ID2.

Next, how a receiver ID1 and a receiver ID2 are assigned to the scramble key management apparatus 7B of the content receiver 3B is described with reference to FIG. 18 (see FIG. 12 as appropriate). FIG. 18 is an illustration for explaining how information unique to the scramble key management apparatus, such as a receiver ID1, a receiver ID2 and a secret key is assigned thereto in advance.

A receiver ID1 (including a group ID and a sub-group ID), a device key, a receiver ID2 and a master key which are assigned by a broadcasting company or an apparatus manufacturer and are unique to the scramble key management apparatus 7B (content receiver 3B) are written in the ID1 storage unit 77B, the device key storage unit 72, the ID2 storage unit 84 and the master key storage unit 82, respectively, by a security module generation apparatus 2 at the time of delivery.

The scramble key management apparatus 7B may be integrated with the content decoder 5B, a display apparatus (not shown) and a content reproducing apparatus such as an audio reproducing apparatus, or may be configured as a tamper resistance module, such as an IC card.

If the scramble key management apparatus 7B is a tamper resistance module such as an IC card, the security module generation apparatus 2 can be configured, for example, by a computer and an IC card writing apparatus receiver ID1 and can set information unique to a content receiver and issue the information in the form of an IC card. Thus, the scramble key management apparatus 7B can be managed independently from other large-scale apparatus, which advantageously makes it easy to issue and manage the unique information.

Next, how a receiver ID1 is reused and assigned is described with reference to FIGS. 19A and 19B (see FIG. 12 as appropriate). FIGS. 19A and 19B are illustrations for explaining how a receiver ID1 is assigned to the scramble key management apparatus by reuse. FIG. 19A shows a default setting of receiver IDs 1 and receiver IDs 2 at the time of the delivery of the scramble key management apparatus. FIG. 19B shows a receiver ID1 and a receiver ID2 which are newly issued and a receiver ID1 and a receiver ID2 which are assigned by reuse.

In FIG. 19A, "1" is assigned to the scramble key management apparatus 7B1 as the receiver ID1 and the receiver ID2. "2" is assigned to the scramble key management apparatus 7B2 as the receiver ID1 and the receiver ID2. It is assumed here that the scramble key management apparatus 7B2 is changed to be locked due to non-use.

Next, a receiver ID1 and a receiver ID2 are newly issued and assigned to the newly manufactured scramble key management apparatus 7B3 as shown in FIG. 19B. At this time, since the receiver ID2 is an ID which is unique to each apparatus, "3" which is not used is assigned. On the other hand, since the receiver ID1 is an ID for obtaining individual contract information, the receiver ID1 of "2" which is locked by the scramble key management apparatus 7B2 shown in FIG. 19A and is not used is assigned by reuse.

The scramble key management apparatus 7B2' shown in FIG. 19B is the scramble key management apparatus 7B2 of which receiver ID2 is "2" and which is shown locked in FIG. 19A and then is released to be in a status where the scramble key management apparatus 7B2 can receive broadcasting again. Here, since the receiver ID1 of "1" is assigned to the apparatus whose receiver ID2 is "1" and is being used, and the receiver ID1 of "2" is assigned to the apparatus whose receiver ID2 is "3" by reuse, the receiver ID1 of "3" which has never been used is newly assigned.

If the receiver ID1 of "2" which was used by the scramble key management apparatus 7B2' before it was locked is still not used by another apparatus at the time when the lock of the scramble key management apparatus 7B2' is released, the receiver ID1 of "2" can be assigned.

Thus, since the receiver ID1 assigned to the scramble key management apparatus 7B can be freely locked or lock-released based on the status of use of the scramble key management apparatus 7B (content receiver 3B), the receiver ID1 used for transmitting individual contract information can be reused and the number of the production of the scramble key management apparatus 7B (content receiver 3B) can be increased.

In the second embodiment of the present invention, the scramble key management apparatus 7B decodes by the ECM decoding unit 75 the scramble key management information in which the individual contract information and the scramble key are encrypted to obtain the scramble key, however, the scramble key may not be included in the scramble key management information and may be received, for example, by another ECM which is different from the individual contract information or an EMM or may be received via a recording medium such as a magnetic disk.

In the second embodiment of the present invention the scramble key management apparatus (license information management apparatus) 7B is configured to allow or prohibit the output of the scramble key (license information) from the individual contract determining unit 76 to the descrambler 53 of the content decoder (content obtaining unit) 5 based on its lock status, however, the content may not be encrypted by the scrambler 11 (see FIG. 10) of the individual contract information transmitting apparatus 1B and may be transmitted in a non-scrambled status, and the license information management apparatus 7 may directly control the availability of watching the content based on the individual contract information. In this case, an output control unit for controlling the propriety of output of the content is provided to the content obtaining unit 5 shown in FIG. 12 instead of the descrambler 53, and the license information management apparatus 7B manages the output of the content by using, as license information output from the individual contract determining unit 76B, contract information indicating whether or not the receiver is under a contract instead of the scramble key to control the propriety of the output of the content by the output control unit.

The individual contract determining unit 76B of the license information management apparatus 7B outputs the contract information obtained by the contract status determining unit 76c to the output control unit if its lock is released. The individual contract determining unit 76B of the license information management apparatus 7B does not output the contract information if the content receiver 3B is locked. Thus, it is possible to control the availability of watching the content.

Alternatively, contract information indicating no contract is made may be always output as the contract information if the content receiver 3B is locked.

Third Embodiment

In the second embodiment, the receiver ID1 may be assigned by each broadcasting company or each channel and performs the lock control by the each broadcasting company or the each channel. Hereinafter, as the third embodiment, a configuration where the lock control is performed by each channel is described with reference to the drawings as appropriate.

An outline of the third embodiment is described.

If, for example, a plurality of channels A, B, . . . are operated by broadcasting companies A, B . . . , respectively, and a viewer is under contracts for receiving the plurality of channels which are operated by the broadcasting companies, receiver IDs 1 for obtaining authorization information for each of the plurality of the channels are assigned on the content receiver 3B by the broadcasting companies that operate each of the channels. When a new receiver contract is made or a lock is released, each of the broadcasting companies encrypts with a master key lock control information including a channel ID for identifying the corresponding channel, the receiver ID1 (including a group ID and a sub-group ID), and information for releasing the lock and adds a receiver ID 2 to the lock control information to generate an EMM2 (see FIG. 11), and transmits the EMM2 via the broadcast wave W. The content receiver 3B receives the EMM2, and associates the channel ID with the receiver ID1, stores the receiver ID1 and changes its lock status for the channel ID to a status where the output of the scramble key is allowed based on the lock control information included in the received EMM2 so that the viewer can watch the channel.

As for other channels, their lock status can be independently set to be the status where the viewer can watch the content by the same procedure.

In the third embodiment, a receiver contract is made by each service, such as a news program or an English conversation program, which is broadcasted in one channel. More specifically, if a plurality of kinds of program services such as a news program, an English conversation program and a drama program are organized and broadcasted in one channel, a viewer can select his or her favorite program and make a receiver contract by each service. Thus, a service ID for identifying a service (program) as well as a group ID and a sub-group ID are added to the contract information which is transmitted by the ECM.

If one broadcasting company operates a plurality of channels, a receiver ID1 is assigned by each channel, and the content receiver 3B is set in a state where the viewer can watch the channel by each channel by the same procedure. If the lock control is performed by each broadcasting company, a receiver ID1 which is common to a plurality of channels operated by the one broadcasting company may be assigned.

After a receiver contract is made, each broadcasting company transmits contract information that is associated with the assigned receiver ID1 by using the ECM and controls whether or not a content can be viewed in the content receiver 3B based on its contract status. If a predetermined condition is met, e.g. a viewer cancels the receiver contract of a channel, or a predetermined number of days have passed with no content watching (receiving) history of the channel by the content receiver 3B, in the content receiver 3B, the lock status associated with the corresponding receiver ID1 is changed to be the lock status where the output of the scramble key is prohibited and only the channel can not be viewed. As for other channels, the lock control processing is performed independently on the channels, and the channels can be watched until the lock status for the channels are changed to be the status where the output of the scramble key is prohibited.

The lock control is performed by each channel. If receiver contracts are made on a plurality of services in one channel, the lock status for the channel is changed to be the status where the output of the scramble key is prohibited when the receiver contracts for all the contracted services are cancelled or all the services are not used for a predetermined period of time.

(Configuration)

Continuously, a configuration of each part is described. Description is omitted for the configuration of the third embodiment which is common to the second embodiment, and the configuration of the third embodiment which is different from the second embodiment is explained.

With reference to FIG. 10, the configuration of the individual contract information transmitting apparatus 1B is explained. The configuration of the third embodiment is different from the second embodiment in the following points.

A channel ID and a service ID are further input to the ECM generation unit 13 from outside, and the ECM generation unit 13 generates an ECM in which these IDs are added to the individual contract information and outputs the ECM to the multiplexing unit 15B.

A channel ID is further input to the EMM1 generation unit 14B from outside, and the EMM1 generation unit 14B generates an EMM1 in which the channel ID is added to the work key and the common contract information encrypted with thee device key and outputs the EMM1 to the multiplexing unit 15B.

A channel ID is input to the EMM2 generation unit 16 from outside, and the EMM2 generation unit 16 generates an EMM2 in which a receiver ID2 and the channel ID are added to the lock control information encrypted with the master key, and outputs the EMM2 to the multiplexing unit 15B.

A service ID which corresponds to a content is added to the encrypted content which is encrypted by the scrambler 11 and is output to the multiplexing unit 15B.

Next, a configuration of the content receiver 3B is explained with reference to FIG. 12. The content decoder 5B corresponds to that of the second embodiment, and thus the description thereof is omitted.

The scramble key management apparatus 7B of the third embodiment is configured to be different from that of the second embodiment in the following point since the scramble key management apparatus 7B of the third embodiment manages the output of the scramble key based on the channel ID.

The EMM1 decoding unit 71B of the scramble key management apparatus 7B decodes the EMM1 input from the separating unit 51 of the content decoder 5B with the device key stored in the device key storage unit 72, and extracts the channel ID, the work key and the common contract information. The work key and the common contract information decoded here are output to the common contract determining unit 73 together with the channel ID.

The device key storage unit 72 is a storage unit made of a semiconductor memory or the like for storing the device key. The device key stored here is retrieved and used by the EMM1 decoding unit 71B for decoding the EMM1.

The device key is configured to be commonly used for all the channels here, however, a device key may be associated with each channel ID and stored in the device key storage unit 72, and by referring to the channel ID included in the EMM1 the device key which is associated with the channel may be used. In this case, the channel ID is added to the EMM1 as non-encrypted information.

The common contract determining unit 73 determines whether or not the work key is valid based on the expiration date of the work key shown in the common contract information decoded by the EMM1 decoding unit 71B. If it is valid, the work key and the common contract information are associated with the channel ID which is input at the same time and are stored in the common contract information storage unit 74.

The common contract information storage unit 74 associates the common contract information and the work key input from the common contract determining unit 73 with the channel ID and stores them. The common contract information storage unit 74 is a storage unit made of a semiconductor memory or the like. The work key and the common contract information stored here is retrieved and used by the ECM decoding unit 75 when the ECM is decoded.

The ECM decoding unit (license management information decoding unit) 75 uses the work key and the common contract information stored in the common contract information storage unit 74 to decode the ECM input from the separating unit 52 of the content decoder 5B for extracting the scramble key and the individual contract information. The ECM decoding unit 75 retrieves the work key and the common contract information that is associated with the channel ID included in the ECM from the common contract information storage unit 74 when the ECM is input, and determines whether or not the work key is valid based on the expiration date of the work key indicated by the common contract information. The ECM decoding unit 75 decodes the ECM if the work key is valid. The decoded scramble key and the individual contract information are output to the individual contract determining unit 76B together with the channel ID.

The individual contract determining unit 76B determines the contract status of the content receiver 3B for the channel ID and the service ID and the lock status for the channel ID based on the channel ID, the service ID and the individual contract information input from the ECM decoding unit 75 and the lock status information input from the lock control unit 86 which is described later. If the contract status is valid and the lock status is not locked, the individual contract determining unit 76B outputs the scramble key to the descrambler 53 of the content decoder 5B. The individual contract determining unit 76B includes the expanding unit 76a, the contract information obtaining unit 76b and the contract status determining unit 76c.

The expanding unit 76a expands the compressed bit string included in the individual contract information input from the contract information obtaining unit 76b. The expanding unit 76a expands the bit string which has been compressed by the compression unit 12c of the individual contract information transmitting apparatus 1B based on the contract rate information added to the bit string. The bit string expanded here, the service ID, the group ID and the sub-group ID included in the individual contract information input from the ECM decoding unit 75, and the channel ID added to the individual contract information are output to the contract information obtaining unit 76b.

The contract information obtaining unit (authorization information obtaining unit) 76b obtains the contract information of the content receiver 3B from the bit string of the individual contract information expanded by the expanding unit 76a based on the group ID, the sub-group ID and the receiver ID1 that are associated with the channel ID and stored in the ID1 storage unit 77B. The contract information obtained here is associated with the channel ID and the service ID and is stored in the individual contract information storage unit 78.

The contract information obtaining unit 76b determines whether or not the group ID and the sub-group ID added to the input individual contract information coincide with the group ID and the sub-group ID of the content receiver 3B (content decoder 5B) that are associated with the channel ID and stored in the ID1 storage unit 77B. If they do not coincide with each other, the contract information obtaining unit 76b determines that the contract information of the content receiver 3B is not included in the individual contract information. If they coincide with each other, the contract information obtaining unit 76b determines that the individual contract information includes the contract information for the content receiver 3B, and outputs the individual contract information to the expanding unit 76a. Further, the contract information obtaining unit 76b obtains the contract information for the content receiver 3B from the individual contract information whose bit string is expanded by the expanding unit 76a based on the receiver ID1 stored in the ID1 storage unit 77B, and associates the contract information with the channel ID and the service ID and stores the contract information in the individual contract information storage unit 78.

The contract status determining unit (authorization status determining unit) 76c determines whether or not the content receiver 3B is under a contract based on the contract information stored in the individual contract information storage unit 78. If it determines that the content receiver 3B is under the contract, the scramble key input from the ECM decoding unit 75 is output to the descrambler 53 of the content decoder 5B.

Further, the contract status determining unit 76c outputs the scramble key to the descrambler 53 of the content decoder 5B based on the contract information stored in the individual contract information storage unit 78 if the lock status is the status where the lock is released (the output of the scramble key is allowed) based on the lock status information associated with the channel ID. If the lock status is the status where the content receiver 3B is locked (the output of the scramble key is prohibited), the output of the scramble key to the descrambler 53 of the content decoder 5B is prohibited regardless of the content of the contract information.

The contract status determining unit 76c stores date information, such as the purchase date of the content receiver 3B, the last date when broadcasting was received, and the date when the receiver contract was cancelled, in the individual contract information storage unit 78. The contract status determining unit 76c also retrieves the stored date information and outputs the date information to the lock determining unit 85 which is described later.

Further, if the contract status determining unit 76c determines that the content receiver 3B is not under a contract, the contract status determining unit 76c retrieves the cancel date of the receiver contract for the service ID for the channel ID included in date information (described later) stored in the individual contract information storage unit 78, and updates the contract cancel date to the present date if the retrieved contract cancel date is invalid.

The ID1 storage unit 77B (first receiver ID storage unit) stores the group ID, the sub-group ID and the receiver ID1 assigned to the content receiver 3B by each channel ID in association with the each channel ID. The ID1 storage unit 77B is a storage unit made of a semiconductor memory or the like. The group ID, the sub-group ID and the receiver ID1 stored here are retrieved and used when obtaining the contract information for the content receiver 3B from the individual contract information input by the contract information obtaining unit 76b.

The group ID, the sub-group ID and the receiver ID1 stored in association with the each channel ID in the ID1 storage unit 77B are updated to the newly assigned group ID, sub-group ID and receiver ID1 that are associated with the each channel ID when the lock control unit 86 changes the locked status to the lock release status in the lock status for the each channel.

The individual contract information storage unit 78 is a storage unit made of a semiconductor memory or the like for storing the contract information or the date information. With reference to FIG. 20, a content stored in the individual contract information storing unit is described. FIG. 20 is an illustration for explaining the content stored in the individual contract information storing unit 78.

The individual contract information storage unit 78 stores the contract information acquired by the contract information obtaining unit 76b in association with the channel ID and the service ID. The contract information stored here is referred to and used when the contract status determining unit 76c determines the contract status.

Further, the individual contract information storage unit 78 stores date information, such as the purchase date of the content receiver 3B, the date of the receiver contract, the last date when broadcasting was received and the cancel date of the receiver contract. The stored date is retrieved by the individual contract determining unit 76B and is output to the lock determining unit 85 to be referred to and used when the lock determination process is performed.

In FIG. 20, date information including the contract information, the date of the receiver contract, the cancel date of the receiver contract and the last received date is stored in association with the channel IDs A, B, C and the service IDs A-1, A-2, A-3, B-1, C-1, C-2 of serveses which are provided by each channel.

Returning to FIG. 12, the EMM2 decoding unit 81, the master key storage unit 82 and the ID2 storage unit 84 are the same as those of the second embodiment, and thus descriptions thereof are omitted.

The lock release determining unit (lock control information obtaining unit) 83 determines whether or not the input lock control information is information for the content receiver 3B based on the lock control information decoded by the EMM2 decoding unit 81. If the lock release determining unit (lock control information obtaining unit) 83 determines that the input lock control information is information for the content receiver 3B, the lock release determining unit (lock control information obtaining unit) 83 outputs the lock control information to the lock control unit 86 together with the channel ID added to the lock control information.

The lock determining unit 85 detects an unused period in which the content receiver 3B has not received broadcasting by each channel ID based on the date information which is stored in the individual contract information storage unit 78 and is input via the individual contract determining unit 76B and the present date obtained by an internal clock (not shown) provided to the content receiver 3B. The lock determining unit 85 then determines whether or not to change the lock status to the status where the output of the scramble key is prohibited. The lock determining unit 85 outputs lock determination information which is the result of the determination to the lock control unit 86.

The lock control unit 86 executes the lock control processing for changing the lock status by each channel ID based on the lock control information input by the lock release determining unit 83 and the lock determination information input by the lock determining unit 85.

The lock control unit 86 determines whether the input lock control information is information for releasing the lock (changing the lock status to the status where the output of the scramble key is allowed) or information for locking the lock (changing the lock status to the status where the output of the scramble key is prohibited), and executes lock control processing on the receiver ID2 associated with the channel ID added to the lock control information based on the lock control information. The lock control unit 86 outputs the lock status information after the lock control processing and the channel ID to the individual contract determining unit 76B.

If the input lock control information is information for releasing the lock, the lock control unit 86 rewrites the receiver ID1 which is stored in the ID1 storage unit 77B and is associated with the channel ID as the receiver ID1 which is added to the lock control information and is newly assigned.

It is to be noted that the lock status information may be stored in a storing unit made of a semiconductor memory or the like, and the individual contract determining unit 76B may refer to the lock status information stored in the storing unit. The storing unit may be provided to the lock control unit 86 or the individual contract information storage unit 78 may be used as the storing unit.

By configuring the content receiver 3B as described above, the content receiver 3B receives the multiplexed content and decodes the encrypted content based on the contract status of the content receiver 3B for each channel ID and each service ID. By controlling the output of the scramble key to the descrambler 53 and prohibiting the output of the scramble key based on the lock status information which is controlled by each channel ID, it is possible to substantially invalidate the receipt of the contract information for the receiver ID1 and to make the receiver ID1 be in a non-use status by each channel ID. Therefore, the receiver ID1 can be assigned to another content receiver 3B for reuse by each channel ID.

(Operation)

Next, an operation of the content distributing system S (see FIG. 1) according to the third embodiment is described below. Explanation of the operation of the content distributing system S according to the third embodiment which is the same as that of the second embodiment is omitted, and the operations different therebetween are explained.

The operation of the individual contract information transmitting apparatus 1B is described with reference to FIG. 13 (see FIG. 10 as appropriate).

The third embodiment is different from the second embodiment in the following points. In Step 111 shown in FIG. 13, a content is encrypted with a scramble key by the scrambler 11 to generate an encrypted content and a service ID corresponding to the encrypted content is added, and transmits them to the multiplexing unit 15B (see FIG. 10).

In Step 114, the ECM generation unit 13 encrypts the scramble key, the individual contract information and the service ID with a work key and adds a channel ID to generate an ECM.

In Step 115, the EMM1 generation unit 14B encrypts the work key and the common contract information with a device key and adds the channel ID to generate an EMM1.

In Step 116, the EMM2 generation unit encrypts lock control information including the channel ID with the master key and adds a receiver ID2 to generate an EMM2. Other steps are the same as those of the second embodiment, and thus the description thereof is omitted.

Next, an operation of the content receiver 3B is described with reference to FIG. 15 (see FIG. 12 as appropriate).

The third embodiment is different from the second embodiment in the following points. In Step 152 shown in FIG. 15, the lock control processing performs the control of the lock status on the receiver ID1 that is associated with the channel ID obtained in Step 151.

In Step 156, the work key and the common contract information obtained in Step 154 are associated with the channel ID added to the EMM1 and are stored in the common contract information storage unit 74.

In Step 157, the ECM decoding unit 75 decodes the ECM with the work key that is associated with the channel ID which is added to the ECM.

In Step 160, the contract information obtaining unit 76*b* associates the obtained contract information with the channel ID and the service ID and stores it in the individual contract information storage unit 78.

In Step 161, the contract status determining unit 76*c* determines whether to allow the output of the scramble key or not based on the contract information of the service ID which is stored in the individual contract information storage unit 78 and is being received.

In Step 162, the individual contract determining unit 76B controls on the basis of the lock status of the channel ID the propriety of the output of the scramble key which is determined based on the contract information.

(Lock Determination Process)

Figure 21:
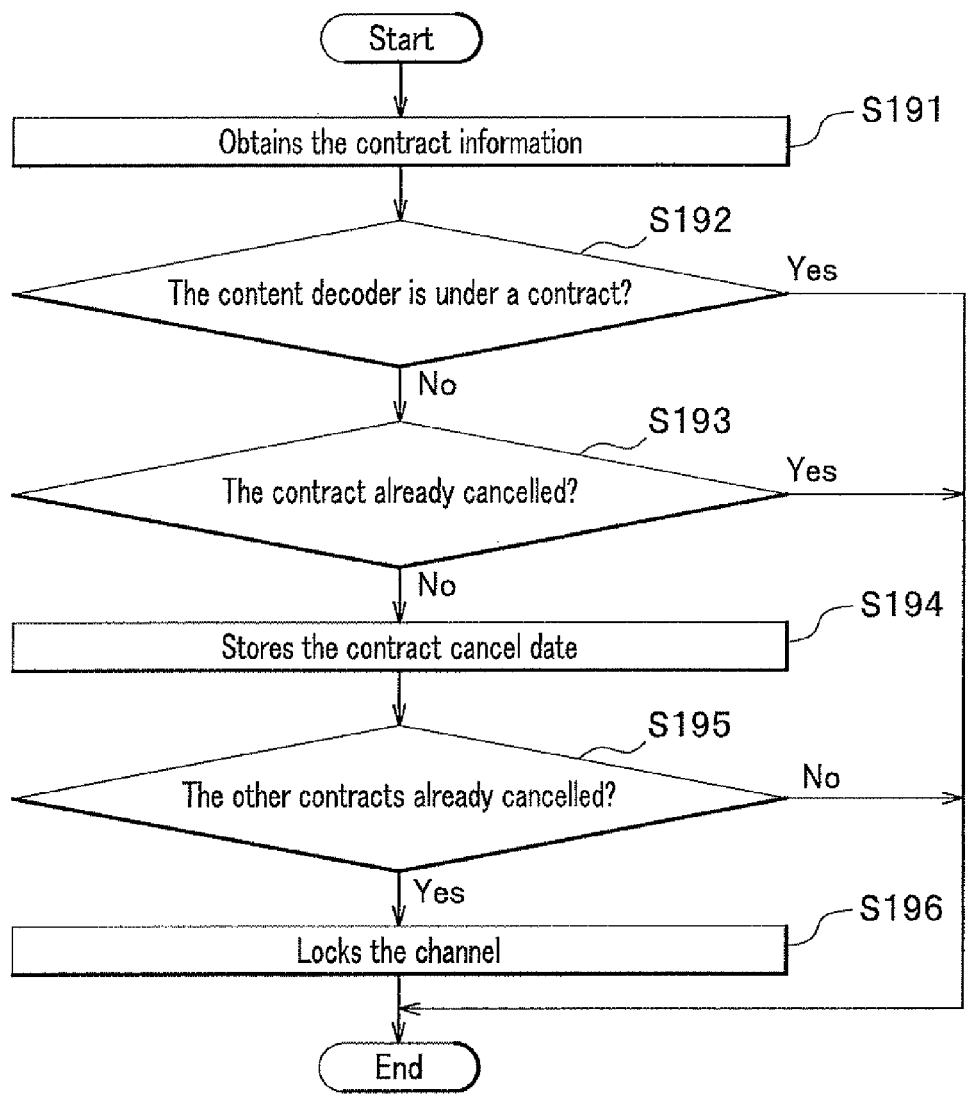
FIG. 21 is a flowchart showing lock determination process at the time of the cancellation of the receiver contract in the third embodiment of the present invention.

Next, the lock determination process associated with the cancellation of the receiver contract is described with reference to FIG. 21 (see FIG. 12 and FIG. 20 as appropriate). FIG. 21 is a flowchart showing the lock determination process at the time of the cancellation of the receiver contract.

When the scramble key management apparatus 7B receives the ECM, the contract information obtaining unit 76*b* of the individual contract determining unit 76B obtains the contract information as well as the channel ID and the service ID (Step 191) by the above described procedure. If the obtained contract information indicates that a contract is made (Yes in Step 192), the processing is terminated.

If the contract information indicates that the contract is not made (No in Step 192), the contract status determining unit 76*c* retrieves the cancel date of the receiver contract (see FIG. 20) in the date information which is stored in the individual contract information storage unit 78 in association with the channel ID and the service ID, and determines whether or not the receiver contract for the service ID is cancelled (Step 193). Here, if the cancel date of the receiver contract stored in the individual contract information storage unit 78 is impossible date such as 99, 99, 9999, the contract status determining unit 76*c* can determine that the contract is not cancelled. If the cancel date of the receiver contract stored in the individual contract information storage unit 78 is a valid date, the contract status determining unit 76*c* can determine that the contract is cancelled. In Step 193, if the cancel date of the receiver contract for the service ID is a valid date (Yes in Step 193), the contract was already cancelled, and thus the processing is terminated. If the contract is not cancelled (No in Step 193), the contract status determining unit 76*c* determines that the present date is the first day when the status of the contract information is changed to be the status where the contract is not made after the receiver contract is made, and stores the present date when the ECM is received as the cancel date of the receiver contract for the service ID in the individual contract information storage unit 78 (Step 194).

Next, the scramble key management apparatus 7B checks, by the individual contract determining unit 76B, if a receiver contract is made on other services in the channel of the channel ID which provides the service of the service ID, and determines whether or not the receiver contract is cancelled for all the other services related to the channel ID, except for the service of the service ID (Step 195). For example, if the scramble key management apparatus 7B determines that the present day is the cancel date of the receiver contract for the service ID=A-1 in the channel ID=A shown in FIG. 20, the scramble key management apparatus 7B checks whether or not a receiver contract is cancelled for the services of the service IDs=A-2, A-3 among the three services stored in association with the channel ID=A. Here, if there is a service for which a receiver contract is not cancelled in the other service IDs (No in Step 195), the scramble key management apparatus 7B determines that the receiver is still under contract for the channel ID, and the processing is terminated. On the other hand, if the receiver contract for all the other service IDs is cancelled (Yes in Step 195), the cancellation of the service of the service ID means that all receiver contracts for all the services in the channel ID are cancelled. Therefore, the scramble key management apparatus 7B determines that the receiver contract for the channel ID is cancelled, and the notification of the cancellation of the contract for the channel ID is sent together with the cancel date of the receiver contract (date information) from the individual contract information determination unit 76B to the lock determining unit 85. Upon receiving the notification, the lock determining unit 85 executes the lock determination process in accordance with the procedure of the lock determination process shown in FIG. 17, and outputs the lock determination information to the lock control unit 86. The lock control unit 86 locks the receiver ID2 that is associated with the channel ID and changes the lock status to the status where the output of the scramble key is prohibited (Step 196).

Here, by making a predetermined unused period from the cancel date of the receiver contract to be 0 day in the condition for the cancel date of the receiver contract for changing the lock status to the status where the output of the scramble key is prohibited (Condition 3), the lock determining unit 85 can immediately lock the receiver ID2 that is associated with the channel ID upon detection of the cancel date of the receiver contract by the individual contract information determination unit 76B.

In the lock determination process shown in FIG. 21 which is associated with the cancellation of the contract, the processing may be performed until Step 194, and the lock determination process may be performed when the power is turned on or a predetermined time is reached after the processing till Step 194 is finished. In this case, if there are receiver contracts for a plurality of service IDs in one channel ID, the date when the receiver contracts for all the service IDs are cancelled may be provided separately from the cancel date of the receiver contract associated with the service ID and may be stored in the individual contract information storage unit 78 in association with the channel ID. With this configuration, it is possible to omit processing for comparing all cancel dates of the receiver contracts associated with the service IDs to determine the latest date as the cancel date of the receiver contract for the channel ID when the lock determining unit 85 determines whether or not a predetermined day has passed since the cancel date of the receiver contract (Step 186 in FIG. 17).

As described above, it is possible to manage the output of the scramble key by each channel ID and each service ID in the third embodiment and to control the lock of the content receiver 3B by each channel ID.

What is claimed is:

1. A scramble key management apparatus which manages an output of a scramble key for decoding an encrypted content to a content decoder which receives and decodes the encrypted content, comprising:

a scramble key management information decoding device which decodes scramble key management information in which the scramble key and individual authorization information are encrypted, the individual authorization information including authorization information for a plurality of the content decoders, wherein the authorization information for the plurality of the content decoders includes a sequence of bits, wherein each bit is associated with a single one of the plurality of content decoders and the bits are arranged in a numerical order of decoder IDs of the plurality of the content decoders to indicate presence or absence of authorization for each of the plurality of the content decoders to decode the encrypted content;

an authorization information obtaining device which obtains the authorization information for the content decoder of an output target from the individual authorization information decoded by the scramble key management information decoding device based on the decoder ID of the content decoder of the output target; and an authorization status determining device which determines whether or not the content decoder is authorized to decode the encrypted content based on the authorization information obtained by the authorization information obtaining device, and outputs the scramble key to the content decoder of the output target if the content decoder is authorized to decode the encrypted content.

2. The scramble key management apparatus according to claim 1, wherein a plurality of content decoders which are transmission targets of the encrypted content is classified into a plurality of groups in advance, the authorization information of a plurality of the content decoders included in one of the plurality of groups is arranged in the individual authorization information, a group ID for identifying the one of the plurality of groups is included in the individual authorization information, and wherein the authorization information obtaining device obtains the authorization information based on the group ID and the decoder ID.

3. A scramble key management information transmitting apparatus which transmits to the scramble key management apparatus according to claim 1 scramble key management information in which a scramble key for decoding an encrypted content and individual authorization information are encrypted, the individual authorization information including authorization information indicating a presence or absence of authorization to decode the encrypted content for each of a plurality of content decoders which receives and decodes the encrypted content, comprising:

an individual authorization information generation device for generating individual authorization information in which the authorization information for a plurality of the content decoders which is input from outside is arranged based on a decoder ID which identifies the content decoder, and a scramble key management information generation device for encrypting the individual authorization information generated by the individual authorization information generation device and the scramble key to generate the scramble key management information.

4. The scramble key management information transmitting apparatus according to claim 3, wherein the individual authorization information generation device generates the individual authorization information including a bit string in which the authorization information, each piece of which is one bit, is arranged.

5. The scramble key management information transmitting apparatus according to claim 4, wherein the individual authorization information generation device losslessly compresses the bit string.

6. A scramble key output management method for managing an output of a scramble key for decoding an encrypted content to a content decoder which decodes the encrypted content, the method comprising steps of:

a scramble key management information decoding step performed by a computer to decode scramble key management information in which the scramble key and individual authorization information are encrypted, the individual authorization information including authorization information for a plurality of the content decoders, wherein the authorization information for the plurality of content decoders includes a sequence of bits, wherein each bit is associated with a single one of the plurality of content decoders and the bits are arranged in a numerical order of decoder IDs of the plurality of content decoders to indicate presence or absence of authorization for each of the plurality of the content decoders to decode the encrypted content;

an authorization information obtaining step for obtaining the authorization information for the content decoder of an output target from the individual authorization information decoded by the scramble key management information decoding device based on the decoder ID of the content decoder of the output target;

an authorization status determining step for determining whether or not the content decoder is authorized to decode the encrypted content based on the authorization information obtained by the authorization information obtaining unit; and a key output step for outputting the scramble key to the content decoder of the output target if the content decoder is determined to be authorized to decode the encrypted content in the authorization status determining step.

7. A computer readable non-transitory recording medium which stores a scramble key management program which causes a computer managing an output of a scramble key for decoding an encrypted content to a content decoder which receives and decodes the encrypted content to function as:

a scramble key management information decoding means for decoding scramble key management information in which the scramble key and individual authorization information are encrypted, the individual authorization information including authorization information for a plurality of the content decoders, wherein the authorization information for the plurality of the content decoders includes a sequence of bits, wherein each bit is associated with a single one of the plurality of content decoders and the bits are arranged in a numerical order of decoder IDs of the plurality of the content decoders to indicate presence or absence of authorization for each of the plurality of the content decoders to decode the encrypted content;

an authorization information obtaining means for obtaining the authorization information for the content decoder of an output target from the individual authorization information decoded by the scramble key management information decoding means based on the decoder ID of the content decoder of the output target; and an authorization status determining means for determining whether or not the content decoder is authorized to decode the encrypted content based on the authorization information obtained by the authorization information obtaining means and outputting the scramble key to the content decoder of the output target if the content decoder is authorized to decode the encrypted content.

8. A license information management apparatus for managing an output of license information for displaying a content to a content obtaining device which receives and displays the content, comprising:
a license management information decoding device which decodes license management information in which individual authorization information is encrypted, the individual authorization information including authorization information for a plurality of the content obtaining devices, wherein the authorization information for the plurality of the content obtaining devices includes a sequence of bits wherein each bit is associated with a single one of the plurality of the content obtaining devices and the bits are arranged in a numerical order of content obtaining device IDs of the plurality of the content obtaining devices to indicate presence or absence of authorization for each of the plurality of the content obtaining devices;
an authorization information obtaining device which obtains the authorization information for the content obtaining device of an output target from the individual authorization information decoded by the license management information decoding device based on the receiver ID of the content obtaining device of the output target; and
an authorization status determining device which determines whether or not the content obtaining device is authorized to display the content based on the authorization information obtained by the authorization information obtaining device, and outputs the license information to the content obtaining device of the output target if the content obtaining device is authorized to display the content.

9. The license information management apparatus according to claim 8, wherein the content obtaining device is a content decoder which decodes an encrypted content which is encrypted with a scramble key with the scramble key, and the license information is the scramble key.

10. License information management apparatus which manages an output of license information for displaying a content to a content obtaining device which receives and displays the content, comprising:
a license management information decoding device which decodes license management information in which individual authorization information is encrypted, the individual authorization information including authorization information for a plurality of the content obtaining devices, wherein the authorization information for the plurality of the content obtaining devices includes a sequence of bits wherein each bit is associated with a single one of the plurality of the content obtaining devices and the bits are arranged in a numerical order of content obtaining device IDs of the plurality of content obtaining devices to indicate presence or absence of authorization for each of the plurality of the content obtaining devices to display the content;
an authorization information obtaining device which obtains the authorization information for the content obtaining device of an output target from the individual authorization information decoded by the license management information decoding device based on the first receiver ID of the content obtaining device of the output target;
a lock control information obtaining device that obtains lock control information associated with a second receiver ID for controlling a lock status which is either a status where the output of the license information to the content obtaining device is allowed or a status where the output of the license information to the content obtaining device is prohibited, the second receiver ID identifying a larger number of the content obtaining devices than the first receiver ID;
a lock control device that controls the lock status based on the lock control information; and
an authorization status determining device which determines whether or not the content obtaining device is authorized to display the content based on the authorization information obtained by the authorization information obtaining unit, and outputting the license information to the content obtaining device of the output target if the content obtaining device is authorized to display the content and the lock status is the status where the output of the license information is allowed.

11. The license information management apparatus according to claim 10, wherein a plurality of content obtaining devices which are transmission targets of the content is classified into a plurality of groups in advance, the authorization information of a plurality of the content obtaining devices included in one of the plurality of groups is arranged in the individual authorization information, a group ID for identifying the one of the plurality of groups is included in the individual authorization information, and wherein the authorization information obtaining device obtains the authorization information based on the group ID and the first receiver ID.

12. The license information management apparatus according to claim 10, further comprising a first receiver ID storage device for storing the first receiver ID, wherein if the lock control information includes information for controlling the lock status to the status where the output of the license information is allowed the lock control information includes at least a first receiver ID and the license information management apparatus updates the first receiver ID stored in the first receiver ID storage device to the first receiver ID included in the lock control information.

13. The license information management apparatus according to claim 11, further comprising a first receiver ID storage device for storing the first receiver ID and the group ID, wherein if the lock control information includes information for controlling the lock status to the status where the output of the license information is allowed the lock control information includes at least a first receiver ID and a group ID, and the license information management apparatus updates the first receiver ID and the group ID stored in the first receiver ID storage device to the first receiver ID and the group ID included in the lock control information, respectively.

14. The license information management apparatus according to claim 10, further comprising a lock determining device for determining whether or not to change the lock status to the status where the output of the license information is prohibited based on predetermined date information and a present date, wherein the lock control device controls the lock status based on the lock control information and a determination result of the lock determining unit.

15. The license information management apparatus according to claim 10, wherein the first receiver ID is assigned a different ID by each channel in which the content obtaining device receives the content, the different ID being associated with a channel ID for identifying a channel, and wherein the lock control device controls the lock status by the each channel.

16. The license information management apparatus according to claim 14, wherein the first receiver ID is assigned a different ID by each channel in which the content obtaining device receives the content, the different ID being associated with a channel ID for identifying a channel, and wherein the lock determining device determines whether or not to change the lock status to the status where the output of the scramble key is prohibited based on the predetermined date information associated with the channel and the present date, and wherein the lock control device controls the lock status by the each channel based on the lock control information and a determination result of the lock determining unit.

17. The license information management apparatus according to claim 10, wherein the content obtaining device is a content decoder for decoding an encrypted content which is encrypted with a scramble key with the scramble key, and the license information is the scramble key.

18. A license management information transmitting apparatus for transmitting to the license information management apparatus according to claim 10 license management information in which individual authorization information is encrypted, the individual authorization information including authorization information indicating a presence or absence of authorization for each of a plurality of the content decoders which receives and displays a content to display the content, comprising:
　an individual authorization information generation device for generating the individual authorization information in which authorization information input from outside for the plurality of the content obtaining devices is arranged based on a first receiver ID for identifying each of the content obtaining devices;
　a license management information generation device for encrypting the individual authorization information generated by the individual authorization information generation device to generate license management information; and
　a lock control information generation device for generating lock control information which is associated with a second receiver ID and changes a lock status of the license information management apparatus, the second receiver ID identifying a larger number of the content obtaining devices than the first receiver ID.

19. A license information output management method for managing an output of license information for displaying a content to a content obtaining device for receiving and displaying the content, comprising steps of:
　a license management information decoding step performed by a computer to decode license management information in which individual authorization information is encrypted, the individual authorization information including authorization information for a plurality of the content obtaining devices, wherein the authorization information for the plurality of the content obtaining devices includes a sequence of bits, wherein each bit is associated with a single one of the plurality of the content obtaining devices and the bits are arranged in a numerical order of content obtaining device IDs of the plurality of the content obtaining devices to indicate presence or absence of authorization for each of the plurality of the content obtaining devices to display the content;
　an authorization information obtaining step for obtaining the authorization information for the content obtaining device of an output target which is decoded in the license management information decoding step based on the first receiver ID of the content obtaining device of the output target;
　an authorization status determining step for determining whether or not the content obtaining device is allowed to display the content based on the authorization information obtained in the authorization information obtaining step;
　a lock control information obtaining step for obtaining lock control information associated with a second receiver ID for controlling a lock status which is either a status where the output of the license information to the content obtaining device is allowed or a status where the output of the license information to the content obtaining device is prohibited, the second receiver ID identifying a larger number of the content obtaining devices than the first receiver ID;
　a lock control process step for controlling the lock status based on the lock control information obtained in the lock control information; and
　a license information output step for outputting the license information to the content obtaining device of the output target if the content obtaining device of the output target is determined to be allowed to display the content in the authorization status determining step and the lock status is the status where the output of the scramble key is allowed.

20. A computer readable non-transitory recording medium which stores a license information management program for managing an output of license information for displaying a content to a content obtaining device which receives and displays the content, the program causing a computer to function as:
　a license management information decoding device for decoding license management information in which individual authorization information is encrypted, the individual authorization information including authorization information for a plurality of the content obtaining devices, wherein the authorization information for the plurality of the content obtaining devices includes a sequence of bits, wherein each bit is associated with a single one of the plurality of the content obtaining devices and the bits are arranged in a numerical order of contend obtaining device IDs of the plurality of the content obtaining devices to indicate presence or absence of authorization for each of the plurality of the content obtaining devices to display the content;
　an authorization information obtaining device for obtaining the authorization information for the content obtaining device of an output target which is decoded in the license management information decoding step based on the first receiver ID of the content obtaining device of the output target;
　a lock control information obtaining device for obtaining lock control information associated with a second receiver ID for controlling a lock status which is either a status where the output of the license information to the content obtaining device is allowed or a status where the output of the license information to the content obtaining device is prohibited, the second receiver ID identifying a larger number of the content obtaining devices than the first receiver ID;
　a lock control device for controlling the lock status based on the lock control information; and an authorization status determining device for determining whether or not the content obtaining device is authorized to display the content based on the authorization information obtained by the authorization information obtaining device and outputting the license information to the content obtaining device of the output target if the content obtaining device is authorized to display the content and the lock status is the status where the output of the license information is allowed.

* * * * *